US012568488B2

(12) United States Patent
Wang et al.

(10) Patent No.: US 12,568,488 B2
(45) Date of Patent: Mar. 3, 2026

(54) METHOD AND DEVICE FOR TRANSMISSION

(71) Applicant: Samsung Electronics Co., Ltd.,
Suwon-si (KR)

(72) Inventors: Yi Wang, Beijing (CN); Feifei Sun,
Beijing (CN)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 405 days.

(21) Appl. No.: 18/003,882

(22) PCT Filed: Jul. 19, 2021

(86) PCT No.: PCT/KR2021/009239
§ 371 (c)(1),
(2) Date: Dec. 29, 2022

(87) PCT Pub. No.: WO2022/015121
PCT Pub. Date: Jan. 20, 2022

(65) Prior Publication Data
US 2023/0319819 A1 Oct. 5, 2023

(30) Foreign Application Priority Data

Jul. 17, 2020 (CN) .......................... 202010694880.2
Aug. 5, 2020 (CN) .......................... 202010779479.9
(Continued)

(51) Int. Cl.
*H04W 72/1268* (2023.01)
*H04W 72/0446* (2023.01)
*H04W 72/232* (2023.01)

(52) U.S. Cl.
CPC ... *H04W 72/1268* (2013.01); *H04W 72/0446*
(2013.01); *H04W 72/232* (2023.01)

(58) Field of Classification Search
CPC ........... H04W 72/1268; H04W 72/232; H04W
72/0446
See application file for complete search history.

(56) References Cited

U.S. PATENT DOCUMENTS

2017/0359808 A1* 12/2017 Dinan ............... H04W 72/0446
2018/0092073 A1* 3/2018 Nogami ............... H04W 52/16
(Continued)

FOREIGN PATENT DOCUMENTS

CN        103517276 A     1/2014
EP          3893586 A1    10/2021
(Continued)

OTHER PUBLICATIONS

International Search Report and Written Opinion of the International Searching Authority dated Oct. 19, 2021, in connection with International Application No. PCT/KR2021/009239, 9 pages.
(Continued)

*Primary Examiner* — Duc C Ho

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital
(Continued)

education, smart retail, security and safety services. According to embodiments of the disclosure, methods and devices for efficient uplink and downlink transmission are provided, so that delay can be reduced and reliability can be improved.

16 Claims, 48 Drawing Sheets

(30) Foreign Application Priority Data

| | | |
|---|---|---|
| Oct. 14, 2020 | (CN) .......................... | 202011096936.0 |
| Oct. 20, 2020 | (CN) .......................... | 202011128637.0 |
| Oct. 30, 2020 | (CN) .......................... | 202011197800.9 |
| Jan. 15, 2021 | (CN) .......................... | 202110056006.0 |

(56) References Cited

U.S. PATENT DOCUMENTS

| | | | |
|---|---|---|---|
| 2019/0200379 A1 | 6/2019 | Wang et al. | |
| 2019/0268912 A1* | 8/2019 | Myung ................. | H04L 1/1887 |
| 2019/0335489 A1 | 10/2019 | Oh et al. | |
| 2019/0349991 A1 | 11/2019 | Mukherjee | |
| 2020/0045696 A1 | 2/2020 | Huang et al. | |
| 2020/0187236 A1 | 6/2020 | Moon et al. | |
| 2020/0267523 A1 | 8/2020 | Tang et al. | |
| 2021/0045122 A1 | 2/2021 | Shi et al. | |
| 2021/0400705 A1 | 12/2021 | Wu et al. | |
| 2022/0304059 A1* | 9/2022 | Lei .................... | H04W 74/0866 |

FOREIGN PATENT DOCUMENTS

| | | |
|---|---|---|
| KR | 10-2020-0062228 A | 6/2020 |
| KR | 10-2020-0081461 A | 7/2020 |
| WO | 2020091565 A1 | 5/2020 |
| WO | 2020143057 A1 | 7/2020 |

OTHER PUBLICATIONS

Supplementary European Search Report dated Jan. 17, 2024, in connection with European Application No. 21841605.5, 10 pages.
First Office Action dated Jan. 10, 2026, in connection with Chinese Application No. 202110572353.9, 16 pages.
Communication pursuant to Article 94(3) EPC dated Nov. 4, 2025, in connection European Application No. 21841605.5, 8 pages.

* cited by examiner

Figure 2B:
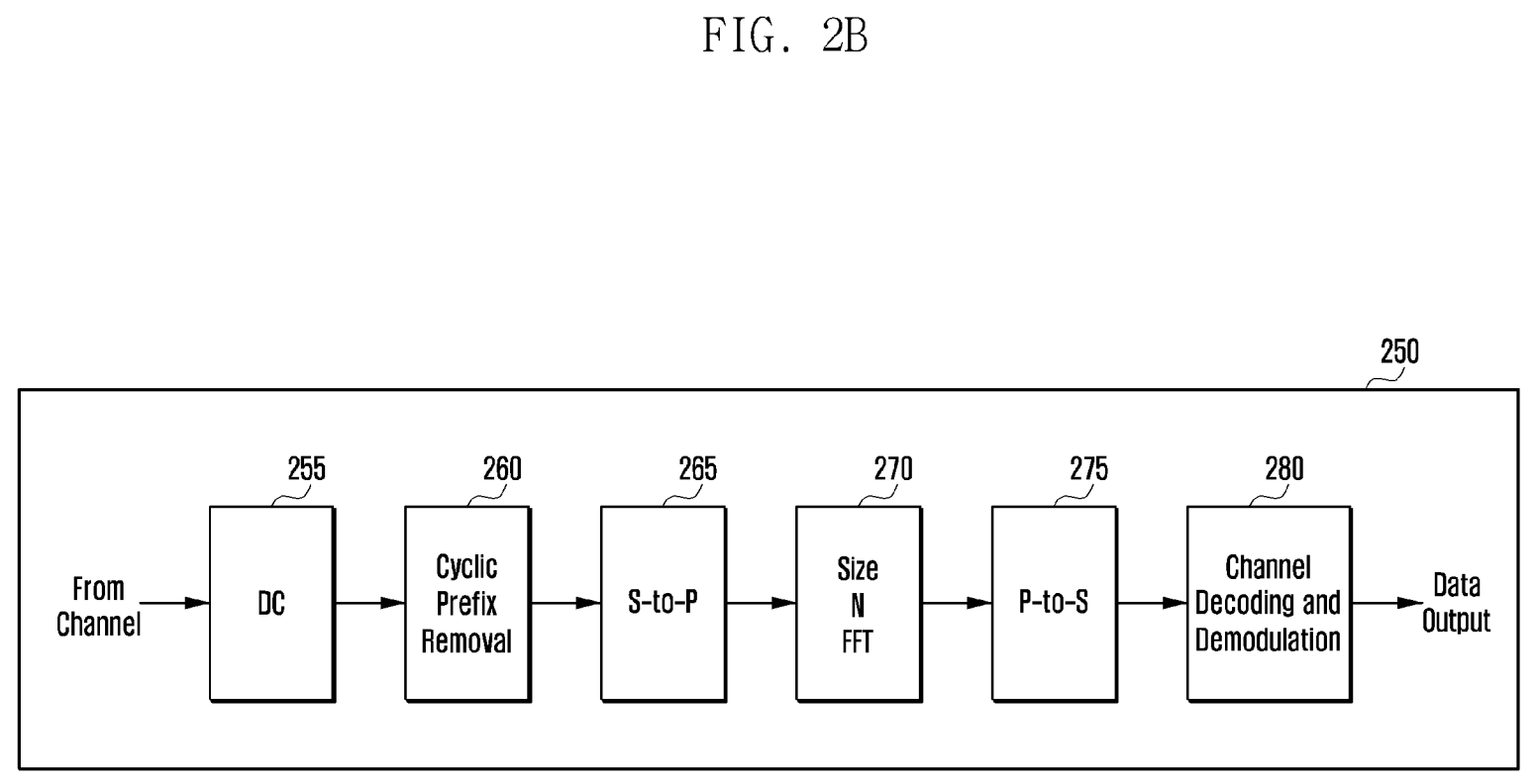

From Channel → 255 DC → 260 Cyclic Prefix Removal → 265 S-to-P → 270 Size N FFT → 275 P-to-S → 280 Channel Decoding and Demodulation → Data Output

FIG. 5

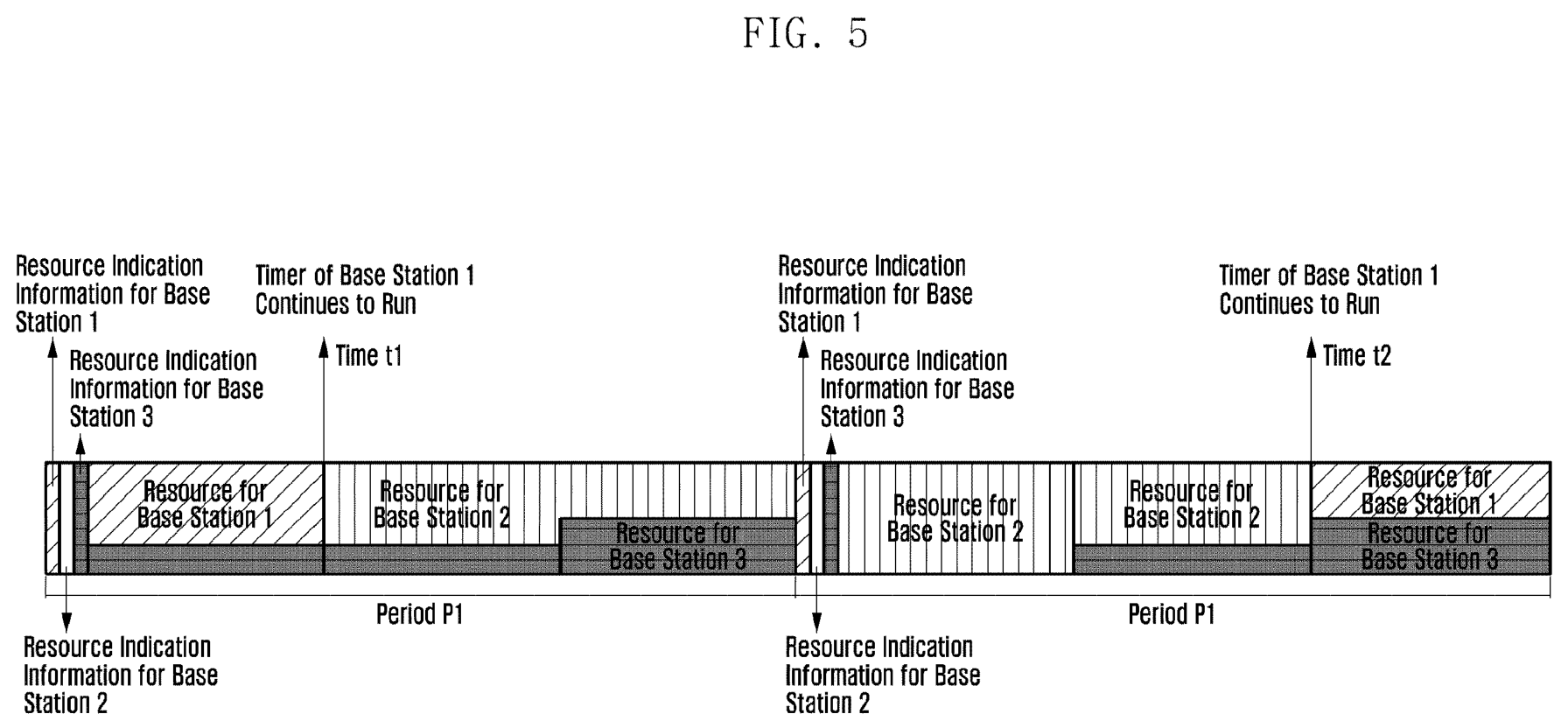

Resource Indication Information for Base Station 1

Timer of Base Station 1 Continues to Run

Time t1

Resource Indication Information for Base Station 3

Resource for Base Station 1

Resource for Base Station 2

Resource Indication Information for Base Station 2

Resource for Base Station 3

Period P1

Resource Indication Information for Base Station 1

Timer of Base Station 1 Continues to Run

Time t2

Resource Indication Information for Base Station 3

Resource for Base Station 1

Resource for Base Station 2

Resource Indication Information for Base Station 2

Resource for Base Station 3

Resource for Base Station 2

Period P1

FIG. 7A
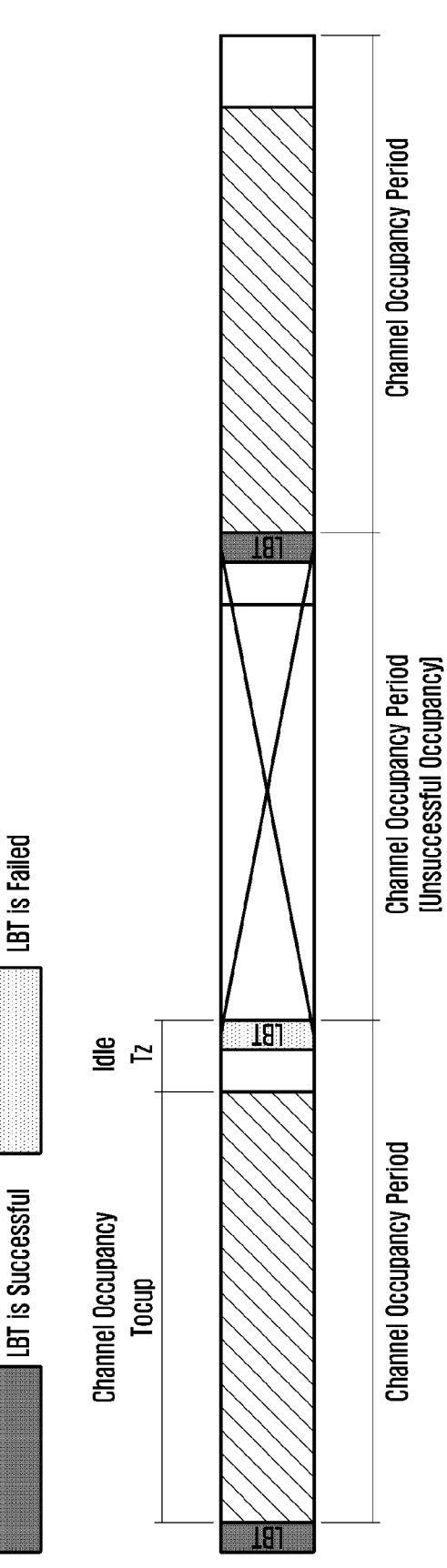

FIG. 10A

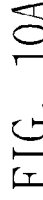

UE LBT
is Successful

UE LBT
is Failed

Base Station LBT
is Successful

Base Station LBT
is Failed

Base Station
Transmits Signals

UE 2 Transmits
Contention-based PRACHs

Base-Station-Initiated
Channel Occupancy Period 1 (Slot 0-9)

Base-Station-Initiated
Channel Occupancy Period 2 (Slot 10-19)

Base Station Cannot
Transmit Signals

UE1-Initiated Channel
Occupancy Period (Slot 1-5)

UE2-Initiated Channel
Occupancy Period (Slot 2-6)

LBT

UE1 LBT

UE2 LBT

LBT

FIG. 19
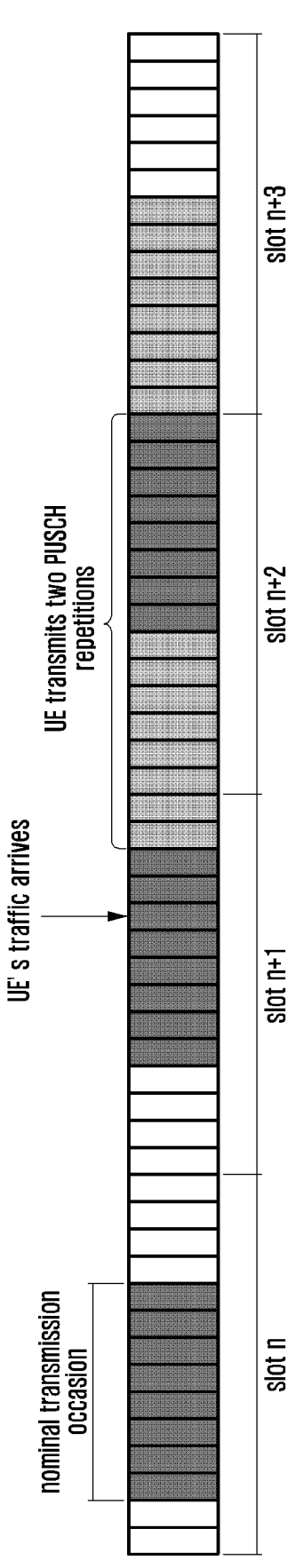

METHOD AND DEVICE FOR TRANSMISSION

CROSS-REFERENCE TO RELATED APPLICATIONS

This application is a 371 National Stage of International Application No. PCT/KR2021/009239, filed Jul. 19, 2021, which claims priority to Chinese Patent Application No. 202010694880.2, filed on Jul. 17, 2020, Chinese Patent Application No. 202010779479.9, filed Aug. 5, 2020, Chinese Patent Application No. 202011096936.0, filed Oct. 14, 2020, Chinese Patent Application No. 202011128637.0, filed Oct. 20, 2020, Chinese Patent Application No. 202011197800.9, filed Oct. 30, 2020, and Chinese Patent Application No. 202110056006.0, filed Jan. 15, 2021, the disclosures of which are herein incorporated by reference in their entirety.

BACKGROUND

1. Field

The disclosure relates to a technical field of wireless communication, and more particularly, to a method and device for transmission when a terminal operates in a discontinuous transmission system. Also, the disclosure relates to a method for receiving and transmitting uplink signals and a corresponding device.

2. Description of Related Art

To meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

In existing communication systems, mobile communication networks are generally deployed in licensed frequency bands to provide good services for terminal UEs. With the increasingly sharp contradiction between the outbreak of users' demand for high-bandwidth wireless traffic and the scarcity of spectrum resources in licensed frequency bands, mobile operators began to assume the unlicensed frequency bands as a supplement to the licensed frequency bands. For example, both the 3GPP LTE system and the NR system support an improvements of system capacity by effective carrier aggregation of the unlicensed frequency band and the licensed frequency band, and the NR system also supports independent networking of the unlicensed frequency bands. Compared with the licensed frequency bands, the unlicensed frequency bands have relatively abundant spectrum resources and a lower cost, but a relatively poor communication quality, because in the unlicensed frequency bands, respective transmitting nodes do not need to pay, and occupying resources by means of contention cannot guarantee that a certain transmitting node can always occupy the spectrum in time without interference from other nodes. In addition, many countries and regions are also assuming the spectrum sharing of licensed frequency bands to improve spectrum utilization efficiency and reduce the cost relative to the traditional exclusively licensed spectrum, such as the CBRS (citizen broadband radio service) system of the United States. In the spectrum sharing of licensed frequency bands, nodes with different priorities may be involved. It is preferentially guaranteed that nodes with high priorities occupy spectrum as needed, and nodes with low priorities are subsequently provided with available spectrum. No matter whether in spectrum sharing of the unlicensed frequency bands or the licensed frequency bands, a coordinating mechanism for spectrum resources is needed so that respective nodes can utilize spectrum resources as efficiently as possible and the interference among respective nodes is relatively controllable. How to improve the efficiency of a communication system based on the coordinating mechanism for spectrum resources is worth studying.

SUMMARY

In line with the development of communication systems as described above, there is a need for methods and devices for more efficient uplink and downlink transmission.

According to an aspect of the disclosure, there is provided a transmission method performed by user equipment UE, the method comprising: acquiring information related to spectrum occupancy; performing actions related to uplink and downlink signal transmission based on the information related to spectrum occupancy.

Optionally, performing actions related to uplink and downlink signal transmission comprises at least one of: adjusting an operating state of a timer, the timer being used for controlling the UE to enter a specific state; measuring reference signals on specific time resources; and monitoring PDCCH on specific time resources.

Optionally, the information related to spectrum occupancy includes spectrum resource indication information occupied by the base station.

Optionally, adjusting the operating state of the timer comprises: suspending the timer upon determining that the spectrum is not occupied by the base station based on the information related to spectrum occupancy; or continuing to run the timer upon determining that the spectrum is occupied by the base station.

Optionally, suspending the timer comprises: suspending a first type of timer based on the information related to spectrum occupancy; the first type of timer includes at least one of the following timers: a timer for configured grant PUSCH; a retransmission timer for configured grant PUSCH; a BWP inactivity state timer; a secondary cell deactivation timer; a search space switching timer; a timer for counting continuous asynchronization or synchronization; a random access response window, ra-ResponseWindow, for receiving a random access response; and a timer configured by the base station that needs to be determined whether to be suspended according to the information related to spectrum occupancy.

Optionally, measuring reference signals on specific time resources comprises: in a case that the information related to spectrum occupancy is acquired successfully, measuring based on the reference signals when configured reference signal resources are located in time-frequency domain resources occupied by the base station determined by the information related to spectrum occupancy.

Optionally, monitoring PDCCH on specific time resources comprises: in a case that the information related to spectrum occupancy is acquired successfully, performing monitoring of PDCCH when PDCCH to be monitored is located in time-frequency domain resources occupied by the base station determined by the information related to spectrum occupancy.

Optionally, monitoring PDCCH on specific time resources comprises: performing monitoring of a first type of PDCCH, rather than performing monitoring of a second type of PDCCH, when the information related to spectrum occupancy is not acquired; wherein the first type of PDCCH includes at least one of the following PDCCHs: PDCCH located in Type-0 PDCCH common search space CSS; PDCCH located in Type-0A PDCCH common search space CSS; PDCCH located in Type-1 PDCCH common search space CSS; PDCCH located in Type-2 PDCCH common search space CSS; PDCCH located in Type-3 PDCCH common search space CSS; PDCCH in a specific DCI format; PDCCH for a specific function; PDCCH scrambled by a specific RNTI; and PDCCH configured by the base station that needs to be monitored even if the UE does not acquire the information related to spectrum occupancy.

Optionally, the information related to spectrum occupancy includes a mode indicating that spectrum resources are occupied based on semi-static channels.

Optionally, the mode indicating that spectrum resources are occupied based on semi-static channels includes base-station-initiated and/or UE-initiated channel occupancy.

Optionally, the UE performs transmission of uplink signals based on the information related to spectrum occupancy.

Optionally, configuration information based on the base-station-initiated and/or UE-initiated channel occupancy is indicated in cell-common signaling and/or UE-specific signaling.

Optionally, the configuration information based on the base-station-initiated or UE-initiated channel occupancy at least includes one of period information, starting point and offset of the channel occupancy.

Optionally, when the mode is the UE-initiated channel occupancy and is shared with the base station, an end position of channel occupancy time shared by the UE with the base station is determined according to the earliest end position of the channel occupancy time by the UE.

Optionally, when there are two kinds of modes indicating that spectrum resources are occupied based on semi-static channels: configuration information of channel occupancy for each kind of mode is acquired; or one set of configuration information of channel occupancy applicable to both modes is acquired; or one set of configuration information of channel occupancy applicable to one kind of the modes and configuration information of channel occupancy for another kind of the modes determined based on predefined rules are acquired.

Optionally, transmission of uplink signals is carried out based on at least one of the following rules: the UE cannot transmit uplink signals on specific time resources; uplink signals are transmitted according to an indication of whether the UE can transmit uplink signals on the specific time resources; a specific type of uplink signal can be transmitted on the specific time resources; and the UE cannot transmit uplink signals on time resources for specific base-station-initiated channel occupancy.

Optionally, the specific time resources are a period of time resources before and/or after the starting point of the base-station-initiated channel occupancy.

Optionally, wherein the specific type of uplink signal is at least one of the following signals: PRACH; Msg A PRACH; Msg A PUSCH; all uplink signals of random access procedure; PRACH of contention-based random access procedure; Msg A PRACH of contention-based random access procedure; Msg A PUSCH of contention-based random access procedure; all uplink signals of contention-based random access procedure; configured grant PUSCH (CG PUSCH); CG PUSCH with a specific priority; uplink signals configured by the base station for uplink transmission according to a second kind of mode; PUCCH carrying a SR; and PUCCH carrying a SR with a specific priority; wherein the second kind of mode is a mode of UE-initiated channel occupancy.

Optionally, the specific base-station-initiated channel occupancy is at least one of: SS/PBCH candidate positions are contained within a base-station-initiated channel occupancy period; Type-0 PDCCH common search space is contained within the base-station-initiated channel occupancy period; Type-0A PDCCH common search space is contained within the base-station-initiated channel occupancy period; Type-1 PDCCH common search space is contained within the base-station-initiated channel occupancy period; and Type-2 PDCCH common search space is contained within the base-station-initiated channel occupancy period. Optionally, in the first/second kind of mode, if there is a downlink signal/uplink signal to be transmitted at the starting point of the corresponding channel occupancy, the base station/UE may initiate channel occupancy; if there is a downlink signal/uplink signal to be transmitted at a position other than the starting point of the corresponding channel occupancy, the downlink signal/uplink signal cannot be used to initiate channel occupancy by the base station/UE.

Optionally, the base station configures uplink signals for uplink transmission according to the second kind of mode, in which the configuring may be for respective resources or configurations, respectively.

Optionally, the base station configures uplink signals for uplink transmission according to the second kind of mode, in which the configuring may be for signal types.

Optionally, for a first type of signal and a second type of signal, the time resources that cannot be used for uplink transmission are determined according to different rules.

Optionally, for a first connected state and a second connected state, the time resources that cannot be used for uplink transmission are determined according to different rules. Optionally, the first connected state may be RRC connected state, and the second connected state may be IDLE state.

Optionally, if the UE receives the downlink signal, but the downlink signal does not contain base-station-initiated channel occupancy information, or the UE does not receive the base-station-initiated channel occupancy information, the UE assumes that the base station does not initiate channel occupancy.

Optionally, if the UE receives the downlink signal, but the downlink signal does not contain base-station-initiated channel occupancy information, or the UE does not receive the base-station-initiated channel occupancy information, the UE needs to determine whether the base station initiates channel occupancy according to other methods.

Optionally, the base station indicates information of the initiator of the channel occupancy used by the base station.

Optionally, the UE does not determine whether the base station initiates channel occupancy based on the COT remaining time indicated by the base station.

Optionally, the UE, according to the type of the detected downlink signal, determines whether the base station initiates the channel occupancy where the downlink signal is located and whether to share it with the UE.

Optionally, if the detected downlink signal is a second type of downlink signal (there is no intersection between the first type of downlink signal and the second type of downlink signal), the UE also needs to determine, according to other conditions, whether the base station initiates the channel occupancy where the downlink signal is located.

Optionally, the base station configures the UE to determine whether the base station initiates channel occupancy according to at least one of the above described ways.

Optionally, if the UE determines that the base station initiates channel occupancy and shares it with the UE, the UE may receive a CSI-RS within the channel occupancy. According to another aspect of the disclosure, there is provided a user equipment including a transceiver and a controller, and the user equipment is configured to perform the above methods.

According to another aspect of the disclosure, there is provided a method for transmitting uplink signals in a communication system, performed by a user equipment (UE), which comprises receiving configuration information indicating resource configuration from a base station; and determining uplink signal transmission resource based on the configuration information.

Optionally, determining uplink signal transmission resource by the UE based on the configuration information comprises: determining, by the UE, physical uplink control channel (PUCCH) transmission resource based on information configured by the base station, wherein, the information configured by the base station includes one or more of the following: PUCCH resource index; bandwidth of one or more uplink initial bandwidth part (BWP); physical resource block (PRB) offset; and boundary of frequency-domain resource for frequency hopping.

Optionally, in a case where the UE determines PUCCH transmission resource using the PRB offset configured by the base station: the UE uses the PRB offset configured by the base station to determine frequency-domain resource of PUCCH; or the UE determines a first PRB offset based on the PUCCH resource index, and determines the frequency-domain resource of PUCCH using the first PRB offset and the PRB offset configured by the base station.

Optionally, the method further comprises: selecting, by the UE, a set of uplink initial BWP parameters from a plurality of sets of parameters configured by the base station based on UE type, and determining, by the UE, PUCCH resource based on the selected parameters.

Optionally, the method further comprises: if the UE needs a time gap Lgap between two frequency hoppings, determining, by the UE, the PUCCH transmission resource based on the information configured by the base station and the time gap Lgap, wherein, for a long PUCCH format, a PUCCH length of an actual transmission is a PUCCH length obtained by subtracting the time gap Lgap from a PUCCH length determined based on the information configured by the base station, and wherein, for a short PUCCH format, a starting symbol of PUCCH of the actual transmission is Lgap symbols ahead of the starting symbol of PUCCH determined based on the information configured by the base station.

Optionally, the method further comprises: informing, by the UE, the base station of UE type related information by including UE type indication information in physical random access channel (PRACH) resource or in Message 3 of a random access procedure, wherein, the UE type related information includes at least one of: UE type, whether a bandwidth of the UE is limited, a bandwidth set that the UE is able to support, and whether the UE needs a time gap Lgap.

Optionally, determining uplink signal transmission resource based on the configuration information comprises: determining, by the UE, transmission resource of a configured grant (CG) physical uplink shared channel (CG PUSCH) based on the information configured by the base station, wherein, the information configured by the base station includes at least one of: time resource information of CG PUSCH, information of repetition transmission of CG PUSCH, and information used by the UE to determine information bits of uplink control information (CG-UCI) configured in CG PUSCH.

Optionally, the UE determines whether a CG PUSCH is based on repetition based on the information of repetition transmission of CG PUSCH, wherein, the information of repetition transmission includes at least one of: repetition type and number of times of repetitions; wherein, if the repetition type is Type-B, each repetition is a nominal repetition, and a nominal repetition is divided into one or more actual repetitions.

Optionally, if the UE is configured to transmit CG-UCI in the CG PUSCH, for the CG PUSCH with the repetition type of Type-B, the UE determines CG PUSCHs in which the CG-UCI is transmitted according to at least one of the following ways: the CG-UCI being transmitted only once in one nominal repetition transmission; the CG-UCI being transmitted in every actual repetition transmission; wherein, the CG-UCI being transmitted only once in one nominal repetition transmission includes: if one nominal repetition transmission is divided into a plurality of actual repetition transmissions, selecting one actual transmission of CG PUSCH to transmit the CG-UCI, according to a predefined rule, wherein, the predefined rule is one of the following: a first actual transmission of CG PUSCH in one nominal repetition transmission; a first actual transmission of CG PUSCH in one nominal repetition transmission that contains at least X symbols; a first actual transmission of CG PUSCH in one nominal repetition transmission that actually occupies the most resources; a first actual transmission of CG PUSCH in one nominal repetition transmission that is located in uplink slots/symbols configured semi-statically.

Optionally, if the resource of an actual repetition transmission of CG PUSCH is less than the resource required by the CG-UCI, transmission of the actual repetition transmission of CG PUSCH is abandoned.

Optionally, the UE determines locations of CG PUSCH transmission occasions in one slot according to symbols occupied by a first activated CG PUSCH and a maximum number Mp of consecutive PUSCHs in one slot, wherein, a number of actual transmissions of CG PUSCH in one slot does not exceed Mp, and any CG PUSCH cannot cross boundary of the slot; wherein, in Np consecutive slots, time resource of CG PUSCH transmission occasions of each slot is the same.

Optionally, the UE determines the locations of CG PUSCH nominal transmission occasions in one CG PUSCH period, according to time resource of the first nominal repetition allocated for CG PUSCH and a number Np of slots continuously allocated in one CG PUSCH period, wherein, the determined transmission occasions are adjacent in time, and the number of slots occupied does not exceed the number Np of slots.

Optionally, the method further comprises: determining, by the UE, the locations of CG PUSCH nominal transmission occasions in one CG PUSCH period, according to time resource of the first nominal repetition allocated for CG PUSCH and a number Lp of PUSCH transmission occasions continuously allocated in one CG PUSCH period, wherein, the determined transmission occasions are adjacent in time.

Optionally, the method further comprises: in a case where resource corresponding to a nominal transmission occasion contains predefined resource that cannot be used for uplink transmission, dividing, by the UE, the nominal transmission occasion into a plurality of actual transmission occasions, such that the resource of these actual transmission occasions does not contain these symbols, wherein, the predefined resource that cannot be used for uplink transmission is determined by at least one of the following ways: the resource including minimum idle time resource Tz in channel occupancy of semi-static channel occupancy; the resource including time resource TLBT of a Listen-Before-Talk (LBT) for evaluating a channel availability before a starting point of the channel occupancy of the semi-static channel occupancy; the resource including time resource Taf in a time period after the starting point of the channel occupancy of the semi-static channel occupancy.

Optionally, the method further comprises: determining, by the UE, whether hybrid automatic repeat request acknowledgement (HARQ-ACK) of CG PUSCH included in downlink feedback information (DFI) is valid based on the DFI and DFI delay parameter N configured by the base station.

Optionally, determining whether HARQ-ACK of CG PUSCH included in DFI is valid comprises at least one of the following: for CG-PUSCH of repetition Type-B, for any nominal repetition transmission, if a first symbol of DFI is after N symbols after the end of the last symbol of this nominal repetition transmission of CG PUSCH, determining, by the UE, that HARQ-ACK of CG PUSCH included in the DFI is valid; for CG-PUSCH of repetition Type-B, for any nominal repetition transmission, if the first symbol of DFI is after N symbols after the end of the last symbol in the first actual repetition transmission of CG PUSCH of this nominal repetition transmission, and HARQ-ACK corresponding to this CG PUSCH is ACK, determining, by the UE, that ACK of this CG PUSCH included in DFI is valid, and if the first symbol of DFI is after N symbols after the end of the last symbol in this nominal repetition transmission of CG PUSCH, and the HARQ-ACK corresponding to this CG PUSCH is NACK, determining, by the UE, that the NACK of this CG PUSCH included in DFI is valid; for scheduled PUSCH of repetition Type-B, if the first symbol of DFI is after N symbols after the end of the last symbol in the first actual repetition transmission of the scheduled PUSCH, and the HARQ-ACK corresponding to this PUSCH is ACK, determining, by the UE, that the ACK of this PUSCH included in DFI is valid; for scheduled PUSCH of repetition Type-B, and if the first symbol of DFI is after N symbols after the end of the last symbol in the first nominal repetition transmission of the scheduled PUSCH, and the HARQ-ACK corresponding to this PUSCH is ACK, determining, by the UE, that the ACK of this PUSCH included in DFI is valid; for scheduled PUSCH of repetition Type-B, if the first symbol of DFI is after N symbols after the end of the last symbol in the last nominal repetition transmission of the scheduled PUSCH, and the HARQ-ACK corresponding to this PUSCH is NACK, determining, by the UE, that the NACK of this PUSCH included in DFI is valid; and for scheduled PUSCH of repetition Type-B, if the first symbol of DFI is after N symbols after the end of the last symbol in the last actual repetition transmission of the scheduled PUSCH, and the HARQ-ACK corresponding to this PUSCH is NACK, determining, by the UE, that the NACK of this PUSCH included in DFI is valid.

Optionally, the method further comprises: in a case where the repetition type is Type-B, if the UE receives the HARQ-ACK of PUSCH indicated by DFI, and the DFI indicates that the HARQ-ACK of HARQ process i is ACK, abandoning, by the UE, transmission of remaining actual repetition transmissions of HARQ process i after the DFI.

According to another aspect of the disclosure, there is provided a user equipment comprising a transceiver and a controller, the user equipment being configured to perform the above method.

According to another aspect of the disclosure, there is provided a method for transmitting configuration information, performed by a base station, comprising: configuring configuration information indicating uplink resource configuration for a user equipment (UE); transmitting the configuration information to the UE, wherein the UE determines uplink signal transmission resource based on the configuration information.

Optionally, the configuration information configured by the base station includes one or more of the following: PUCCH resource index; bandwidth of one or more uplink initial bandwidth part (BWP); physical resource block (PRB) offset; and boundary of frequency-domain resource for frequency hopping, wherein the UE determines physical uplink control channel (PUCCH) transmission resource based on the configuration information configured by the base station.

Optionally, the base station configures the PRB offset, such that the UE uses the PRB offset configured by the base station to determine the frequency-domain resource of PUCCH; or the UE determines a first PRB offset based on the PUCCH resource index, and determines the frequency-domain resource of PUCCH using the first PRB offset and the PRB offset configured by the base station.

Optionally, the method further comprises: configuring, by the base station, a plurality of sets of parameters, such that the UE selects a set of uplink initial BWP parameters from the plurality of sets of parameters configured by the base station based on UE type, and determines PUCCH resource based on the selected parameters.

Optionally, the method further comprises: if the UE needs a time gap Lgap between two frequency hoppings, determining, by the UE, the PUCCH transmission resource based on the information configured by the base station and the time gap Lgap, wherein, for a long PUCCH format, a PUCCH length of an actual transmission is obtained by subtracting the time gap Lgap from a PUCCH length determined based on the information configured by the base station, and wherein, for a short PUCCH format, a starting symbol of PUCCH of the actual transmission is Lgap symbols ahead of the starting symbol of PUCCH determined based on the information configured by the base station.

Optionally, the method further comprises: receiving, by the base station, UE type indication information from the UE through physical random access channel (PRACH) resource or through Message 3 in random access procedure, to obtain UE type related information, wherein the UE type related information includes at least one of: UE type, whether a bandwidth of the UE is limited, a bandwidth set that the UE is able to support, and whether the UE needs a time gap Lgap.

Optionally, the information configured by the base station includes at least one of: time resource information of CG PUSCH, information of repetition transmission of CG PUSCH, and information used by the UE to determine information bits of uplink control information (CG-UCI) configured in CG PUSCH, such that the UE determines transmission resource of the configured grant (CG) physical uplink shared channel (CG PUSCH), based on the information configured by the base station.

Optionally, the information of repetition transmission of CG PUSCH is used by the UE to determine whether the CG PUSCH is based on repetition, wherein, the information of repetition transmission includes at least one of: repetition Type-And number of times of repetition; wherein, if the repetition type is Type-B, each repetition is a nominal repetition, and a nominal repetition is divided into one or more actual repetitions.

Optionally, if the base station configures the UE to transmit CG-UCI in the CG PUSCH, for the CG PUSCH with the repetition type of Type-B, the UE determines CG PUSCHs in which the CG-UCI is transmitted according to at least one of the following ways: the CG-UCI being transmitted only once in one nominal repetition transmission; the CG-UCI being transmitted in every actual repetition transmission; wherein, the CG-UCI being transmitted only once in one nominal repetition transmission includes: if one nominal repetition transmission is divided into a plurality of actual repetition transmissions, selecting one actual transmission of CG PUSCH to transmit the CG-UCI, according to a predefined rule, wherein, the predefined rule is one of the following: a first actual transmission of CG PUSCH in one nominal repetition transmission; a first actual transmission of CG PUSCH in one nominal repetition transmission that contains at least X symbols; a first actual transmission of CG PUSCH in one nominal repetition transmission that actually occupies the most resources; a first actual transmission of CG PUSCH in one nominal repetition transmission that is located in uplink slots/symbols configured semi-statically.

Optionally, if the resource of one actual repetition transmission of CG PUSCH is less than the resource required by the CG-UCI, transmission of the actual repetition transmission of CG PUSCH is abandoned.

Optionally, the UE determines locations of CG PUSCH transmission occasions in one slot according to symbols occupied by a first activated CG PUSCH and a maximum number Mp of consecutive PUSCHs in one slot, wherein, a number of actual transmissions of CG PUSCH in one slot does not exceed Mp, and any CG PUSCH cannot cross boundary of the slot; wherein, in Np consecutive slots, time resource of CG PUSCH transmission occasions of each slot is the same.

Optionally, the UE determines the locations of CG PUSCH nominal transmission occasions in one CG PUSCH period, according to time resource of the first nominal repetition allocated for CG PUSCH and a number Np of slots continuously allocated in one CG PUSCH period, wherein, the determined transmission occasions are adjacent in time, and the number of slots occupied does not exceed the number Np of slots.

Optionally, the method further comprises: determining, by the UE, the locations of CG PUSCH nominal transmission occasions in one CG PUSCH period, according to time resource of the first nominal repetition allocated for CG PUSCH and a number Lp of PUSCH transmission occasions continuously allocated in one CG PUSCH period, wherein, the determined transmission occasions are adjacent in time.

Optionally, the method further comprises: in a case where resource corresponding to a nominal transmission occasion contains predefined resource that cannot be used for uplink transmission, dividing, by the UE, the nominal transmission occasion into a plurality of actual transmission occasions, such that the resource of these actual transmission occasions does not contain these symbols, wherein, the predefined resource that cannot be used for uplink transmission is determined by at least one of the following ways: the resource including minimum idle time resource Tz in channel occupancy of semi-static channel occupancy; the resource including time resource TLBT of a Listen-Before-Talk (LBT) for evaluating a channel availability before a starting point of a channel occupancy of the semi-static channel occupancy; the resource including time resource Taf in a time period after the starting point of the channel occupancy of the semi-static channel occupancy.

Optionally, the method further comprises: configuring, by the base station, downlink feedback information (DFI) and DFI delay parameter N, such that the UE determines whether hybrid automatic repeat request acknowledgement (HARQ-ACK) of CG PUSCH included in the DFI is valid based on the DFI and DFI delay parameter N configured by the base station.

Optionally, determining whether HARQ-ACK of CG PUSCH included in DFI is valid comprises at least one of the following: for CG-PUSCH of repetition Type-B, for any nominal repetition transmission, if a first symbol of DFI is after N symbols after the end of the last symbol of this nominal repetition transmission of CG PUSCH, determining, by the UE, that HARQ-ACK of CG PUSCH included in the DFI is valid; for CG-PUSCH of repetition Type-B, for any nominal repetition transmission, if the first symbol of DFI is after N symbols after the end of the last symbol in the first actual repetition transmission of CG PUSCH of this nominal repetition transmission, and HARQ-ACK corresponding to this CG PUSCH is ACK, determining, by the UE, that ACK of this CG PUSCH included in DFI is valid, and if the first symbol of DFI is after N symbols after the end of the last symbol in this nominal repetition transmission of CG PUSCH, and the HARQ-ACK corresponding to this CG PUSCH is NACK, determining, by the UE, that the NACK of this CG PUSCH included in DFI is valid; for scheduled PUSCH of repetition Type-B, if the first symbol of DFI is after N symbols after the end of the last symbol in the first actual repetition transmission of the scheduled PUSCH, and the HARQ-ACK corresponding to this PUSCH is ACK, determining, by the UE, that the ACK of this PUSCH included in DFI is valid; for scheduled PUSCH of repetition Type-B, and if the first symbol of DFI is after N symbols after the end of the last symbol in the first nominal repetition transmission of the scheduled PUSCH, and the HARQ-ACK corresponding to this PUSCH is ACK, determining, by the UE, that the ACK of this PUSCH included in DFI is valid; for scheduled PUSCH of repetition Type-B, if the first symbol of DFI is after N symbols after the end of the last symbol in the last nominal repetition transmission of the scheduled PUSCH, and the HARQ-ACK corresponding to this PUSCH is NACK, determining, by the UE, that the NACK of this PUSCH included in DFI is valid; and for scheduled PUSCH of repetition Type-B, if the first symbol of DFI is after N symbols after the end of the last symbol in the last actual repetition transmission of the scheduled PUSCH, and the HARQ-ACK corresponding to this PUSCH is NACK, determining, by the UE, that the NACK of this PUSCH included in DFI is valid.

Optionally, the method further comprises: in a case where the repetition type is Type-B, if the UE receives the HARQ-ACK of PUSCH indicated by DFI, and the DFI indicates that the HARQ-ACK of HARQ process i is ACK, the UE will abandon transmission of remaining actual repetition transmissions of HARQ process i after the DFI.

According to another aspect of the disclosure, there is provided a base station comprising a transceiver and a controller, the base station being configured to perform the above method.

According to embodiments of the disclosure, methods and devices for efficient uplink and downlink transmission are provided, so that delay can be reduced and reliability can be improved.

BRIEF DESCRIPTION OF THE DRAWINGS

The above and additional aspects and advantages of the disclosure will become more apparent and easily understood from the following description taken in conjunction with the accompanying drawings, in which:

FIG. 2B illustrates an example wireless reception path according to the disclosure;

FIG. 5 illustrates an example of determining an operating state of a timer according to the disclosure;

FIG. 7A illustrates an example of a channel access procedure for semi-static channel occupancy according to the disclosure;

FIG. 10A illustrates an example in which a base station determines time resources available for downlink signal transmission according to the disclosure;

FIG. 19 illustrates an example of CG PUSCH transmission occasions according to an embodiment of the disclosure;

FIG. 21 illustrates an example of CG PUSCH transmission resource according to an embodiment of the disclosure;

FIG. 22 illustrates an example of CG PUSCH transmission resource according to an embodiment of the disclosure;

FIG. 23 illustrates an example of CG PUSCH transmission resource according to an embodiment of the disclosure;

DETAILED DESCRIPTION

Figure 1:
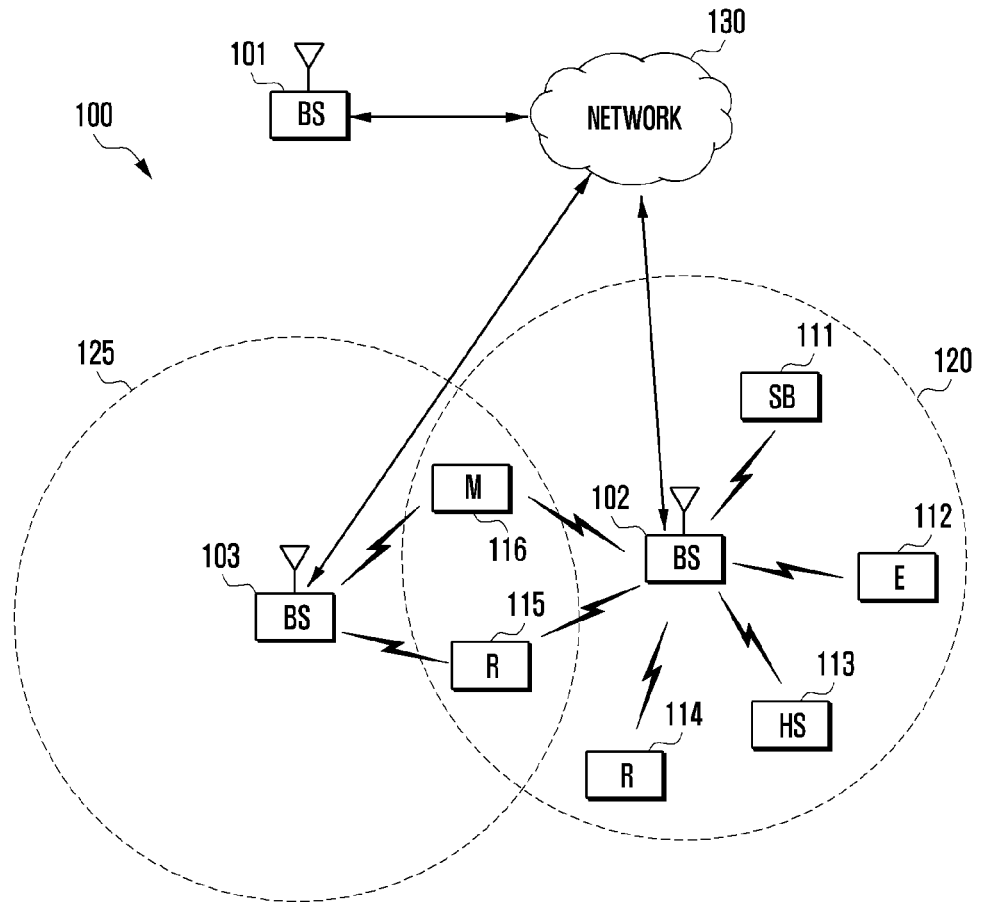
FIG. 1 illustrates an example wireless network according to various embodiments of the disclosure.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

FIGS. 1-28, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

FIG. 1 illustrates an example wireless network 100 according to various embodiments of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
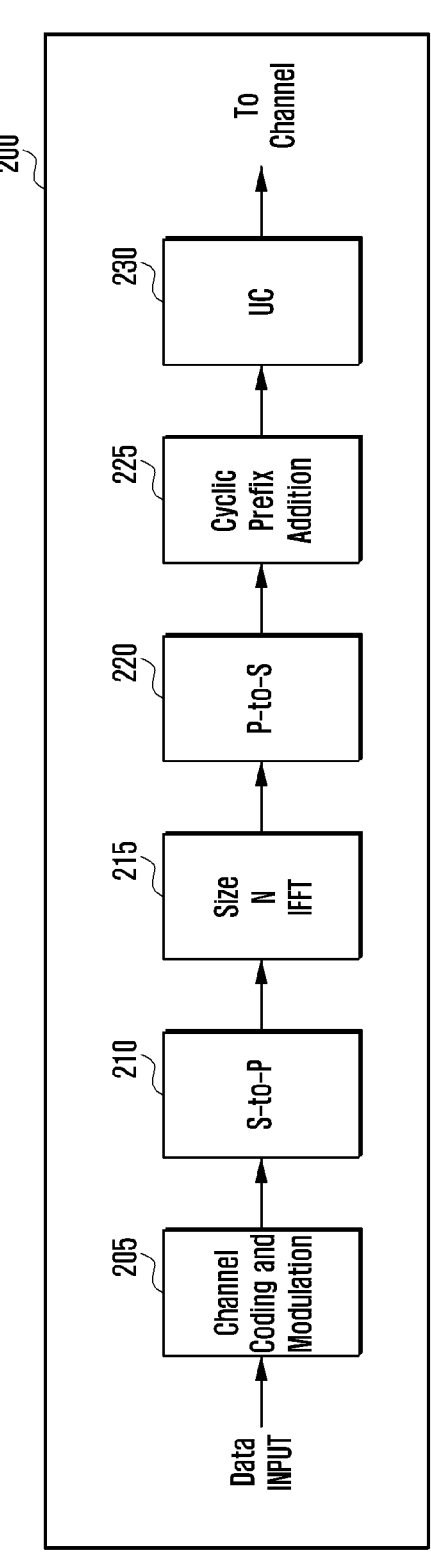
FIG. 2A illustrates an example wireless transmission path according to the disclosure.

FIGS. 2A and 2B illustrate example wireless transmission and reception paths according to the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
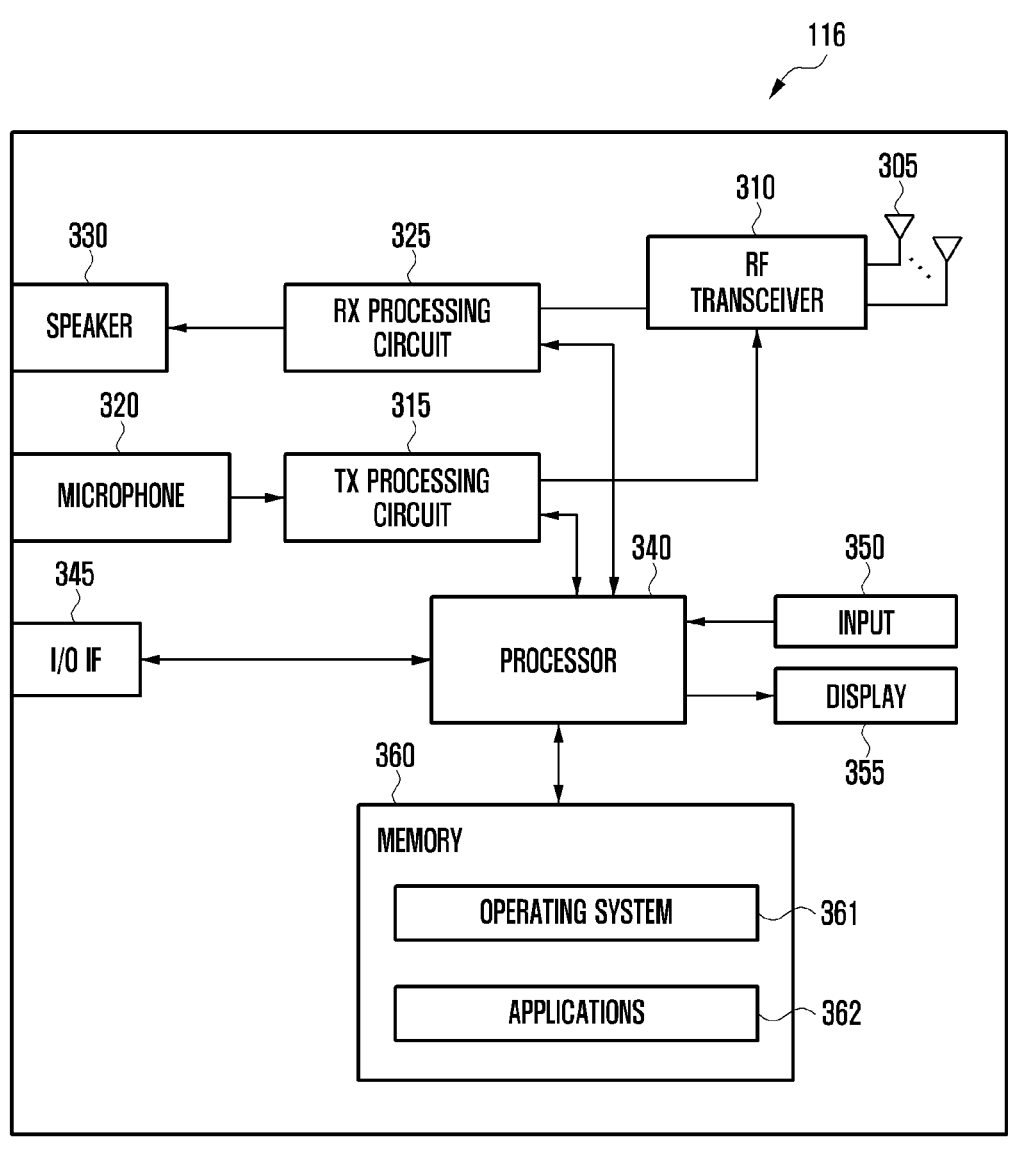
FIG. 3A illustrates an example user equipment according to the disclosure.

FIG. 3A illustrates an example UE 116 according to the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
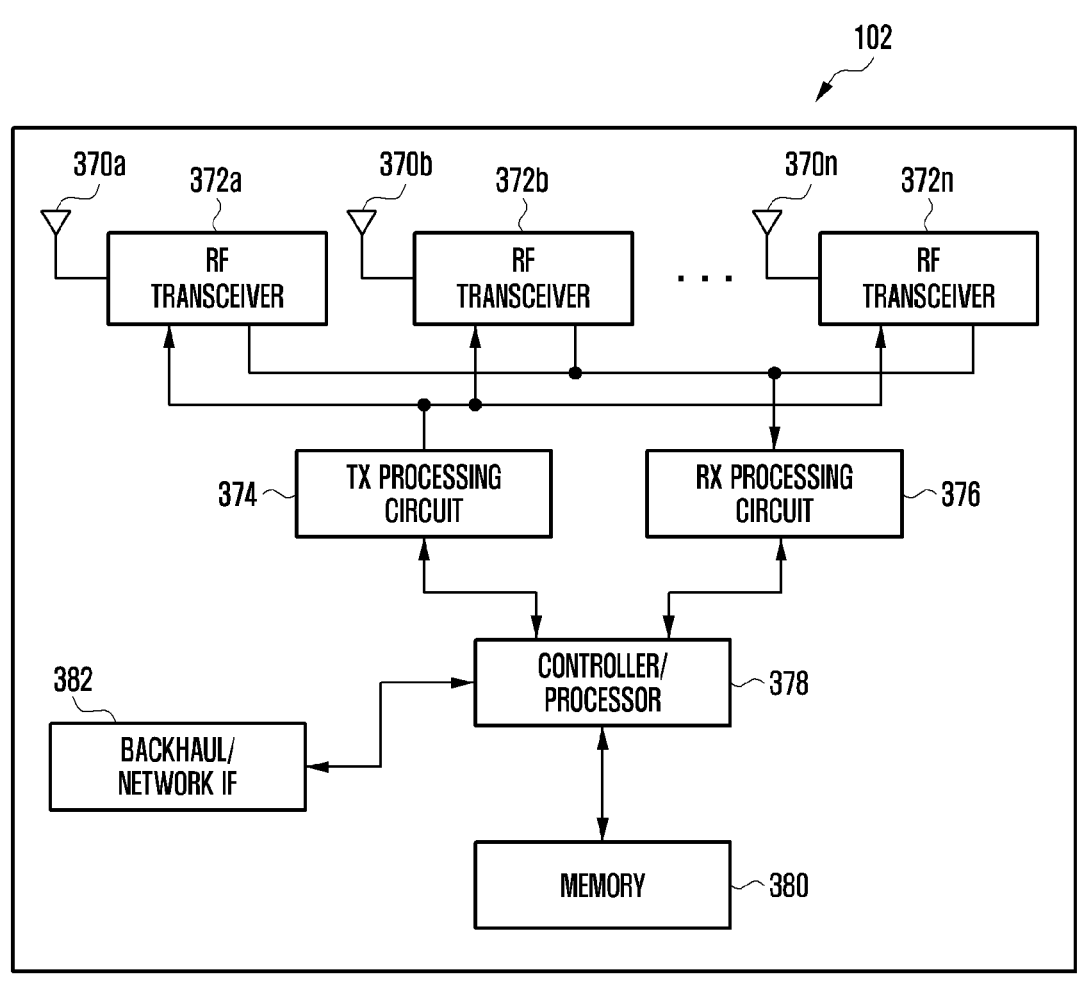
FIG. 3B illustrates an example base station according to the disclosure.

FIG. 3B illustrates an example gNB 102 according to the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the disclosure are further described below in conjunction with the accompanying drawings.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

Figure 4:
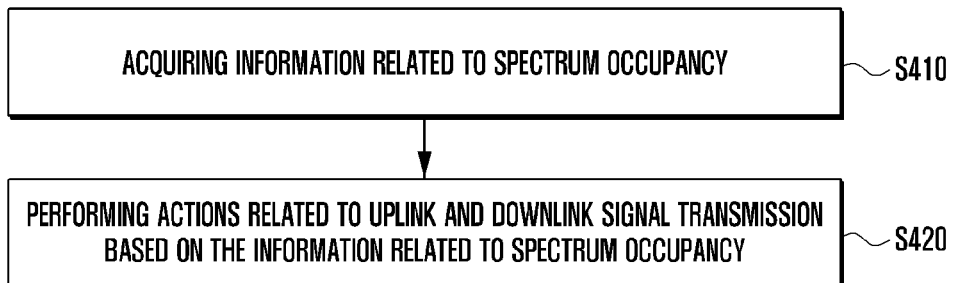
FIG. 4 illustrates a flow diagram of a transmission method performed by a user equipment UE according to an embodiment of the disclosure.

FIG. 4 illustrates a flow diagram of a transmission method in a communication system according to an embodiment of the disclosure.

In operation 5410, information related to spectrum occupancy is acquired. In operation 5420, based on the acquired information related to spectrum occupancy, actions related to uplink and downlink signal transmission are determined. The actions may be at least one of: the operating state of the timer, which is used to control the UE to enter a specific state; measuring reference signals on specific time resources; and monitoring PDCCH on specific time resources.

In a wireless communication system, a timer is used to control whether a UE or a base station enters a specific state or performs a corresponding operation, without additional signaling to indicate whether the UE or the base station enters a specific state or performs a corresponding operation. Furthermore, the timer can solve the problem of inconsistent understanding between the receiving end and the transmitting end due to missing control information at the receiving end to a certain extent. For example, in an NR system, the base station configures multiple BWPs for the UE, and the base station indicates which active BWP the UE operates on through physical layer signaling carried by PDCCH. If the UE miss-detects the PDCCH and fails to switch to the BWP indicated by the base station for receiving or transmitting, the UE may not receive signals from the base station within a period of time, because the base station transmits signals on another BWP. In an NR system, a bwp-InactivityTimer is introduced, that is, when the bwp-InactivityTimer expires on the current BWP but PDCCH has not been received on this BWP, the UE switches to a default BWP. The base station and the UE have the same understanding of the default BWP, so the problem of BWP misalignment can be solved.

When a serving cell operates in a spectrum sharing mode of unlicensed frequency bands or licensed frequency bands, because the base station cannot guarantee that it can occupy spectrum resources to transmit signals within a period of time, the UE cannot receive signals from the base station within this period of time. In this case, if the timer continue to count and eventually expires, it will lead to unnecessary state changes and reduce operating efficiency. For example, assume that UE operates on carrier 1, including 2 BWPs, in which BWP1 is a preset BWP with a smaller bandwidth, and BWP2 is with a larger bandwidth. The UE is scheduled by the base station to operate on BWP2, and the UE successfully receives the PDCCH indicating BWP2. However, then the base station's failing to occupy the frequency domain resources of carrier 1 within a period of time causes the bwp-InactivityTimer to expire, making the UE to switch onto the preset BWP1. The base station then successfully occupies the frequency domain resources of carrier 1. In this case, if the base station wants to transmit a large amount of downlink data for the UE immediately, the base station also needs to transmit PDCCH on BWP1 to schedule the UE to switch onto BWP2 to receive downlink data. As the BWP switching for the UE is also in need of time, the whole transmission efficiency is reduced.

In order to avoid unnecessary timer expiring due to the base station not occupying spectrum resources, the UE may determine whether it is necessary to suspend the timer according to the information related to spectrum occupancy. For example, taking indication information of spectrum resource occupied by the base station transmitted by the base station as the information related to spectrum occupancy, the UE suspends the timer upon determining that the base station stops occupying spectrum according to the information related to spectrum occupancy, and the UE may continue to run the timer upon determining that the base station occupies spectrum according to the information related to spectrum occupancy.

As shown in FIG. 5, three base stations (base stations 1, 2 and 3) operate in the licensed frequency band and share the same carrier resource. At the beginning of each time period P (e.g., P1, P2, . . . ), the three base stations coordinate the time and frequency domain resources of this carrier occupied by respective ones, and inform each other of the time and frequency domain resources of this carrier occupied by respective ones in this period.

Taking the UE in the case of base station 1 as an example, the base station configures a timer T1 for the UE. The information related to spectrum occupancy is resource indication information transmitted by the base station. The UE suspends the timer T1 at time t1 according to the received indication information of the occupied time frequency domain resources by base station 1, and does not start to resume running the timer t1 until time t2 within the next period P2.

In order to avoid unnecessary state switching for the UE due to the base station not occupying frequency domain resources, and to give the base station a certain degree of freedom to control the state switching for the UE at the same time, the UE determines whether to suspend the first type of timer according to the information related to spectrum occupancy. The UE does not determine whether to suspend the second type of timer according to the information related to spectrum occupancy. The first type of timer includes at least one of the following timers:

1. A timer based on configured grant PUSCH (configuredGrantTimer)

When the configuredGrantTimer for one HARQ process expires, the HARQ process is assumed to be successfully received, and the UE assumes the HARQ-ACK for the HARQ process to be ACK. Assume that UE has transmitted CG PUSCH for HARQ process i, and the base station fails to demodulate it correctly. The base station is not able to transmit PDCCH to schedule a retransmission of PUSCH for HARQ process i due to the base station's failing to occupy the spectrum resources within a period of time, the configuredGrantTimer expires, and the UE assumes the HARQ-ACK for the HARQ process to be ACK, which causes the base station to be not able to retransmit the PUSCH for HARQ process i after subsequently occupying spectrum resources. According to the method of the present invention, if the UE receives the resource indication information transmitted by the base station, and the UE starts the configuredGrantTimer after transmitting the CG PUSCH and suspends the configuredGrantTimer in the time point of the unoccupied spectrum resources indicated by the base station, for example, in FIG. 5, suspending the configuredGrantTimer at time t1 and not to start to continue running the configuredGrantTimer until time t2, the base station may transmit PDCCH to schedule the retransmission of CG PUSCH after time t2 and before the configuredGrantTimer expires, so that the HARQ process of the CG PUSCH is not affected by the discontinuous transmission of the base station.

2. A retransmission timer based on configured grant PUSCH (cg-RetransmissionTimer)

When the cg-RetransmissionTimer of one HARQ process expires, the HARQ process is assumed to be not successfully received, and the UE assumes the HARQ-ACK for the HARQ process to be NACK, and the UE retransmits the PUSCH for this HARQ process. Assume that UE has transmitted CG PUSCH for HARQ process i, and the base station demodulates it correctly. The base station is not able to transmit ACK information for this HARQ process due to the base station's failing to occupy spectrum resources within a period of time, the cg-RetransmissionTimer expires, and the UE retransmits the HARQ process, resulting in unnecessary retransmission and lower transmission efficiency. According to the method of the present invention, if the UE receives the resource indication information transmitted by the base station, and the UE starts the cg-RetransmissionTimer after transmitting the CG PUSCH and suspends the cg-RetransmissionTimer in the time point of the unoccupied spectrum resources indicated by the base station, for example, in FIG. 5, suspending the cg-RetransmissionTimer at time t1 and not to start to continue running the cg-RetransmissionTimer until time t2, the base station may transmit PDCCH containing the ACK information for this HARQ process after time t2 and before the cg-RetransmissionTimer expires, so as to avoid unnecessary retransmission of CG PUSCH for this HARQ process by the UE.

Preferably, the time in which the base station does not occupy the spectrum may be determined according to the information related to spectrum occupancy. In order to avoid a too long latency for one HARQ process due to the base station not occupying the channel for a long time, the UE does not suspend or continue the cg-RetransmissionTimer or configuredGrantTimer according to the resource indication information transmitted by the base station. However, the UE may determine whether the cg-RetransmissionTimer or configuredGrantTimer has expired, according to the timing of the timer extended with a maximum tolerable time extension configured by the base station. For example, the timing of the timer is 10 ms, and the maximum tolerable time extension is 5 ms. In this case, if the base station occupies the spectrum in the 1st-7th ms, while does not occupy the spectrum in the 8th-14th ms, and the timing of the timer is extended to be 15 ms, when the base station occupies the spectrum to transmit HARQ information in the 15th ms, the timer is assumed to be not expired, where the time extension is a time extension due to the base station not occupying the spectrum, and the maximum value of this time extension is configured by the base station or predefined by standards. The time at which the base station does not occupy the spectrum may be determined according to the resource indication information transmitted by the base station.

3. A BWP inactivity timer (bwp-InactivityTimer)

4. A secondary cell deactivation timer (sCellDeactivationTimer)

If within a period of time (sCellDeactivationTimer) the UE does not receive any PDCCH or PDSCH, or does not transmit any PUSCH, when the sCellDeactivationTimer UE expires, the Scell is deactivated, and the UE does not receive PDCCH/PDSCH of this Scell, measure CSI of this Scell, or transmit PUSCH/PRACH/PUCCH/SRS on this Scell. Assume that the base station is not able to transmit PDCCH or PDSCH due to the base station's failing to occupy the spectrum resources within a period of time, or the UE has no resources to transmit PUSCH, which causes the UE to automatically deactivate this Scell. When the base station obtains the spectrum resources of this Scell again, the base station needs to reactivate this Scell for the UE, resulting in longer time delay and lower transmission efficiency. According to the method of the present invention, if the UE receives the resource indication information transmitted by the base station, the UE suspends the sCellDeactivationTimer at the time point indicated by the base station for not occupying spectrum resources, and continues to run the sCellDeactivationTimer at the time point indicated by the base station for occupying spectrum resources, thus avoiding unnecessary Scell deactivation.

5. A search space switching timer (searchSpaceSwitchingTimer)

6. A timer for counting continuous asynchronization or synchronization, such as timer T307 or T313

7. A random access response window, ra-ResponseWindow, for receiving a random access response If the UE has not received a RAR response yet at the end of the ra-ResponseWindow, it is assumed that the reception of the RAR response has failed, and the PREAMBLE_TRANSMISSION_COUNTER is increased by 1. Assume that the base station is not able to transmit PDCCH or PDSCH due to the base station's failing to occupy the spectrum resources within a period of time, which causes the UE to receive no RAR response at the end of the ra-ResponseWindow, the PREAMBLE_TRANSMIS-SION_COUNTER is increased by 1, and the UE retransmits the PRACH, thus reducing the efficiency of random access procedure. According to the method of the present invention, if the UE receives the resource indication information transmitted by the base station, the UE suspends the ra-Respon-seWindow at the time point indicated by the base station for not occupying the spectrum resources, and continues the ra-ResponseWindow at the time point indicated by the base station for occupying the spectrum resources, thus avoiding unnecessary PRACH retransmission. It is not difficult to see that a time window may also be regarded as a kind of timer in a broad sense.

8. A timer configured by the base station that needs to be determined whether to be suspended according to the information related to spectrum occupancy In a wireless communication system, UE generally needs to measure the radio resources of the serving cell or neighboring cell. For example, in order for radio resource management, UE needs RRM (radio resource management) measurement, or in order for radio link quality monitoring, UE needs RLM (Radio link monitoring) measurement, or in order for radio channel status monitoring, UE needs CSI (Channel State Information) measurement. The UE may perform radio resource measurement based on specific reference signals. For example, measurement is carried out based on synchronization signal block (SSB) or CSI-RS (channel state information-reference signal). The base station configures periodic reference signals for the UE, and the UE determines the time and frequency domain resources for receiving the reference signals according to the configuration information, and performs measurements. And the UE reports the measurement results within a predefined time period, for example, in RLM, the physical layer of the UE evaluates the radio link quality based on CSI-RS or SSB within a predefined time period, and reports the results to the higher layer. When the serving cell operates in the spectrum sharing mode of the unlicensed frequency bands or the licensed frequency bands, because the base station cannot guarantee to occupy spectrum resources to transmit signals on the time resources of the corresponding reference signals, the UE cannot obtain accurate measurement results on the corresponding time resources based on the reference signals.

In order to avoid inaccurate measurement results affecting the accuracy of radio resource measurement and to decrease the waste of power of the useless measurements by the UE, the UE may determine whether it is necessary to measure reference signals on specific time resources according to information related to spectrum occupancy.

In order to coordinate the utilization of spectrum resources among respective transmitting nodes, According to an implementation, each transmitting node transmits information related to the spectrum occupancy of this node, for example, the time of planned frequency domain resources to be occupied and the frequency domain resource information. The time of planned frequency domain resources to be occupied and the frequency domain resource information are not only received by each transmitting node, but also received by the terminal UE served by the transmitting node. The terminal UE uses the received information related to the node's spectrum occupancy (e.g., the time of planned frequency domain resources to be occupied and the frequency domain resource information) as the information related to spectrum occupancy, and determines whether it is necessary to measure the reference signals on specific time resources.

Figure 6:
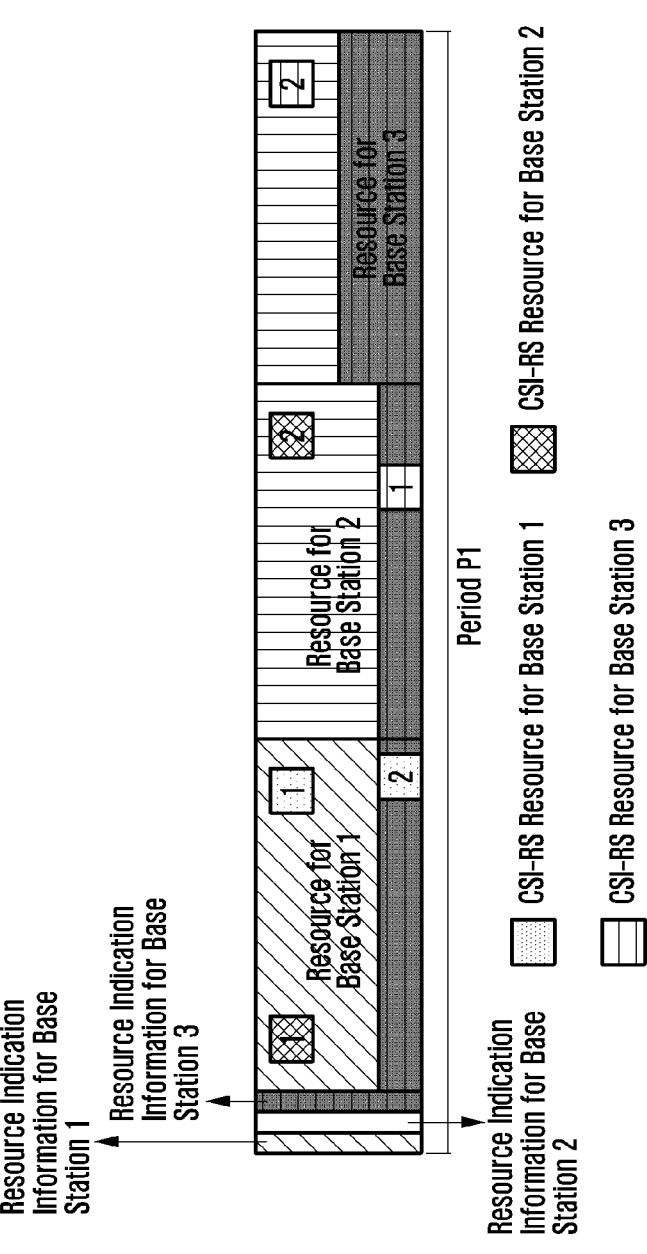
FIG. 6 illustrates an example of determination of measuring reference signals and/or monitoring PDCCH according to the disclosure.

As shown in FIG. 6, three base stations (base stations 1, 2 and 3) operate in the licensed frequency band and share the same carrier resource. At the beginning of each time period P (e.g., P1, . . . ), the three base stations coordinate the time and frequency domain resources of this carrier occupied by respective ones, and inform each other of the time and frequency domain resources of this carrier occupied by respective ones in this period. Assume that each base station has CSI-RS resources respectively for radio resource measurement of this base station. The UE determines the time-frequency domain resources occupied by this base station according to the resource indication information transmitted by the base station, and according to the configured CSI-RS resources, determines whether the CSI-RS resources of this base station are located in the time-frequency domain resources occupied by this base station. If the CSI-RS resources of this base station are located in the time-frequency domain resources occupied by this base station, the UE may measure based on the CSI-RS, otherwise, the UE does not measure based on the CSI-RS. For example, according to the resource indication information transmitted by base station 1 and the configured two sets of CSI-RS resources of base station 1, the terminal UE served by base station 1 determines that the first set of CSI-RS resources of base station 1 is located in the time-frequency domain resources occupied by base station 1 and may be measured, while the second set of CSI-RS resources is not located in the time-frequency domain resources occupied by base station 1, so the CSI-RS is not measured by the UE.

According to an implementation, if the base station has no plan to occupy the time-frequency domain resources within period P1, the base station may not transmit the resource indication information. If the UE does not receive the resource indication information transmitted by the base station, the UE assumes that the base station does not transmit any signal within this period P1, so the UE may also not measure the reference signals within this period P1.

In an actual system, UE may miss the resource indication information transmitted by the base station, that is, the base station has transmitted a resource indication information but the UE does not receive this resource indication information. In order to prevent the UE from missing valid reference signals, when the UE does not receive the resource indication information transmitted by the base station, the UE measures the reference signals within the time-frequency domain resources potentially occupied by the base station. For example, the UE measures the reference signals within this period P1. For another example, the UE does not receive the resource indication information of base stations 1 and 3, but receives the resource indication information of base station 2, and the UE is configured to measure based on two sets of CSI-RS resources of base station 2 and two sets of CSI-RS resources of base station 3. The UE measures the second set of CSI-RSs of base station 2 according to the resource indication information of base station 2, and does not measure the first set of CSI-RSs of base station 2. Since the time-frequency domain resources occupied by base station 2 will not be occupied by base station 1 or 3, the UE may judge according to the resource indication information of base station 2 that the second set of CSI-RSs of base station 3 need not be measured, but the UE needs to measure the first set of CSI-RSs of base station 3.

Preferably, the UE reports the measurement results and reports the measurement environment. For example, the measurement environment is that the reference signal is located within the resource determined by the resource indication information transmitted by the base station, or the measurement environment is that the UE does not receive the resource indication information transmitted by the base station.

In a wireless communication system, UE generally needs to periodically monitor control channels, such as PDCCH. In order to save UE power, the UE may determine whether it is necessary to receive PDCCH on specific time resources based on the information related to spectrum occupancy. For example, the UE determines the time-frequency domain resources occupied by the base station according to the resource indication information transmitted by this base station, and determines whether the PDCCH resources to be monitored are located in the time-frequency domain resources occupied by this base station according to the configured PDCCH monitoring resources. If the PDCCH resources to be monitored are located in the time-frequency domain resources occupied by this base station, the UE performs PDCCH monitoring. If the PDCCH resources to be monitored are located outside the time-frequency domain resources occupied by this base station, the UE does not perform PDCCH monitoring.

According to an implementation, if the base station has no plan to occupy time-frequency domain resources in period P1, the base station may not transmit resource indication information. If the UE does not receive the resource indication information transmitted by the base station, the UE assumes that the base station does not transmit any signal in this period P1, so the UE may also not measure the PDCCH in this period P1.

In an actual system, the UE may miss the resource indication information transmitted by the base station, and the UE does not receive the resource indication information. In order to avoid performance degradation due to the UE missing the PDCCH, the UE monitors the PDCCH within the time-frequency domain resources potentially occupied by the base station.

In order to save UE power and prevent the UE from missing important control information, when the UE does not receive the resource indication information indicated by the base station, the UE monitors the first type of PDCCH, while the UE does not monitor the second type of PDCCH. The first type of PDCCH is at least one of the following PDCCHs:

1. PDCCH located in Type-0 PDCCH common search space CSS
2. PDCCH located in Type-0A PDCCH common search space CSS
3. PDCCH located in Type-1 PDCCH common search space CSS
4. PDCCH located in Type-2 PDCCH common search space CSS
5. PDCCH located in Type-3 PDCCH common search space CSS
6. PDCCH in a specific DCI format
7. PDCCH for a specific function
8. PDCCH scrambled by a specific RNTI
9. PDCCH configured by the base station that needs to be monitored even if the UE does not receive the information related to spectrum occupancy In the spectrum sharing of the unlicensed frequency bands or licensed frequency bands, Listen Before Talk (LBT) is a way of spectrum resource coordination. Before using a spectrum resource, a transmitting node first evaluates whether it is idle on the spectrum resource, for example, by comparing energy detection results for the spectrum resource with a predefined threshold to determine whether it is idle on the spectrum resource. In some application scenarios, the transmitting node may periodically evaluate the spectrum resources and determine whether to occupy the spectrum resources in this period, which is referred to for short as channel access procedures for semi-static channel occupancy. For example, with a period of 5 ms, LBT is performed before the starting point of each period. If the LBT is successful, the transmitting node may use the spectrum resources within the 5 ms, but must stop using the spectrum resources within a time Tz (also called idle period) before the beginning of the next period of 5 ms, as shown in FIG. 7A.

Figure 7B:
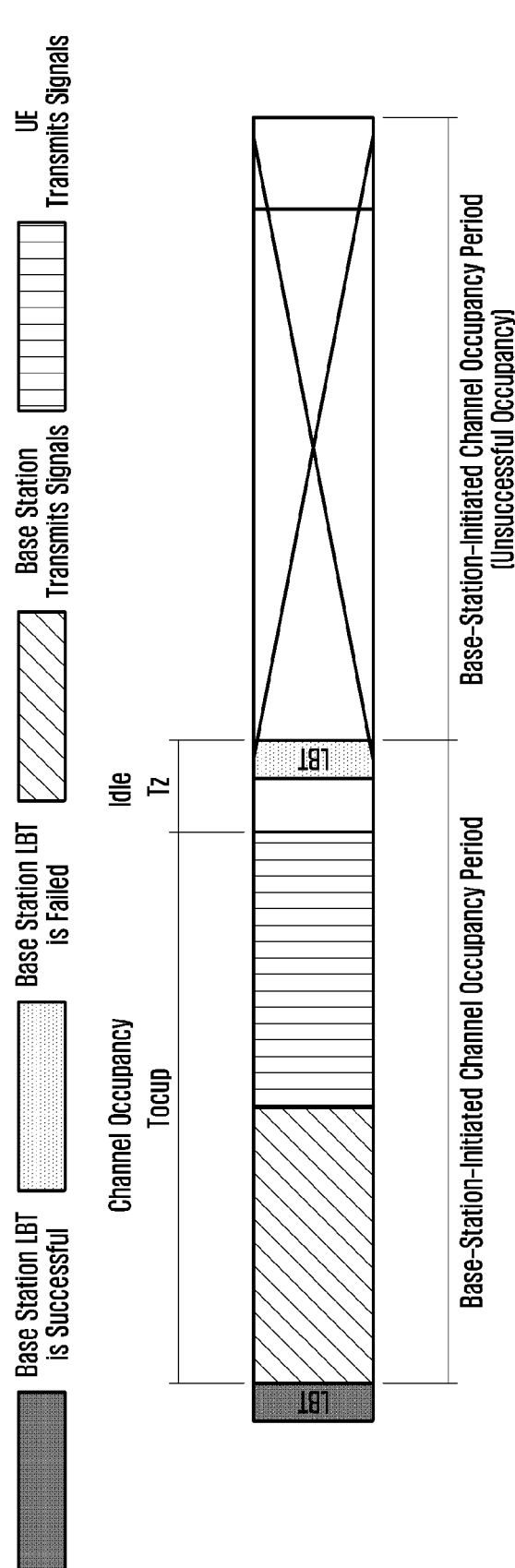
FIG. 7B illustrates an example of transmitting an uplink signal according to a first kind of operating mode according to the disclosure.

According to a first kind of implementation mode, the base station occupies a frequency spectrum according to the channel access procedures for semi-static channel occupancy described above. If the base station successfully occupies the channel, the UE served by this base station may also transmit and receive in this period. If the base station fails to occupy the channel, the UE served by this base station may not transmit or receive in this period. This implementation is also referred to as an operating mode in which the base station initiates channel occupancy and shares the channel with the UE. The operating mode includes the configuration information of the base-station-initiated channel occupancy, as shown in FIG. 7B.

Figure 7C:
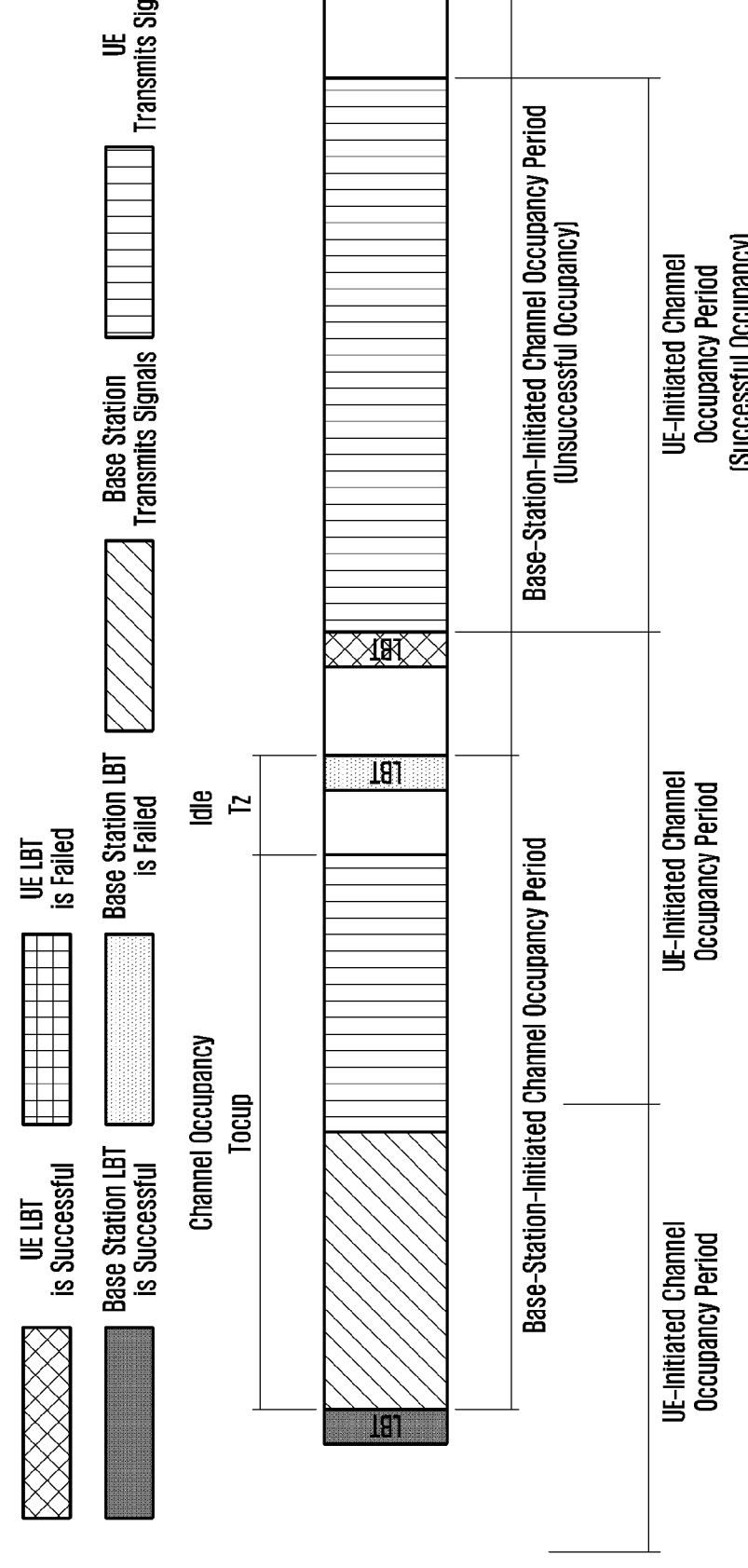
FIG. 7C illustrates an example of transmitting an uplink signal according to a second kind of operating mode according to the disclosure.

According to a second kind of implementation mode, the UE occupies a channel according to the channel access procedures for semi-static channel occupancy. Even if the base station fails to occupy the channel to initiate a channel occupancy, if the UE successfully completes the LBT, it may occupy the spectrum and transmit signals. This implementation is also referred to as an operating mode of UE-initiated channel occupancy, and the operating mode includes the configuration information of the UE-initiated channel occupancy, as shown in FIG. 7C.

In the first/second kind of mode, if there is a downlink signal/uplink signal to be transmitted at the starting point of the corresponding channel occupancy, the base station/UE may initiate channel occupancy; if there is a downlink signal/uplink signal to be transmitted at a position other than the starting point of the corresponding channel occupancy, the downlink signal/uplink signal cannot be used to initiate channel occupancy by the base station/UE.

Preferably, the information related to spectrum occupancy may include an operating mode indicating that spectrum resources are occupied based on semi-static channels, in which the operating mode indicating that spectrum resources are occupied based on semi-static channels includes configuration information for base-station-initiated and/or UE-initiated channel occupancy The UE may transmit uplink signals based on the information related to spectrum occupancy. According to one aspect of the present invention, for transmission of the first type of uplink signals, the UE transmits the first type of uplink signals according to the first kind of implementation mode, and for transmission of the second type of uplink signals, the UE transmits the second type of uplink signals according to the second kind of implementation mode, in which the second type of uplink signals include at least one of the following uplink signals:

1. PRACH
2. Msg A PRACH
3. Msg A PUSCH
4. All uplink signals of random access procedure
5. PRACH of contention-based random access procedure 6. Msg A PRACH of contention-based random access procedure 7. Msg A PUSCH of contention-based random access procedure 8. All uplink signals of contention-based random access procedure 9. Configured grant PUSCH (CG PUSCH)

10. CG PUSCH with a specific priority

11. Uplink signals configured by the base station for uplink transmission according to a second kind of implementation mode Preferably, the base station configures uplink signals for uplink transmission according to the second kind of implementation mode, in which the configuring may be for respective resources or configurations, respectively. For example, the base station configures two SR resources for the UE, and for each SR resource, configures whether the PUCCH of this SR resource is uplink transmitted according to the second kind of implementation mode. For another example, the base station configures two SPS PDSCH configurations (e.g., SPS-config), and for each SPS PDSCH resource, configures whether the PUCCH of this SPS PDSCH configuration is uplink transmitted according to the second kind of implementation mode. For another example, the base station configures a plurality of CG PUSCH configurations, and for each CG PUSCH configuration (e.g., ConfiguredGrantConfig), configures whether the PUSCH of the CG PUSCH configuration is uplink transmitted according to the second kind of implementation mode.

Preferably, the base station configures uplink signals for uplink transmission according to the second kind of implementation mode, in which the configuring may be for signal types. For example, if the base station configures SR PUCCH for uplink transmission according to the second kind of implementation mode, PUCCH of respective SR resource may be uplink transmitted according to the second kind of implementation mode. For another example, if the base station configures CG PUSCH for uplink transmission according to the second kind of implementation mode, respective CG PUSCH may be uplink transmitted according to the second kind of implementation mode.

12. PUCCH carrying a SR.

13. PUCCH carrying a SR with a specific priority

By supporting one or all of the uplink signals in the random access procedure to be transmitted according to the operating mode of UE-initiated channel occupancy, the time delay of the random access procedure may be shortened and the assistance degree of the random access procedure may be reduced.

By supporting CG PUSCH to be transmitted according to the operating mode of UE-initiated channel occupancy, the signaling overhead of the base station may be decreased, the time delay of the CG PUSCH transmission may be shortened, and the URLLC/IIoT traffic may be better supported. Similarly, by supporting the PUCCH carrying a SR to be transmitted according to the operating mode of UE-initiated channel occupancy, the time delay may also be reduced and the signaling overhead of the base station may be decreased.

The operating mode of the UE is indicated in cell-common signaling and/or UE-specific signaling, for example, it is indicated in system information that the UE performs transmission of uplink signals according to the operating mode in which the base station initiates channel occupancy and shares the channel with the UE and/or the operating mode of UE-initiated channel occupancy.

Configuration information for channel occupancy, for example, period information for channel occupancy, is indicated in cell-common signaling and/or UE-specific signaling. Preferably, the configuration information of channel occupancy for the operating mode of UE-initiated channel occupancy includes the period information for channel occupancy and the starting point information of the period, such as the offset relative to a reference time point. For example, the reference time point is the starting point of an even indexed radio frame. Preferably, the UE does not receive the configuration information of UE-specific signaling, and determines the parameters of the UE-initiated channel occupancy according to the configuration information of cell-common signaling. If the UE receives the configuration information of the UE-specific signaling, the UE determines the parameters of the UE-initiated channel occupancy according to the configuration information of the UE-specific signaling. Preferably, when the UE operates in a RRC idle or RRC inactive state, the UE determines the parameters of the UE-initiated channel occupancy according to the configuration information of the cell-common signaling, for example, determines the parameters of the UE-initiated channel occupancy according to the configuration information in the system information. Preferably, when the UE operates in the RRC idle or RRC inactive state, the UE determines the parameters of the UE-initiated channel occupancy according to the configuration information of the UE-specific signaling last received in the connected state. Preferably, when the UE performs contention-based random access, the parameters of the UE-initiated channel occupancy are determined according to the configuration information of the cell-common signaling. The UE may be in RRC connected state or RRC idle/inactive state.

Preferably, when two operating modes are indicated in cell-common signaling and/or UE-specific signaling, the configuration information of channel occupancy for the two operating modes is acquired; or one set of configuration information of channel occupancy applicable to both operating modes is acquired; or one set of configuration information of channel occupancy applicable to one kind of the modes is acquired, and then configuration information of channel occupancy for another kind of the modes is determined based on predefined rules. For example, the configuration information of channel occupancy indicated in the system information is applicable to the operating mode in which the base station initiates channel occupancy and shares the channel with the UE, while configuration information of channel occupancy for the operating mode of UE-initiated channel occupancy is determined according to predefined rules.

Determining configuration information of channel occupancy according to predefined rules comprises at least one of:

If the base station configures the operating mode in which the base station initiates channel occupancy and shares the channel with the UE as well as the operating mode of UE-initiated channel occupancy, the time length of the channel occupancy of the operating mode of UE-initiated channel occupancy cannot exceed the time length of the base-station-initiated channel occupancy, and the UE cannot continuously transmit signals in two periods spanning the base-station-initiated channel occupancy.

For example, the base-station-initiated channel occupancy period is 5 ms (assuming that the carrier interval is 15 KHz and the channel occupancy period is 5 slots). The first period of the channel occupancy is the 1st-5th slot, and the second period is the 6th-10th slot. If the UE-initiated channel occupancy starts from the third slot in the first period, the channel occupancy ends before the end of the fifth slot, and cannot continue until the sixth slot.

According to the time resource of the uplink signal or at least one of the period information, starting point and offset of the base-station-initiated channel occupancy, the period information of the UE-initiated channel occupancy is determined.

For example, the uplink signal is CG PUSCH, and the period of CG PUSCH is the period of UE-initiated channel occupancy, or an integer multiple of the period of CG PUSCH is the period of UE-initiated channel occupancy. For example, when the uplink signal is PRACH, the period of RACH resource is the period of UE-initiated channel occupancy. One implementation way to determine the period of UE channel occupancy according to the period of RACH resource is that the UE determines the starting point of the period of UE channel occupancy according to the starting point of time resource of the selected PRACH opportunity (RO) to be transmitted. Preferably, the UE channel occupancy period is determined according to the association pattern period from SSB to PRACH. Preferably, the channel occupancy period of UE is a divisor of the association pattern period, that is, the association pattern period is a multiple of the channel occupancy period.

Preferably, the UE determines the UE-initiated channel occupancy period according to the UE-initiated channel occupancy period indicated by the base station, and determines the starting point of the UE channel occupancy period according to the starting point of time resource of the PRACH opportunity (RO) selected by the UE for transmission.

Preferably, the UE determines the UE-initiated channel occupancy period by selecting one period from the predefined period set as the UE-initiated channel occupancy period, and determines the starting point of the UE channel occupancy period according to the starting point of time resource of the PRACH opportunity (RO) selected by the UE for transmission. Preferably, the period and starting point of the base-station-initiated channel occupancy and the period and starting point of the UE-initiated channel occupancy are the same.

Preferably, the starting point of the base-station-initiated channel occupancy is different from the starting point of the UE-initiated channel occupancy. The base station configures or the standard specifies the minimum of the offset between the starting point of the UE-initiated channel occupancy and the starting point of the base-station-initiated channel occupancy.

Figure 8A:
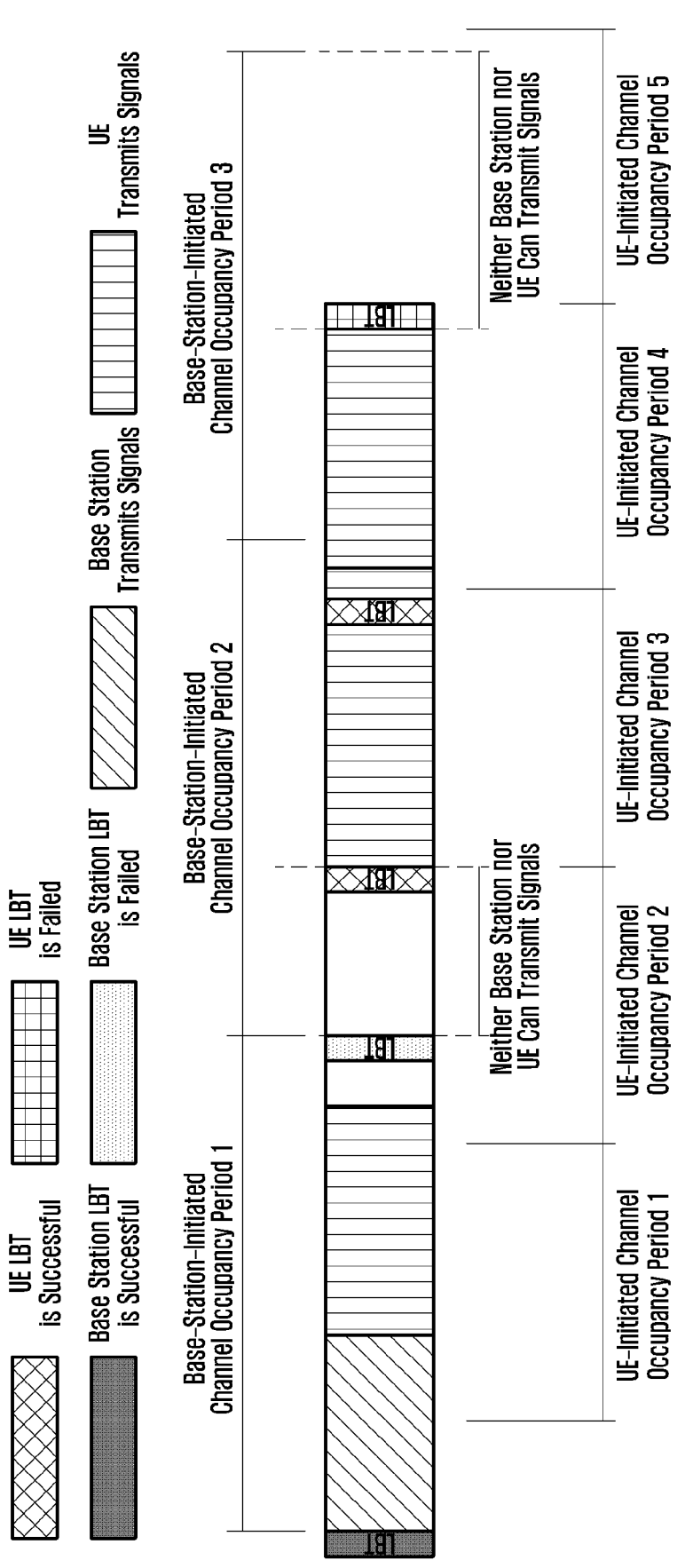
FIG. 8A illustrates an example of determining UE-initiated channel occupancy according to the disclosure.

When a base station or UE transmits a signal, preferably, if one UE is configured with both the operating mode of base-station-initiated channel occupancy and the operating mode of UE-initiated channel occupancy, and if a period of time resources are neither within the channel occupancy period successfully obtained by the base station nor within the channel occupancy period successfully obtained by the UE, neither the base station nor the UE can transmit signals within the period of time resources. If a period of time resources are at least within the channel occupancy period successfully obtained by the base station or UE, the base station and UE may transmit signals within this period of time resources. As shown in FIG. 8A, the base station succeeds in the LBT before the starting point of base-station-initiated channel occupancy period 1, the base station transmits downlink signals within base-station-initiated channel occupancy period 1, and the UE transmits uplink signals within base-station-initiated channel occupancy period 1. The base station fails in the LBT before the starting point of base-station-initiated channel occupancy period 2, and the UE succeeds in the LBT before the starting point of UE-initiated channel occupancy period 3. Neither the UE nor the base station can transmit signals before the starting point of base-station-initiated channel occupancy period 2 to the starting point of UE-initiated channel occupancy period 3, and the UE may start transmitting signals at the starting point of UE-initiated channel occupancy period 3. The UE succeeds in the LBT again before the starting point of UE-initiated channel occupancy period 4, and the UE may start transmitting signals at the starting point of UE-initiated channel occupancy period 4. Since the base station does not perform the LBT before the starting point of base-station-initiated channel occupancy period 3, and the UE fails in the LBT before the beginning of UE-initiated channel occupancy period 5, neither the UE nor the base station can transmit signals before the starting point of UE-initiated channel occupancy period 5 to the starting point of base-station-initiated channel occupancy period 4.

Preferably, the UE cannot perform uplink transmission on specific time resources. The specific time resources are determined according to at least one of the following rules:

Rule 1: the specific time resources are a period of time resources before the starting point of the UE-initiated channel occupancy.

For example, within time Tz (also called idle period) before the starting point of the UE-initiated channel occupancy.

Rule 2: The specific time resources are a period of time resources before and/or after the starting point of the base-station-initiated channel occupancy.

Figure 8B:
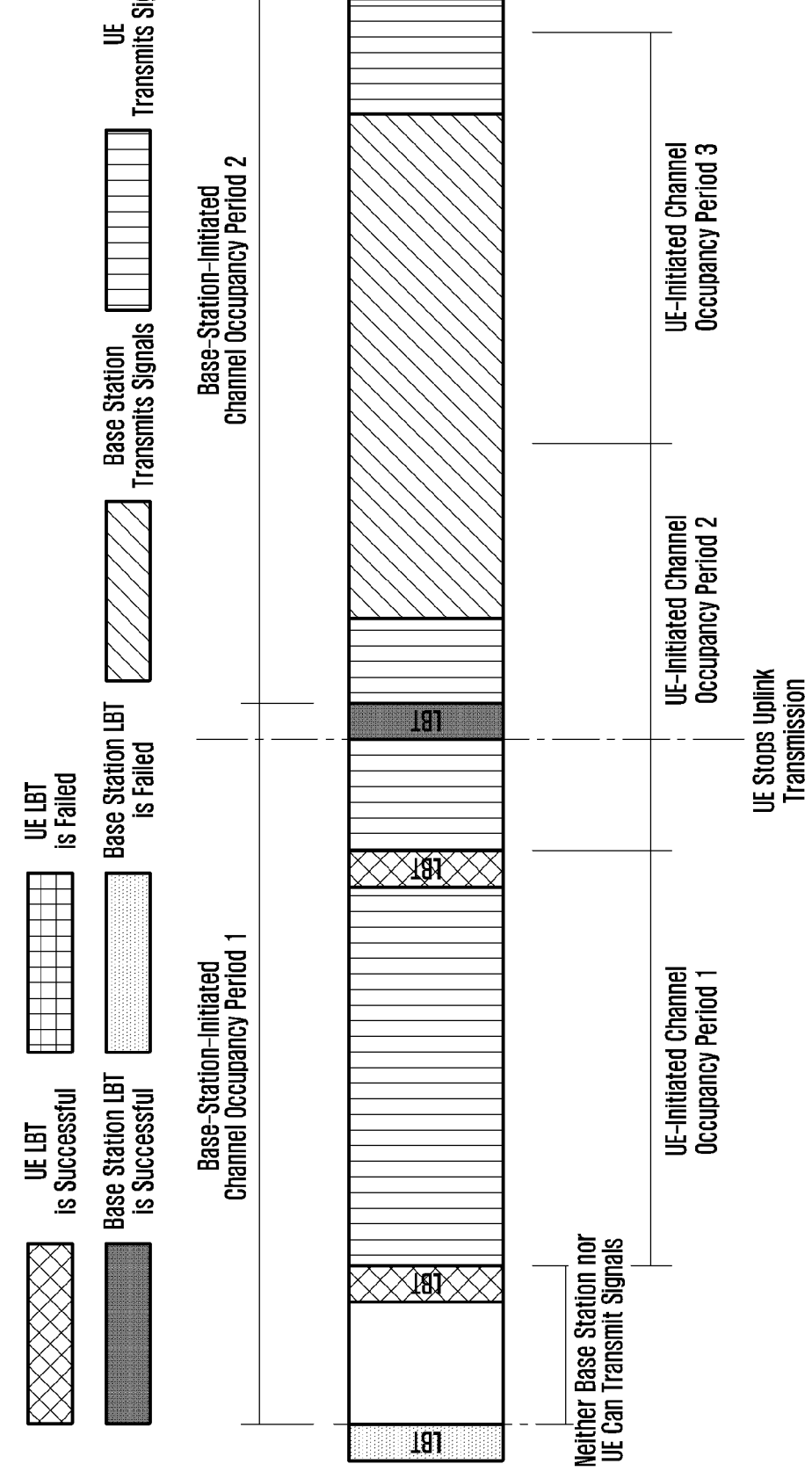
FIG. 8B illustrates another example of determining UE-initiated channel occupancy according to the disclosure.

For example, the specific time resource is a time range of 9 μs or 9+xμs before the starting point of the base-station-initiated channel occupancy, for example, x is the preparation time for uplink and downlink switching, or y symbols. By limiting that UE cannot transmit signals in this time range, the influence of uplink signals of the UE on the LBT of the base station is avoided. As shown in FIG. 8B, the base station fails in the LBT before the starting point of base-station-initiated channel occupancy period 1, and the UE succeeds in the LBT before the starting point of UE-initiated channel occupancy period 1. Neither the UE nor the base station can transmit signals before the starting point of UE-initiated channel occupancy period 1, and UE may start transmitting signals at the starting point of UE-initiated channel occupancy period 1. The UE succeeds in the LBT again before the starting point of UE-initiated channel occupancy period 2, and the UE may start transmitting signals at the starting point of UE-initiated channel occupancy period 2. Since the starting point of base-station-initiated channel occupancy period 2 is located within UE-initiated channel occupancy period 2, the UE needs to stop transmitting signals at 9 μs before the starting point of base-station-initiated channel occupancy period 2, so that the base station may perform the LBT at the corresponding position. Thereafter, regardless of whether the base station succeeds in the LBT or not, the UE may transmit uplink signals within UE-initiated channel occupancy period 2.

Rule 3: the specific time resources are determined based on the maximum time length Tx' for which one base station and the UE served by the base station continuously occupy the channel.

The standard predefines or the base station configures the maximum time length Tx' for which one base station and the UE served by the base station continuously occupy the channel. Preferably, in each time window with a length of Tx', the position of the specific time resource in the time window is fixed, for example, the fixed time resource with a time length of Tw' before the end of the time window or the fixed time resource with a time length of Tw' after the starting point of the time window. Preferably, in each time window with a length of Tx', the position of the specific time resource in the time window may be variable.

Neither the base station nor the UE served by the base station can transmit on the specific time resources. Preferably, the base station configures the specific time resources. The specific time resources configured by the base station make the time length for which one base station and the UE served by the base station continuously occupy the channel not to exceed Tx'. The base station may configure the specific time resources through signaling, e.g., RRC or MAC signaling, or may dynamically indicate the specific time resources through physical layer signaling, e.g., cell-common PDCCH or user-group-based PDCCH indicates the specific time resources.

Preferably, the base station guarantees that neither the base station nor the UE served by the base station can transmit on the specific time resource through scheduling, so that the time length for which one base station and the UE served by the base station continuously occupy the channel does not exceed Tx'.

In this way, one base station and the UE served by the base station may be prevented from continuously occupying the channel in turn, thus guaranteeing fairness among the transmitting nodes that occupy the channel according to the channel access procedures for semi-static channel occupancy.

Preferably, for different types of signals, the time resources that cannot be uplink transmitted are determined according to different rules. For example, for uplink signals configured by higher-layer signaling, such as CG-PUSCH, the time resources that cannot be uplink transmitted include the idle period Tz of the base-station-initiated channel occupancy; for scheduling-based uplink signals, the time resources that cannot be uplink transmitted include the idle period Tz of the channel occupancy used by the uplink signal. For example, if the uplink signal is a signal in the UE-initiated channel occupancy, signals cannot be transmitted in the idle period Tz of the UE-initiated channel occupancy, and if the uplink signal is a signal in the base-station-initiated channel occupancy, signals cannot be transmitted in the idle period Tz of the base-station-initiated channel occupancy.

Preferably, for different connected states, the time resources that cannot be uplink transmitted are determined according to different rules. For example, for the UE in RRC idle state, PRACHs cannot be transmitted within a time range of 9 μs or 9+xμs before the starting point of the base-station-initiated channel occupancy, and for the UE in RRC connected state, uplink signals cannot be transmitted within the idle period Tz of the UE-initiated or base-station-initiated channel occupancy.

Preferably, the base station may indicate whether the UE may transmit signals on specific time resources. Preferably, the base station may indicate that the UE transmits signals on a kind of specific time resource and not on another kind of specific time resource. For example, the base station indicates that the UE cannot transmit signals on the specific time resources determined by Rule 2, but can transmit signals on the specific time resources determined by Rule 1. Alternatively, the base station indicates that the UE cannot transmit signals on the specific time resources determined by Rule 1, but can transmit signals on the specific time resources determined by Rule 2. Alternatively, the base station indicates that the UE cannot transmit signals on the specific time resources determined by either of Rule 1 and Rule 2. Preferably, if the UE does not receive the indication of whether signals can be transmitted on specific time resources, the UE determines whether the signal can be transmitted on the specific time resources according to a predefined assumption. For example, if no indication is received, signals cannot be transmitted on the time resources determined according to Rule 2. For another example, if no indication is received, signals cannot be transmitted on the time resources determined according to Rule 1. For another example, if no indication is received, signals may be transmitted on the time resources determined according to Rule 2. For another example, if no indication is received and the UE successfully initiates the channel occupancy, signals cannot be transmitted on the time resources determined according to Rule 1. Preferably, the base station may indicates that the UE transmits signals on a kind of specific time resource, and the UE may determine that the UE cannot transmit signals on another kind of specific time resource according to the indication and predefined rules. For example, the base station indicates that the UE cannot transmit signals on the specific time resources determined by Rule 2, and the specific time resources are the idle period Tz of the channel occupancy period of base station. The UE determines that the base station initiates channel occupancy according to the indication, and the UE cannot initiate channel occupancy. The UE may transmit signals on the specific time resources determined by Rule 1, the specific time resources are the idle period Tz1 of the channel occupancy period of UE.

Figure 13A:
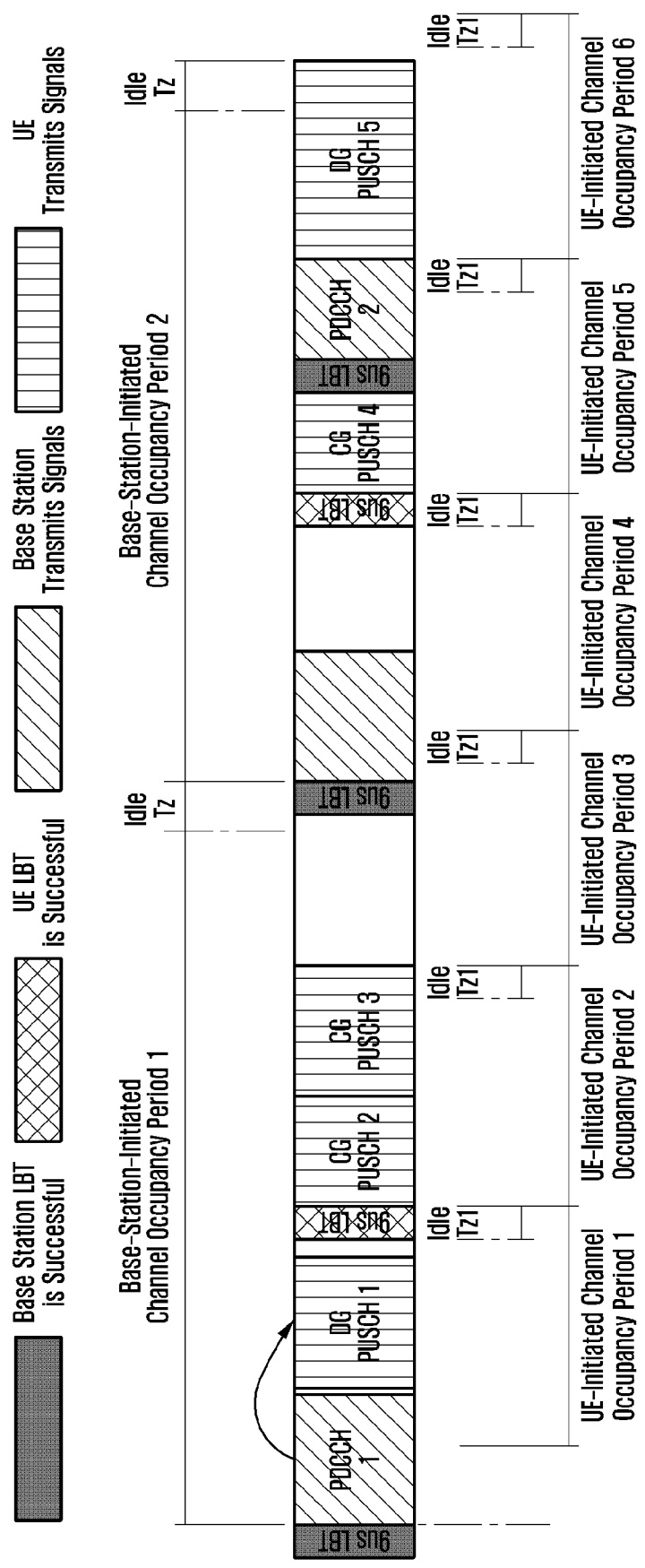
FIG. 13A illustrates an example in which a base station indicates whether a UE transmits signals on specific time resources according to the disclosure.

According to an implementation way, if the UE receives at least one piece of indication information within one the channel occupancy period of a base station, indicating that specific time resources within one or more channel occupancy periods of this base station are unavailable, for example, indicating that the idle period Tz of the current channel occupancy period is unavailable, the UE assumes that it cannot initiate UE channel occupancy within this current channel occupancy period of base station, and it can only share the base-station-initiated channel occupancy within this current channel occupancy period of base station. If the received indication information indicates that the specific time resources within one or more channel occupancy periods of this base station are available, the UE assumes that the UE may initiate channel occupancy within the indicated channel occupancy period. For example, as shown in FIG. 13A, within the base-station-initiated channel occupancy period 1, the base station transmits PDCCH1 to schedule PUSCH1 (identified as DG PUSCH1 in FIG. 13A), and indicates in PDCCH1 that the UE cannot transmit signals in the idle period Tz within the current base-station-initiated channel occupancy period 1. Before transmitting CG PUSCH 2/3, if the UE does not receive any other indication other than PDCCH1 about whether it can transmit signals in the idle period Tz within base-station-initiated channel occupancy period 1, the UE determines that it cannot initiate the channel occupancy as PDCCH1 indicates, that is, the UE does not initiate channel occupancy period 2, and the UE transmits CG PUSCH2/3 within channel occupancy period 1 of the base station shared by the base station with the UE. Since the UE does not initiate channel occupancy period 2, the UE may transmit signals in the idle period Tz1 of channel occupancy period 2 of the UE. For another example, as shown in FIG. 13A, within base-station-initiated channel occupancy period 2, if the UE does not receive an indication indicating whether signals can be transmitted in the idle period Tz within the current base-station-initiated channel occupancy period 2 before transmitting CG PUSCH4, the UE may initiate channel occupancy period 5 and transmit CG PUSCH4. The UE needs to guarantee that no uplink signals are transmitted in the idle period Tz1 of UE-initiated channel occupancy period 5. The UE then receives PDCCH2 to schedule PUSCH5 (identified as DG PUSCH5 in FIG. 13A) and indicate that the UE may transmit signals in the idle period Tz within base-station-initiated channel occupancy period 2, and then the UE initiates channel occupancy period 6 and transmits DG PUSCH5, which may overlap with the idle period Tz within base-station-initiated channel occupancy period 2, but cannot overlap with the idle period Tz1 within channel occupancy period 6 of the UE.

Preferably, if one UE-initiated channel occupancy period overlaps with one or more base-station-initiated channel occupancy periods, for example, UE-initiated channel occupancy period 3 in FIG. 13A (overlapping with base station channel occupancy periods 1 and 2). If the UE transmits CG PUSCH at the starting point of this channel occupancy period, the UE may initiate this channel occupancy. If the UE transmits a PUSCH scheduled based on the base station at the starting point of the channel occupancy period, the UE determines whether to initiate this UE channel occupancy according to whether the idle period Tz of the channel occupancy period of base station may be occupied or not indicated in the control information for scheduling this PUSCH. For example, if it is indicated in the control information that the UE cannot transmit signals in the idle period Tz within base-station-initiated channel occupancy period 1, the UE cannot initiate UE channel occupancy period 3 and can only transmit signals in UE channel occupancy period 3 by means of sharing base-station-initiated channel occupancy period 1.

Preferably, if one UE-initiated channel occupancy period overlaps with one or more base-station-initiated channel occupancy periods, and if the UE receives at least one piece of indication information within the first base station channel occupancy period, indicating that the idle period Tz within this channel occupancy period of base station is unavailable, the UE assumes that it cannot initiate this UE channel occupancy period. For example, in FIG. 13A, if the UE receives PDCCH1 indicating that it cannot transmit signals in the idle period Tz within channel occupancy period 1 of the base station, it cannot initiate UE channel occupancy period 3, and it can only transmit signals in UE channel occupancy period 3 by means of sharing base-station-initiated channel occupancy period 1.

Figure 13B:
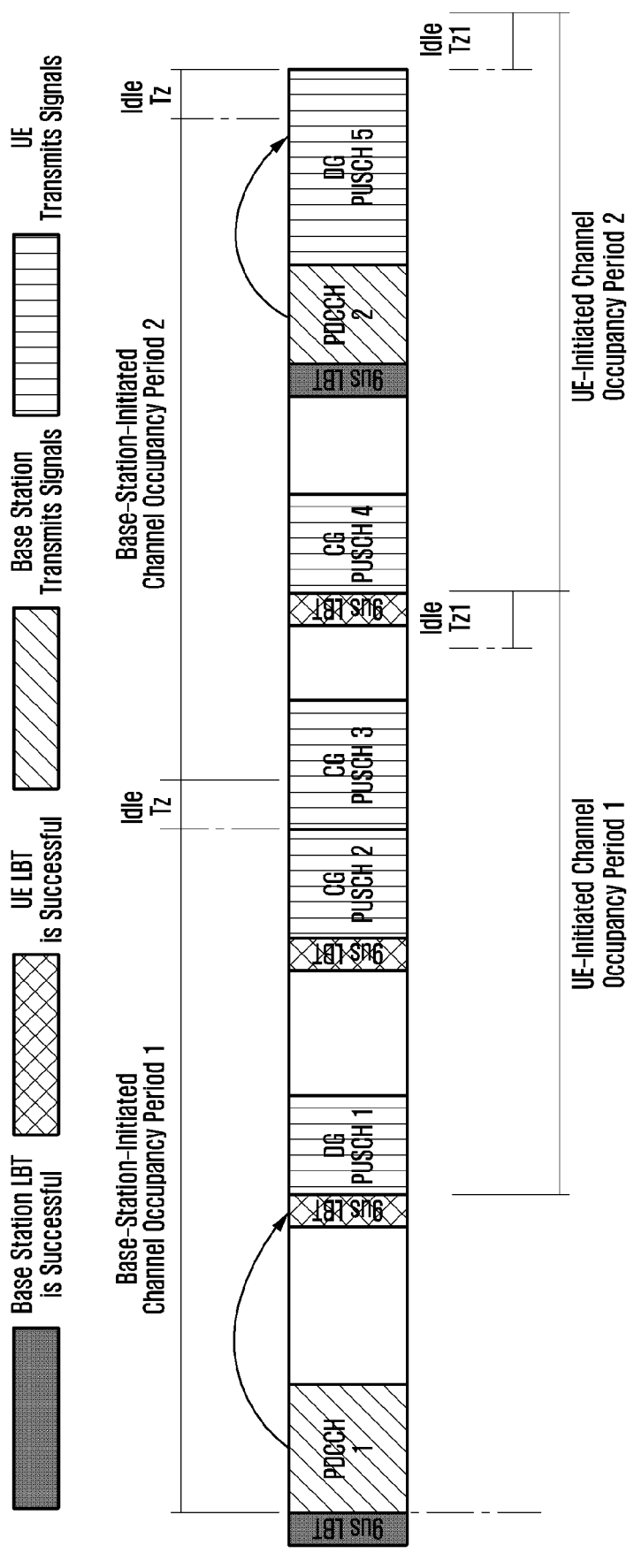
FIG. 13B illustrates another example in which a base station indicates whether a UE transmits signals on specific time resources according to the disclosure.

According to an implementation way, if the UE receives at least one piece of indication information within one channel occupancy period of UE, indicating that the specific time resources within the channel occupancy period of base station are unavailable, for example, a period of idle period Tz before the starting point of the next channel occupancy of base station, the UE assumes that the UE cannot initiate the current channel occupancy and can only share the base-station-initiated channel occupancy. If the UE receives at least one piece of indication information indicating that the specific time resources within the channel occupancy period of base station are available, the UE assumes that the UE may initiate the current channel occupancy. As shown in FIG. 13B, within base-station-initiated channel occupancy period 1, the base station transmits PDCCH1 to schedule PUSCH1 (identified as DG PUSCH1 in FIG. 13B), and indicates in PDCCH1 that the UE may transmit signals in the idle period Tz within the current base-station-initiated channel occupancy period 1. Therefore, the UE initiates UE channel occupancy period 1 and transmits DG PUSCH1. And the UE transmits CG PUSCH2 and CG PUSCH3 within UE channel occupancy period 1, wherein CG PUSCH3 overlaps with the idle period Tz within base-station-initiated channel occupancy period 1.

According to an implementation way, if the UE initiates one channel occupancy, but then the received uplink transmission scheduled by the base station overlaps with the idle period of this UE channel occupancy, the UE needs to give up initiating this channel occupancy and can only transmit uplink signals in the channel occupancy shared by the base station with the UE. That is, the UE cannot transmit uplink signals in the resources which are located within this UE channel occupancy and outside the base station channel occupancy.

Figure 14A:
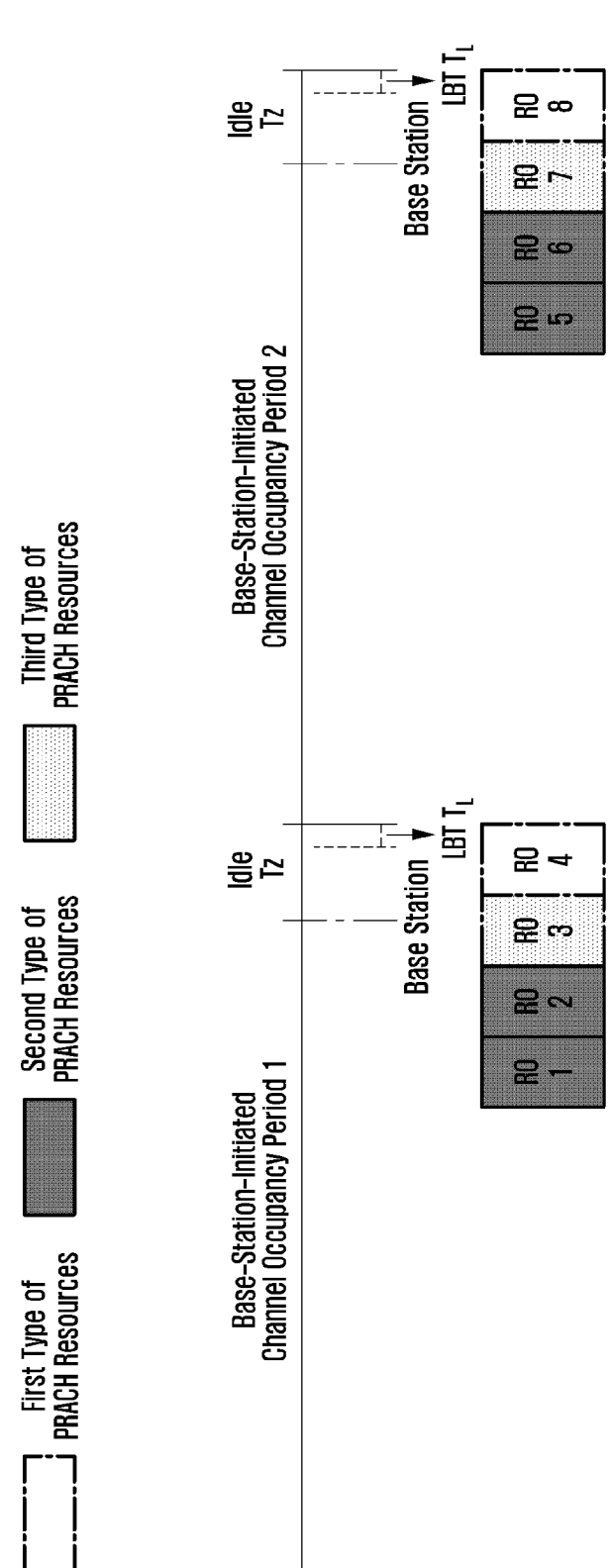
FIG. 14A illustrates an example in which a UE transmits PRACH according to the disclosure.

For random access, the base station would configure PRACH resources for the UE. Among these PRACH resources, it is possible that part of PRACH resources overlap with the idle period Tz of the base-station-initiated channel occupancy period, denoted as a first type of PRACH resources; part of PRACH resources do not overlap with the idle period Tz of the base-station-initiated channel occupancy period, denoted as a second type of PRACH resources; part of PRACH resources overlap with the idle period Tz of the base-station-initiated channel occupancy period, but do not overlap with the resources of the LBT carried out by the base station before initiating channel occupancy, denoted as a third type of PRACH resources. In some scenarios, the third type of PRACH resources is a subset of the first type of PRACH resources. For example, as shown in FIG. 14A, there are four PRACH resources within each of base-station-initiated channel occupancy periods, denoted as RO (RACH occasion) 1, 2, 3 and 4, and RO 5, 6, 7 and 8, respectively. RO3, 4, 7 and 8 belong to the first type of PRACH resources, RO1, 2, 5 and 6 belong to the second type of PRACH resources, and RO3 and RO7 belong to the third type of PRACH resources.

Figure 14B:
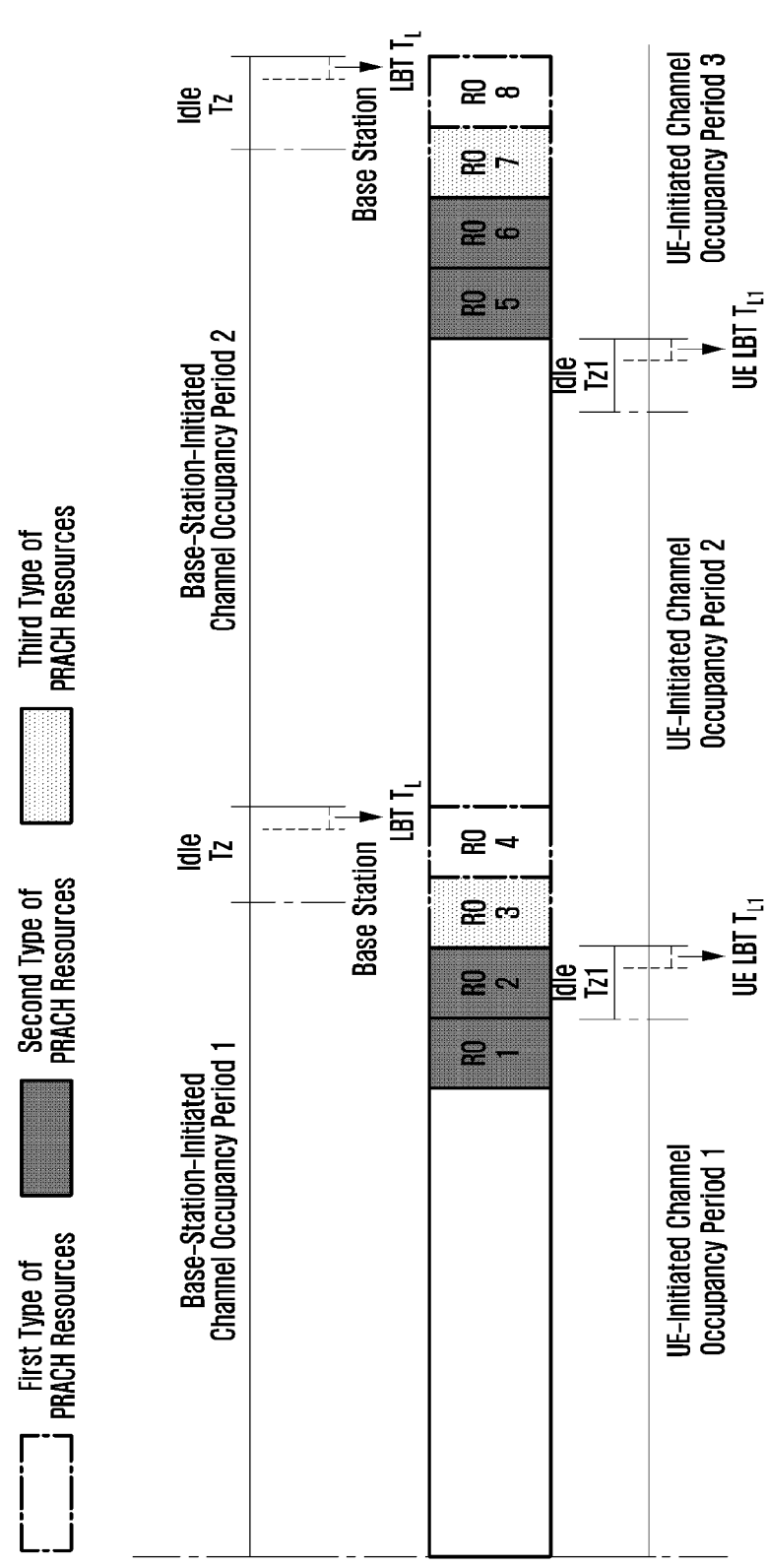
FIG. 14B illustrates another example in which a UE transmits PRACH according to the disclosure.

Preferably, the PRACH resources overlapping with specific resources are invalid PRACH resources, and the specific resources are the time resources TL of the LBT performed by the base station before the channel occupancy period of base station. The UE cannot transmit PRACH in PRACH resources overlapping with the specific resources. The valid PRACH resources are located in the second or third type of PRACH resources. According to an example, as shown in FIG. 14B, RO4 and RO8 are invalid PRACH resources, and UE cannot transmit PRACH in RO4 or RO8. The UE may transmit PRACH in RO3 resources (the third type of PRACH resources) if it initiates channel occupancy period 2, or the UE may transmit PRACH in RO5 resources (the second type of PRACH resources) if it initiates channel occupancy period 3.

Figure 14C:
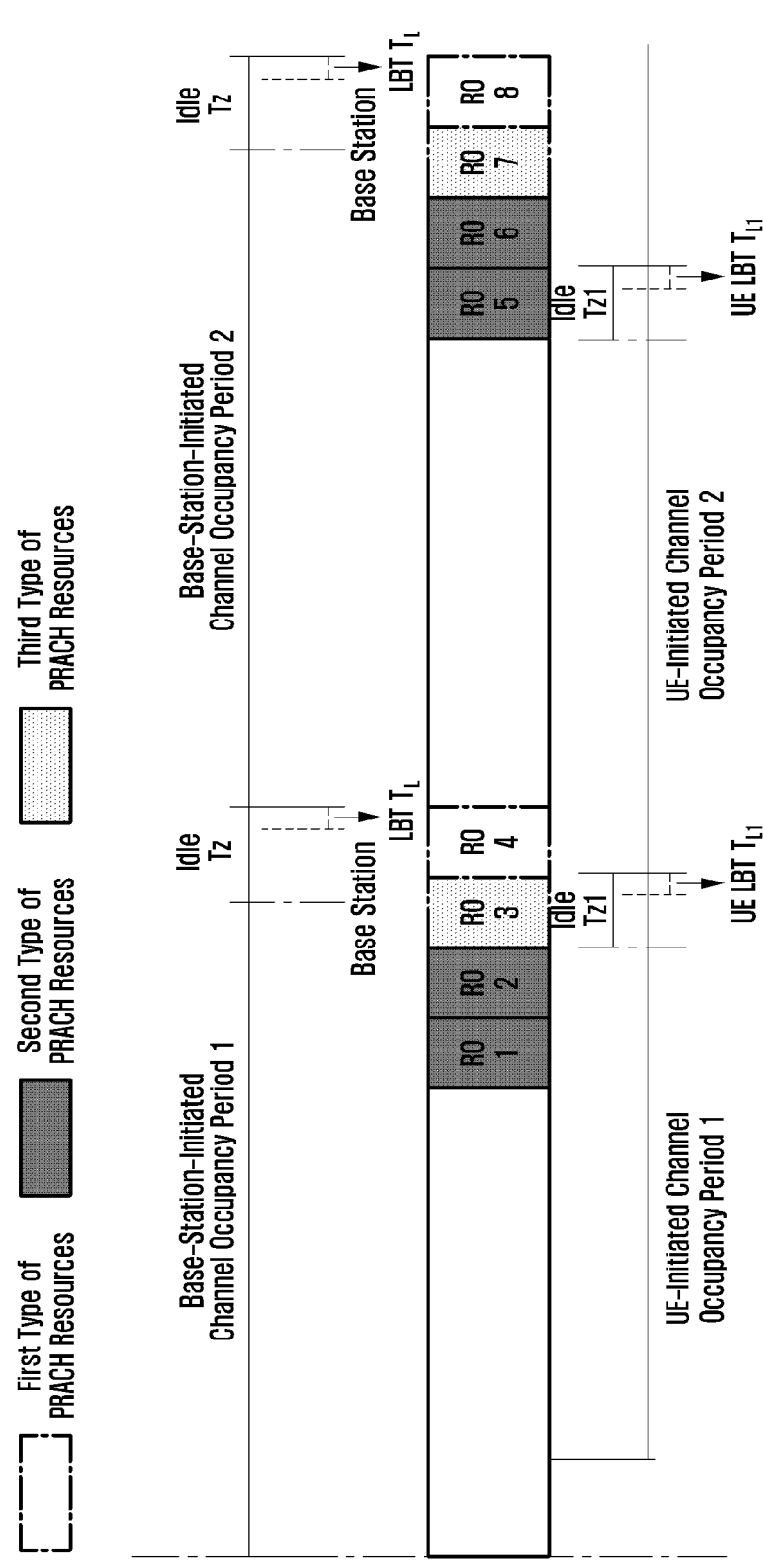
FIG. 14C illustrates another example in which a UE transmits PRACH according to the disclosure.

Preferably, for the UE in IDLE state or inactive state, the PRACH resources overlapping with specific resources are invalid PRACH resources. Accordingly, UE cannot transmit PRACH in invalid PRACH resources, and UE can transmit PRACH in valid PRACH resources. For the UE in connected state, PRACH resources overlapping with the specific resources may be valid PRACH resources. According to an implementation way, the specific resources are the idle period Tz of the base station channel occupancy period. Then, for the UE in idle state or inactive state, the UE cannot transmit signals on the first type of PRACH resources, for example, RO3, 4, 7, and 8 in FIG. 14B. For the UE in connected state, the UE may select one PRACH resource from the first and second type of PRACH resources to transmit signals. As shown in FIG. 14B, for the UE in connected state, if the UE initiates channel occupancy period 2, the UE may transmit PRACH in RO3 resources (the first type of PRACH resources), or if the UE initiates channel occupancy period 3, the UE may transmit PRACH in RO5 resources (the second type of PRACH resources). As shown in FIG. 14C, for the UE in connected state, if the UE initiates channel occupancy period 2, the UE may transmit PRACH in RO4 resources (the first type of PRACH resources), or if the UE initiates channel occupancy period 3, the UE may transmit PRACH in RO6 resources (the second type of PRACH resources). For the UE in idle state, in FIGS. 14B and 14C, the UE cannot transmit PRACH in RO3, 4, 7 and 8. If the UE initiates channel occupancy period 3, the UE may transmit PRACH in RO6 resources (the second type of PRACH resources). According to an implementation way, the specific resources are the time resources TL of the LBT performed by the base station before the base station channel occupancy period. For the UE in idle state, in FIG. 14B, the UE may initiate channel occupancy period 2 to transmit PRACH in RO3 resources (the third type of PRACH resources). In FIG. 14C, the UE cannot initiate channel occupancy period 2 to transmit PRACH in RO4.

Preferably, for the UE in idle state or inactive state, the PRACH resource overlapping with specific resource 1 is an invalid PRACH resource. For the UE in connected state, the PRACH resource overlapping with specific resource 2 is an invalid PRACH resource. The type of the specific resource 1 is different from that of the specific resource 2. Accordingly, UE cannot transmit PRACH in invalid PRACH resources, and UE may transmit PRACH in valid PRACH resources. According to an implementation way, the specific resource 1 is the idle period Tz of the base station channel occupancy period, and the specific resource 2 is the time resource TL of the LBT performed by the base station before the base station channel occupancy period.

Preferably, the base station may configure the UE to judge whether the PRACH resource is valid or not according to which type of the above ways.

Preferably, the association between the second type of PRACH resources and SSB, and the association between the first or third type of PRACH resources and SSB, are performed separately.

Preferably, if the UE receives the indication of whether PRACH resources are available transmitted by the base station, the UE determines whether PRACH resources may be transmitted according to the indication of the base station. The indication may be an indication of whether signals may be transmitted on specific resources, for example, an indication of whether signals may be transmitted in the idle period Tz within the base station channel occupancy period. Preferably, the UE judges whether the PRACH resources are valid or not by combining the indication with the above predefined rules, and determines whether the PRACH resources may be transmitted. For example, for the UE in connected state, it is judged that RO1, RO2, . . . , RO8 in FIG. 14C are all valid PRACH resources according to predefined rules. The UE receives signaling from the base station indicating that signals cannot be transmitted in the idle period Tz of base-station-initiated channel occupancy period 1, so the UE cannot choose to transmit PRACH in RO4. The UE may choose to transmit PRACH in RO6.

By means of the ways described above, the PRACH transmitted by the UE in idle/inactive state may be prevented from affecting the base-station-initiated channel occupancy, and the PRACH transmitting opportunity of the UE in connected state may be improved, while avoiding influence on the base-station-initiated channel occupancy.

Preferably, a specific type of uplink signals may be transmitted on specific time resources. The performance of a specific type of uplink signals may be guaranteed by supporting the transmission of a specific type of uplink signal on a specific time resource. The specific type of uplink signal is at least one of the following signals:

1. PRACH
2. Msg A PRACH
3. Msg A PUSCH
4. All uplink signals of random access procedure
5. PRACH of contention-based random access procedure
6. Msg A PRACH of contention-based random access procedure
7. Msg A PUSCH of contention-based random access procedure
8. All uplink signals of contention-based random access procedure
9. Configured grant PUSCH (CG PUSCH)
10. CG PUSCH with a specific priority
11. Uplink signals configured by the base station for uplink transmission according to a second kind of implementation way
12. PUCCH carrying a SR
13. PUCCH carrying a SR with a specific priority Preferably, the UE cannot transmit signals on specific time resources of specific base-station-initiated channel occupancy. In this way, the influence of uplink signals transmitted by the UE on specific base-station-initiated channel occupancy may be avoided. The specific base-station-initiated channel occupancy is at least one of:

1. SS/PBCH candidate positions are contained within the specific base-station-initiated channel occupancy period.
2. Type-0 PDCCH common search space is contained within the specific base-station-initiated channel occupancy period.
3. Type-0A PDCCH common search space is contained within the specific base-station-initiated channel occupancy period.
4. Type-1 PDCCH common search space is contained within the specific base-station-initiated channel occupancy period.
5. Type-2 PDCCH common search space is contained within the specific base-station-initiated channel occupancy period.

Figure 8C:
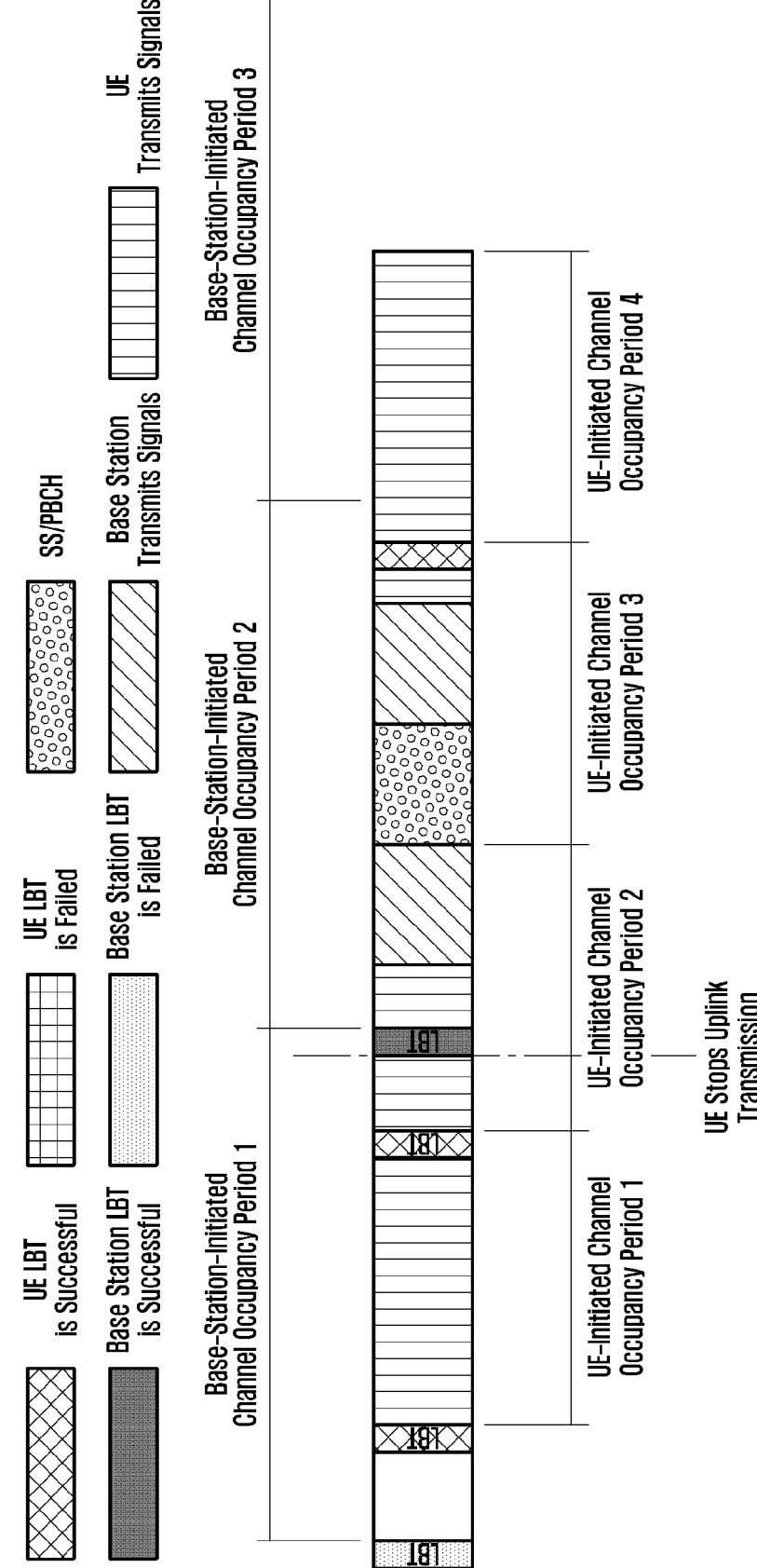
FIG. 8C illustrates another example of determining UE-initiated channel occupancy according to the disclosure.

As shown in FIG. 8C, the UE succeeds in the LBT before the starting point of UE-initiated channel occupancy period 2, and the UE may start transmitting signals at the starting point of UE-initiated channel occupancy period 2. Since the starting point of base-station-initiated channel occupancy period 2 is located within UE-initiated channel occupancy period 2, and SS/PBCH is contained within base-station-initiated channel occupancy period 2, the UE needs to stop transmitting signals at 9 μs before the starting point of base-station-initiated channel occupancy period 2, so that the base station may perform the LBT at the corresponding position. The UE succeeds in the LBT before the starting point of UE-initiated channel occupancy period 4, and the UE may start transmitting signals at the starting point of UE-initiated channel occupancy period 4. Although the starting point of base-station-initiated channel occupancy period 3 is located within UE-initiated channel occupancy period 4, base-station-initiated channel occupancy period 3 does not contain specific downlink signals, so the UE does not need to stop uplink transmission for base-station-initiated channel occupancy period 3, and the UE may continuously transmit uplink signals within UE-initiated channel occupancy period 4.

Preferably, the UE-initiated channel occupancy may be shared with the base station. Preferably, the base station may configure whether the UE can share the UE-initiated channel occupancy with the base station.

The base station needs to determine the corresponding downlink transmission behavior according to whether the downlink signal to be transmitted is located in the UE-initiated channel occupancy. The base station may determine whether the UE initiates channel occupancy and shares it with the base station according to at least one mode of the following:

Mode 1: the base station determines whether the UE initiates channel occupancy and shares it with the base station according to the indication of the UE.

Preferably, the UE indicates in the CG-UCI in PUSCH whether the UE initiates channel occupancy and shares it with the base station. Preferably, the UE indicates whether the UE initiates channel occupancy and shares it with the base station through different uplink transmission signal resources. For example, the base station configures two sets of PUCCH resources, which are different in at least one of PUCCH format, time resources, frequency domain resources and codeword resources. For another example, the base station configures two sets of PRACH resources, which are different in at least one of PRACH format, time resources, frequency domain resources and codeword resources. For another example, the base station configures two sets of SRS resources, which are different in at least one of the time resources, frequency domain resources and codeword resources. The UE selects one set of resources from the above two sets of resources to transmit the uplink signals according to whether the channel occupancy is initiated and shared with the base station.

Mode 2: If the base station detects the uplink signal at the starting position of the UE-initiated channel occupancy, the base station assumes that the UE successfully initiates the channel occupancy, and the channel occupancy may be shared with the base station.

Preferably, if the uplink signal configured by the higher layer is located at the starting position of the channel occupancy period of UE, and the UE is to transmit the uplink signal, regardless the uplink signal is located within the channel occupancy time initiated by the base station and shared with the UE or not, the UE performs LBT according to the LBT mode of UE-initiated channel occupancy to initiate the channel occupancy. For example, the UE performs the LBT within 9 μs immediately before transmitting the signal. Accordingly, if the base station detects the signal, the base station assumes that the UE successfully initiates channel occupancy and may share it with the base station, and the base station may perform transmission of downlink signals within the channel occupancy resources shared by the UE. Preferably, the uplink signal configured by the higher layer is at least one of CG PUSCH, PRACH, periodic SRS, semi-persistent SRS, periodic PUCCH and semi-persistent PUCCH.

Figure 11A:
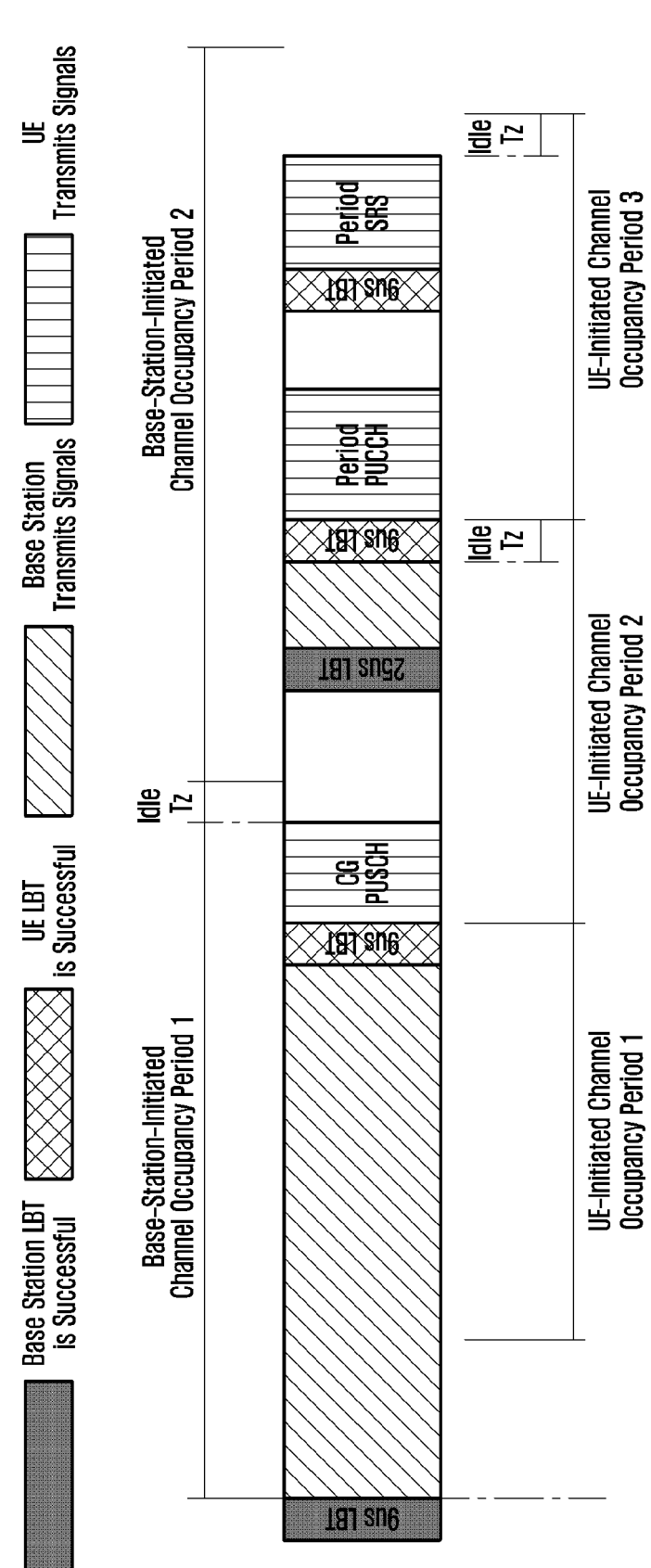
FIG. 11A illustrates an example in which UE-initiated channel occupancy may be shared with a base station according to the disclosure.

FIG. 11A gives an example. The base station completes a 9 μs LBT before the beginning of base-station-initiated channel occupancy period 1, so the channel occupancy is successfully initiated. Before the end of this occupancy period 1, the base station may continuously transmit downlink signals, or the UE may transmit signals within this occupancy period shared by the base station. If the base station does not perform the LBT before the beginning of base-station-initiated channel occupancy period 2, then the base station does not initiate channel occupancy within base-station-initiated channel occupancy period 2. The starting points of UE-initiated channel occupancy period 1 and period 2 are both located in base-station-initiated channel occupancy period 1. In this example, the base station continuously transmits downlink data, and the UE does not initiate channel occupancy period 1. The base station ends the downlink transmission before the UE initiates channel occupancy period 2. At the starting point of UE-initiated channel occupancy period 2, the UE has CG-PUSCH to be transmitted. The UE transmits CG PUSCH immediately after successfully performing a 9 μs LBT, and the UE successfully initiates the channel occupancy. In this channel occupancy period, the UE may transmit uplink signals, or the base station may transmit signals in this occupancy period shared by the UE. As shown in FIG. 11a, within UE-initiated channel occupancy period 2, the base station performs a 25 μs LBT, transmits downlink signals, and does not end until before the beginning of the last Tz time within UE-initiated channel occupancy period 2. At the starting point of UE-initiated channel occupancy period 3, the UE has periodic PUCCH to be transmitted. The UE transmits this PUCCH immediately after successfully performing a 9 μs LBT, and the UE successfully initiates the channel occupancy. Within this channel occupancy period, the UE may transmit uplink signals, or the base station may transmit signals in this occupancy period shared by the UE. As shown in FIG. 11a, within UE-initiated channel occupancy period 3, an interval between two adjacent uplink transmission is greater than 16 μs, and after this interval, the UE transmits a second uplink signal (periodic SRS) after performing a 9 μs LBT. In this example, although the CG PUSCH resources are located in base-station-initiated channel occupancy period 1, the UE performs LBT according to the mode of UE-initiated channel occupancy. In this way, if the base station has no downlink signals to transmit at the beginning of base-station-initiated channel occupancy period 2, the base station does not need to perform LBT and transmit downlink signals before base-station-initiated channel occupancy period 2, but performs LBT and transmits downlink signals within UE-initiated channel occupancy period 2 as needed, thus saving the LBT overhead and unnecessary downlink transmission overhead for the base station.

Method 3: if the base station detects the uplink signal at the starting position of the UE-initiated channel occupancy, and the base station indicates that the LBT type of this uplink signal is a LBT type of UE-initiated channel occupancy, the base station assumes that the UE successfully initiates the channel occupancy and the channel occupancy may be shared with the base station.

Preferably, if the uplink signal based on scheduling is located at the starting position of the channel occupancy period of UE, and the LBT type indicated in the control information for scheduling this uplink signal is a LBT type of UE-initiated channel occupancy, for example, a 9 μs LBT before transmission, or a LBT type which is more conservative than the LBT type of UE-initiated channel occupancy, for example, a 25 μs LBT, then UE performs a corresponding LBT and occupies the channel, that is, the UE initiates channel occupancy. Accordingly, if the base station detects this signal, the base station assumes that the UE successfully initiates channel occupancy and this channel occupancy may be shared with the base station, and the base station may perform transmission of downlink signals within the channel occupancy resources shared by the UE. If the LBT type indicated in the control information for scheduling this uplink signal is not the LBT type of UE-initiated channel occupancy, the UE performs a corresponding LBT, but this UE does not initiate channel occupancy. For example, if the LBT type indicated by the base station is no LBT, the UE does not perform LBT, and directly transmits uplink signals in the channel occupancy initiated by the base station and shared with the UE, that is, the UE does not initiate channel occupancy. Accordingly, if the base station detects this signal, the base station does not assume that the UE successfully initiates channel occupancy.

Figure 11B:
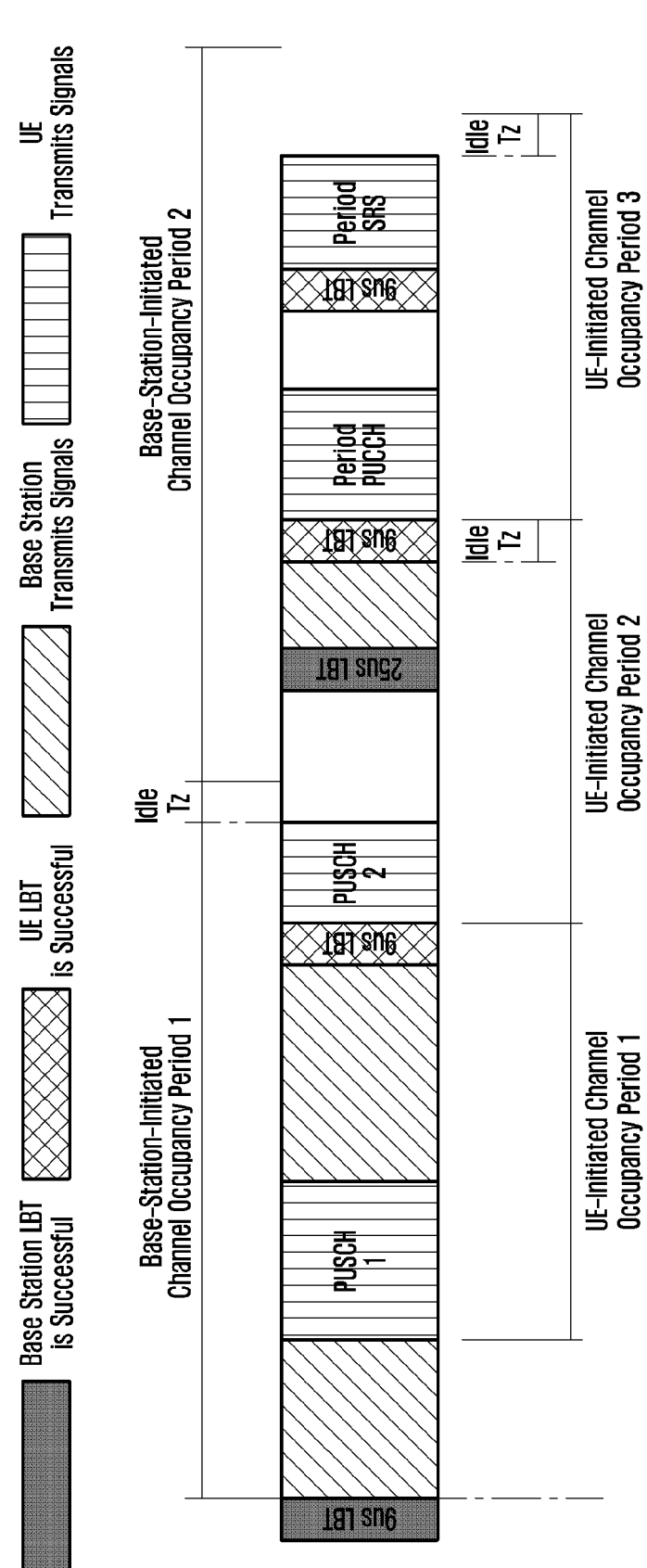
FIG. 11B illustrates another example in which UE-initiated channel occupancy may be shared with a base station according to the disclosure.

FIG. 11B gives an example. The base station completes a 9 μs LBT before the beginning of base-station-initiated channel occupancy period 1, so the channel occupancy is successfully initiated. Before the end of this occupancy period 1, the base station may continuously transmit downlink signals, or the UE may transmit signals within this occupancy period shared by the base station. If the base station does not perform LBT before the beginning of base-station-initiated channel occupancy period 2, then the base station does not initiate channel occupancy within base-station-initiated channel occupancy period 2. The starting points of UE-initiated channel occupancy period 1 and period 2 are both located in base-station-initiated channel occupancy period 1. In this example, the base station schedules PUSCH1 to be transmitted from the starting point of UE-initiated channel occupancy period 1 through DCI. The LBT type of PUSCH1 indicated in DCI is no need to perform LBT, so the UE does not initiate channel occupancy, but shares the base-station-initiated channel occupancy. The base station schedules PUSCH2 to be transmitted from the starting point of UE-initiated channel occupancy period 2 through DCI. The LBT type of PUSCH2 indicated in DCI is a 9 μs LBT, so the UE initiates channel occupancy.

Preferably, the UE indicates whether to share the channel occupancy with the base station if the uplink signal at the starting position of the UE-initiated channel occupancy is the first type of uplink signal. For example, the first type of uplink signal is CG PUSCH configured by the higher layer. The UE may determine the LBT type according to whether the UE initiates channel occupancy.

Preferably, the first type of uplink signal includes PUCCH configured by the higher layer. The UCI in PUCCH contains information indicating whether the UE shares the channel occupancy with the base station, for example, 1-bit information. If the UCI only contains a scheduling request SR and information indicating whether the UE shares channel occupancy with the base station, the information bit of whether the UE shares channel occupancy with the base station is transmitted in the form of ACK/NACK bit, along with the SR. For example, for PUCCH format 0, cyclic shift CSx1 is associated with positive SR and sharing channel occupancy with base station by the UE, cyclic shift CSx2 is associated with positive SR and not sharing channel occupancy with base station by the UE. For another example, for PUCCH format 1, this 1-bit information is transmitted on the PUCCH resources of SR.

Preferably, if the uplink signal at the starting position of the UE initiated channel occupancy is the second type of uplink signal, the base station assumes that this channel occupancy may be shared with the base station. For example, the second type of uplink signal is at least one of PRACH, PUCCH or SRS configured by the higher layer. If the second type of uplink signal is located at the starting position of the channel occupancy period of UE and the UE is to transmit this uplink signal, no matter whether this uplink signal is located within the channel occupancy time initiated by the base station and shared with the UE or not, the UE will perform LBT according to the LBT mode of UE-initiated channel occupancy.

Similarly, the UE needs to determine a corresponding uplink transmission behavior according to whether the uplink signal to be transmitted is located in the base-station-initiated channel occupancy. The UE may determine whether the base station initiates channel occupancy and share it with the UE according to at least one of the following modes:

Mode 1: the UE determines whether the base-station-initiated channel occupancy is shared with the UE according to the indication of the base station. For example, the base station indicates whether the base station initiates channel occupancy and whether the channel occupancy is shared with the UE in the cell-common or group-based or user-specific DCI. If the UE receives the downlink signal, and this downlink signal contains indication information for the base-station-initiated channel occupancy, the UE assumes that the base station initiates the channel occupancy and shares it with the UE. If the UE receives the downlink signal, but this downlink signal does not contain information for the base-station-initiated channel occupancy, the UE cannot assume that the base station initiates the channel occupancy and shares it with the UE.

Preferably, the UE receives a downlink signal, but this downlink signal does not contain information for the base-station-initiated channel occupancy, or the UE does not receive information for the base-station-initiated channel occupancy, the UE assumes that the base station does not initiate channel occupancy. Preferably, the UE receives a downlink signal, but this downlink signal does not contain information for the base-station-initiated channel occupancy, or the UE does not receive information for the base-station-initiated channel occupancy, then the UE also needs to determine whether the base station initiates this channel occupancy according to other modes, such as Mode 2.

Preferably, the base station indicates information of the initiator of the channel occupancy used by the base station. For example, if the base station does not initiate one base-station-initiated channel occupancy, but transmits a signal in one UE channel occupancy initiated by UE1, the base station indicates information of UE1 by signaling, for example, UE C-RNTI for UE1. If the base station initiates one base-station-initiated channel occupancy, the base station indicates one predefined value, representing that the base station initiates the channel occupancy. For example, there are UE1, UE2 and a base station in one network. If the base station transmits a signal in the one UE channel occupancy initiated by UE1, the base station indicates the information of UE1. Upon receiving this information, UE1 and UE2 may both judge that the base station does not initiate channel occupancy, and the base station shares the channel occupancy from UE1. Preferably, the base station indicates the channel occupancy time information.

Preferably, the UE does not determine whether the base station initiates channel occupancy based on COT remaining time indicated by the base station, such as CO-Duration-r16.

Mode 2: the UE judges whether the base station initiates channel occupancy and shares it with the UE according to the detected downlink signal and/or whether the downlink signal is located within time resources for the UE-initiated channel occupancy successfully occupied by the UE.

Preferably, if the downlink signal detected by the UE is not within resources for the channel occupancy successfully initiated by the UE, the UE assumes that the base station successfully initiates the channel occupancy where this downlink signal is located, and the base station shares this channel occupancy with the UE.

Figure 12A:
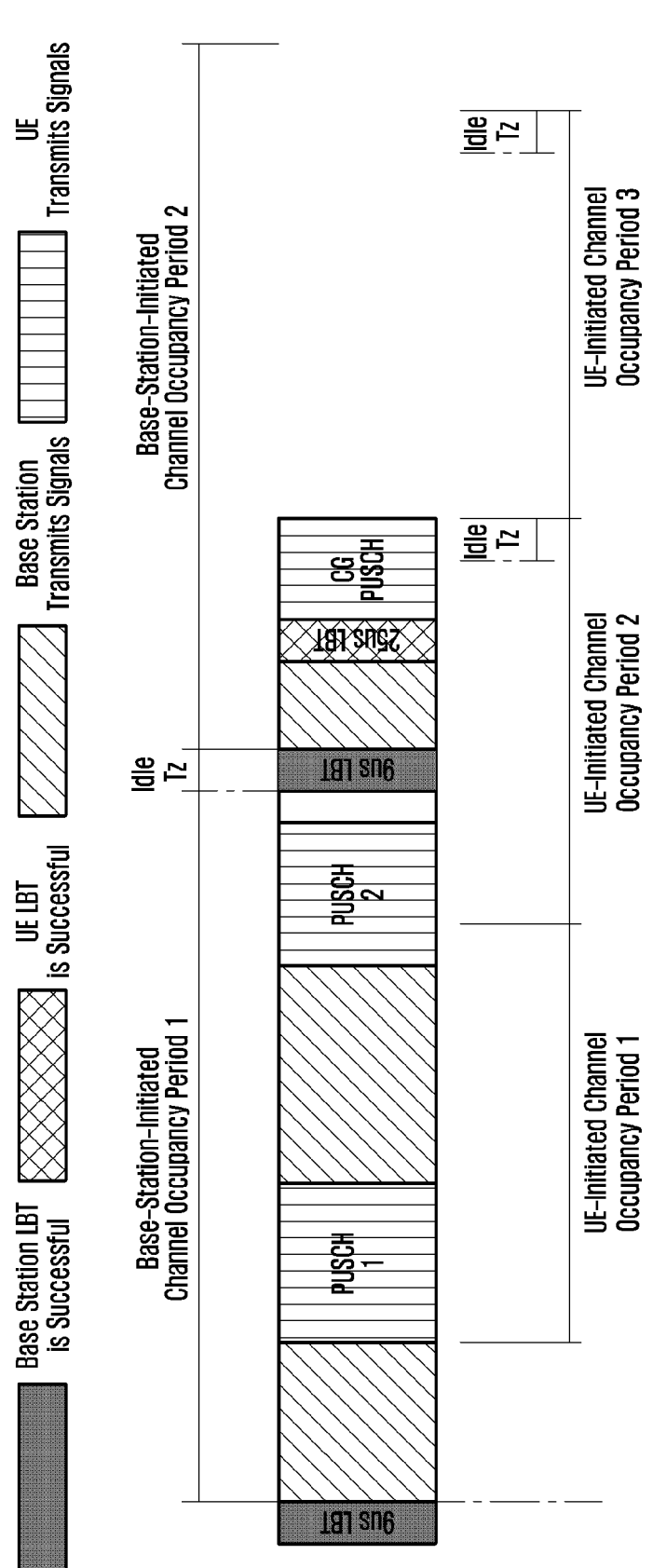
FIG. 12A illustrates an example in which base-station-initiated channel occupancy may be shared with a UE according to the disclosure.

As shown in FIG. 12A, before UE-initiated channel occupancy periods 1 and 2, the UE does not perform LBT, and the UE does not initiate channel occupancy. PUSCH1 and PUSCH2 are scheduled based on the base station, and the UE transmits according to the scheduling of the base station. CG PUSCH is configured by the higher layer, and CG PUSCH is located within UE-initiated channel occupancy period 2, but actually the UE does not initiate this channel occupancy. CG PUSCH is also located in base-station-initiated channel occupancy period 2. The UE needs to judge whether the base station initiates this channel occupancy. The UE detects a downlink signal transmission before the beginning of CG PUSCH resources and within base-station-initiated channel occupancy period 2, so the UE judges that the base station successfully initiates this channel occupancy, and the UE may perform a 25 μs LBT and transmit CG PUSCH. The UE does not detect a downlink signal transmission before the beginning of CG PUSCH resources and within base-station-initiated channel occupancy period 2, and the UE judges that the base station fails to initiate this channel occupancy. The UE cannot transmit this CG PUSCH because neither the base station nor the UE initiates channel occupancy.

Preferably, if the downlink signal detected by the UE is located within the resources for the channel occupancy successfully initiated by the UE, and this downlink signal contains indication information for base-station-initiated channel occupancy, the UE assumes that the base station successfully initiates the channel occupancy where the downlink signal is located, and the base station shares this channel occupancy with the UE.

Figure 12B:
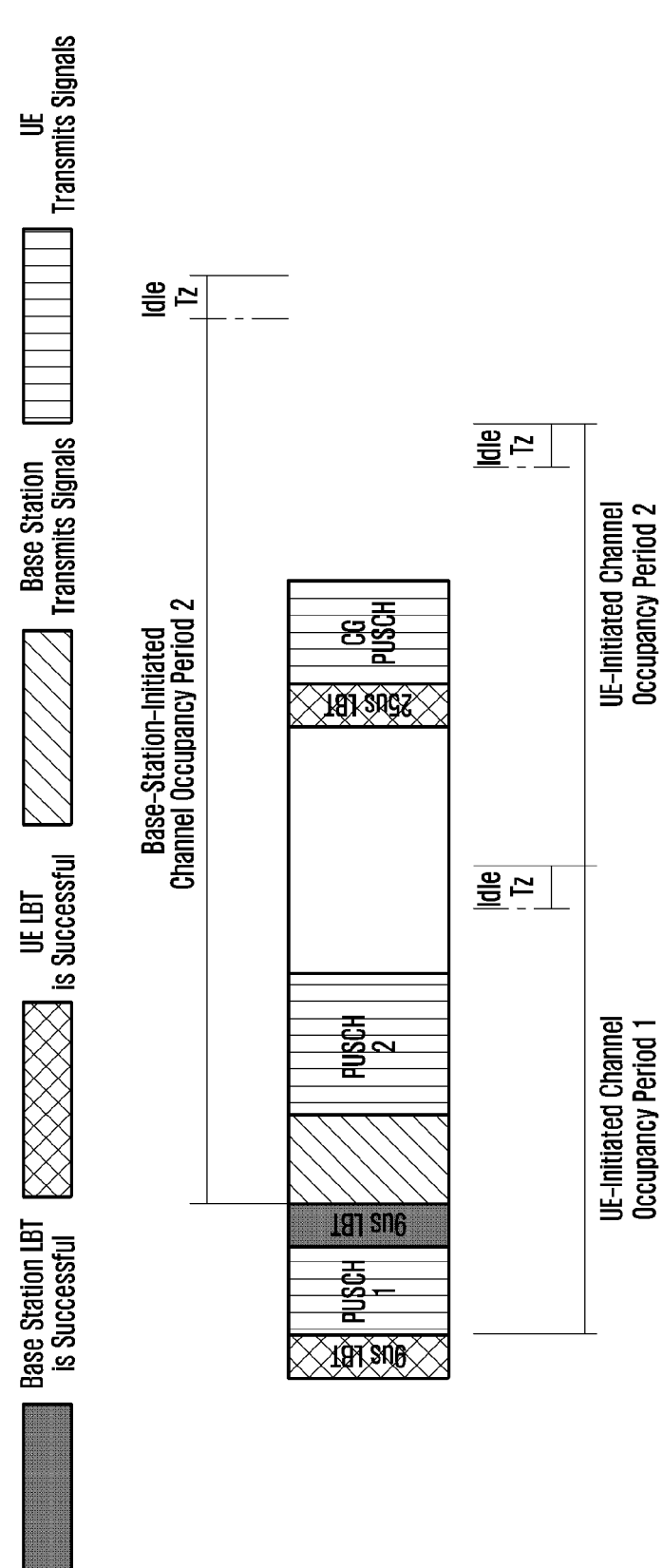
FIG. 12B illustrates another example in which base-station-initiated channel occupancy may be shared with a UE according to the disclosure.

As shown in FIG. 12B, before UE-initiated channel occupancy period 1, the UE performs a 9 μs LBT, and the UE initiates channel occupancy period 1. Before the UE-initiated channel occupancy period 2, the UE does not perform LBT and the UE does not initiate channel occupancy period 2. The starting point of base-station-initiated channel occupancy period 2 is located within UE-initiated channel occupancy period 1. The base station performs a 9 μs LBT before its own channel occupancy period 2, and successfully initiates the channel occupancy of base station. In order to help the UE distinguish whether the base station initiates channel occupancy, the base station indicates in downlink transmission that the base station successfully initiates channel occupancy period 2. The UE detects a downlink signal containing this indication within base-station-initiated channel occupancy period 2, so the UE may transmit CG PUSCH within this channel occupancy period.

Preferably, if the downlink signal detected by the UE is located within the resources for the channel occupancy successfully initiated by the UE, and this downlink signal does not contain the indication information for base-station-initiated channel occupancy, or if the UE does not detect the downlink signal, the UE assumes that the base station fails to initiate the channel occupancy where the downlink signal is located.

Figure 12C:
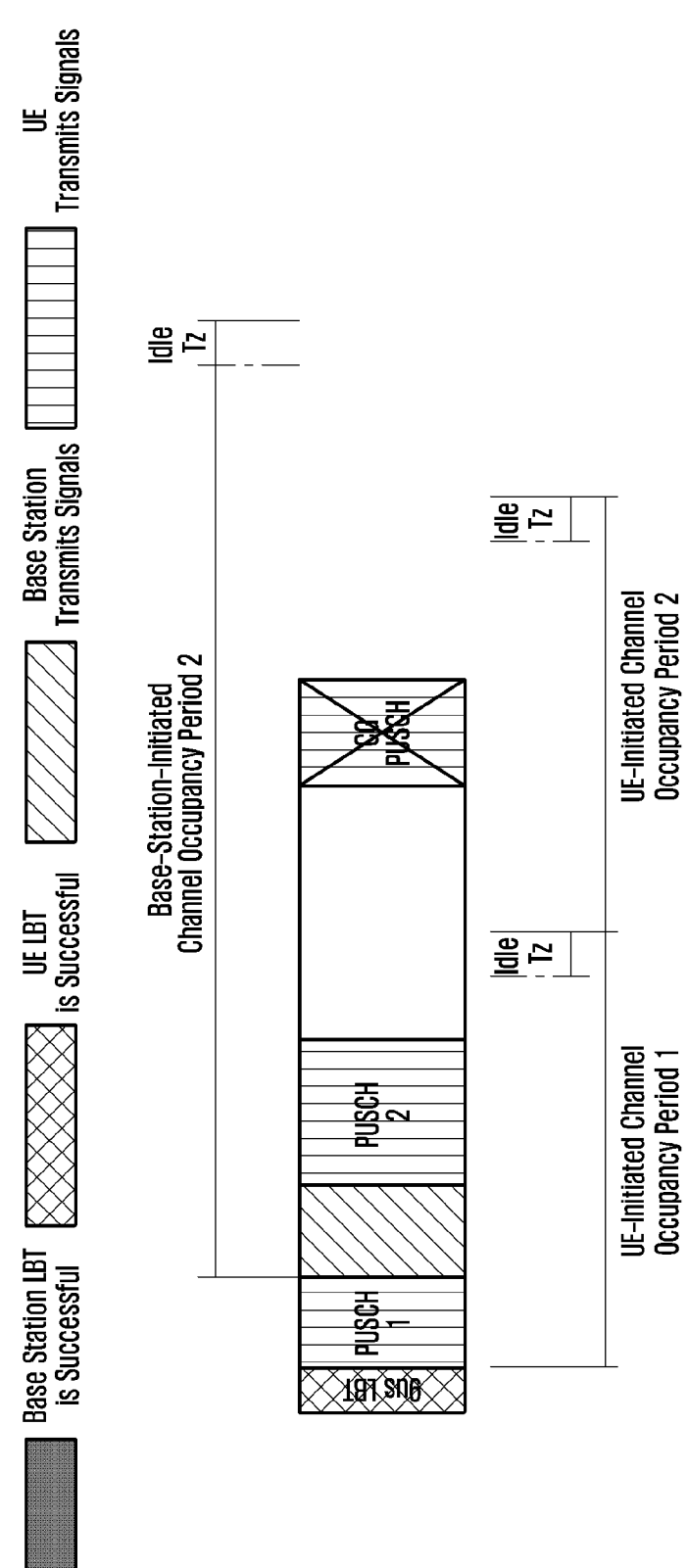
FIG. 12C illustrates another example in which base-station-initiated channel occupancy may be shared with a UE according to the disclosure.

As shown in FIG. 12C, before UE-initiated channel occupancy period 1, the UE performs a 9 μs LBT, and the UE initiates channel occupancy period 1. Before UE-initiated channel occupancy period 2, the UE does not perform LBT, and the UE does not initiate channel occupancy period 2. Before base-station-initiated channel occupancy period 2, the base station does not perform LBT, and the base station does not initiate channel occupancy period 2. The UE detects a downlink signal within base-station-initiated channel occupancy period 2, indicating that the base station does not occupy the channel, or this downlink signal does not contain an indication of whether the base station occupies the channel, and the UE assumes that the base station does not initiate channel occupancy. The UE cannot transmit this CG PUSCH because neither the base station nor the UE initiates channel occupancy.

Preferably, if the downlink signal detected by the UE is located within the resources for the channel occupancy successfully initiated by the UE, and this downlink signal is located at the starting position of the base-station-initiated channel occupancy, the UE assumes that the base station successfully initiates the channel occupancy where this downlink signal is located, and the base station shares this channel occupancy with the UE. Accordingly, the base station should guarantee that a corresponding LBT is carried out before the beginning of this channel occupancy.

Figure 12D:
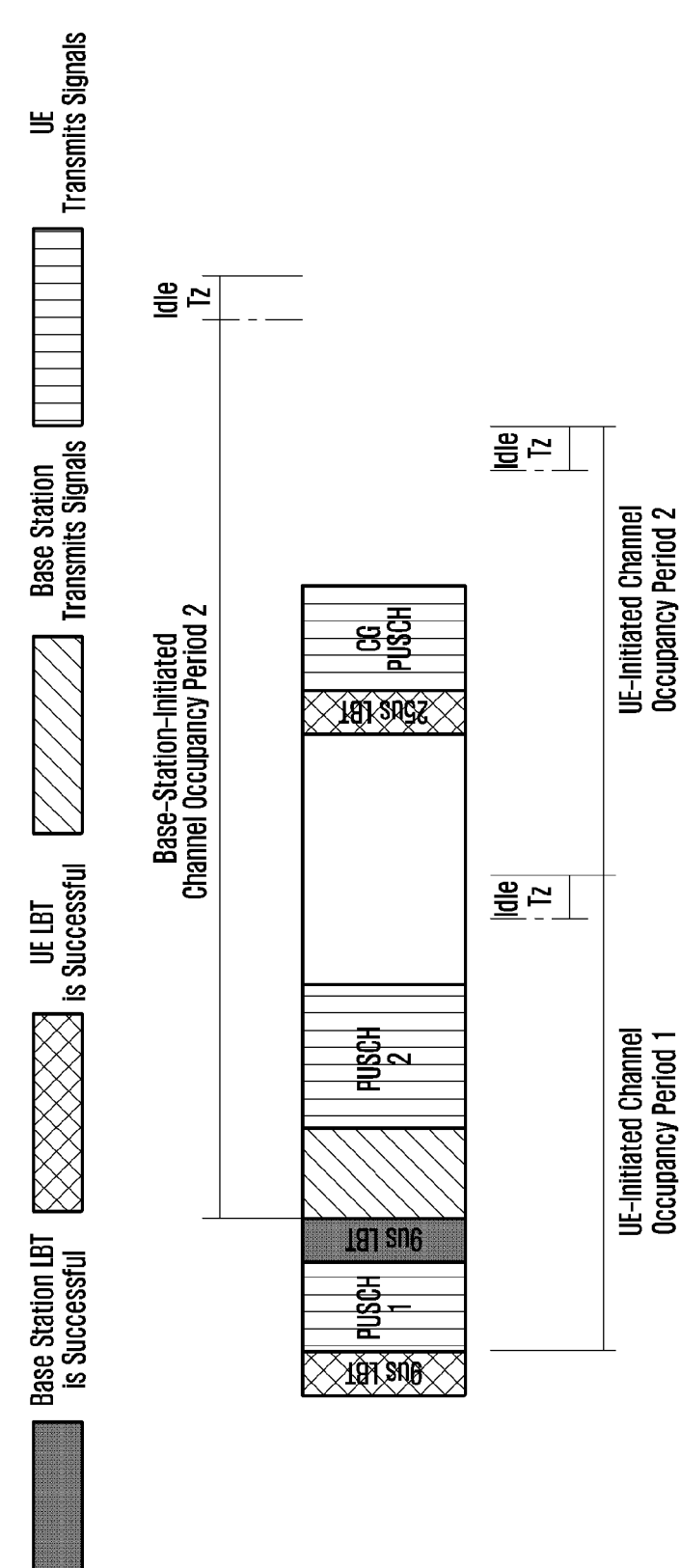
FIG. 12D illustrates another example in which base-station-initiated channel occupancy may be shared with a UE according to the disclosure.

As shown in FIG. 12D, if the UE detects a downlink signal at the starting position of base-station-initiated channel occupancy period 2, then the UE assumes that the base station successfully initiates the channel occupancy, and the UE may transmit CG PUSCH within this channel occupancy period. Accordingly, the base station performs a 9 μs LBT before initiating channel occupancy period 2.

Preferably, if the downlink signal detected by the UE is located at the starting position of the base-station-initiated channel occupancy, the UE assumes that the base station successfully initiates the channel occupancy where this downlink signal is located, and the base station shares this channel occupancy with the UE. Accordingly, the base station should guarantee that a corresponding LBT is performed before the beginning of this channel occupancy.

Preferably, according to the type of the detected downlink signal, the UE determines whether the base station initiates the channel occupancy where this downlink signal is located and whether this channel occupancy is shared with the UE. If the detected downlink signal is the first type of downlink signal, the UE assumes that the base station successfully initiates the channel occupancy where this downlink signal is located. Accordingly, the base station should guarantee that, if there is a downlink signal of the first type in one base-station-initiated channel occupancy period, the base station initiates this channel occupancy, and performs a corresponding LBT before the beginning of this channel occupancy. The first type of downlink signal at least includes one of:

1. Non-unicast signals
2. Signals configured by system information
3. Cell-common or user-group-common signals
4. SS/PBCHs
5. SS/PBCHs configured by ssb-PositionsInBurst
6. PDCCHs located in Type-0 PDCCH common search space
7. PDCCHs located in Type-0A PDCCH common search space
8. PDCCHs located in Type-1 PDCCH common search space
9. PDCCHs located in Type-2 PDCCH common search space
10. PDCCHs located in Type-3 PDCCH common search space
11. PDCCHs located in Type-3 PDCCH common search space, and the CRC scrambling of the PDCCHs is not with UE-specific RNTI, such as C-RNTI, MCS-C-RNTI and CS-RNTI.

Preferably, if the detected downlink signal is the second type of downlink signal (there is no intersection between the first type of downlink signal and the second type of downlink signal), the UE also needs to judge whether the station initiates the channel occupancy where this downlink signal is located according to other conditions, including whether this downlink signal is located at the starting position of the base-station-initiated channel occupancy. If this downlink signal is located at the starting position of the base-station-initiated channel occupancy, the UE assumes that the base station successfully initiates the channel occupancy where this downlink signal is located.

Preferably, in combination with Mode 1 and Mode 2, if the downlink signal detected by the UE is located at the starting position of the base-station-initiated channel occupancy, the UE assumes that the base station successfully initiates the channel occupancy where this downlink signal is located, and the base station shares this channel occupancy with the UE. If the downlink signal detected by the UE is not located at the starting position of the base-station-initiated channel occupancy, and this downlink signal contains information indicating the channel occupancy by the base station, the UE assumes that the base station successfully initiates the channel occupancy where this downlink signal is located, and the base station shares this channel occupancy with the UE. If the downlink signal detected by the UE is not located at the starting position of the base-station-initiated channel occupancy, and this downlink signal does not contain information indicating the channel occupancy by the base station, the UE cannot assume that the base station successfully initiates the channel occupancy in which this downlink signal is located. Preferably, if the UE detects a downlink signal, the UE assumes that the base station successfully initiates the channel occupancy where this downlink signal is located. Accordingly, no matter whether this downlink signal is located within one channel occupancy initiated by the UE or not, the base station should guarantee that a corresponding LBT is carried out before the beginning of this channel occupancy. That is, if the base station transmits a downlink signal in the base-station-initiated channel occupancy, the base station should guarantee that a corresponding LBT is carried out before the beginning of this channel occupancy.

Figure 12E:
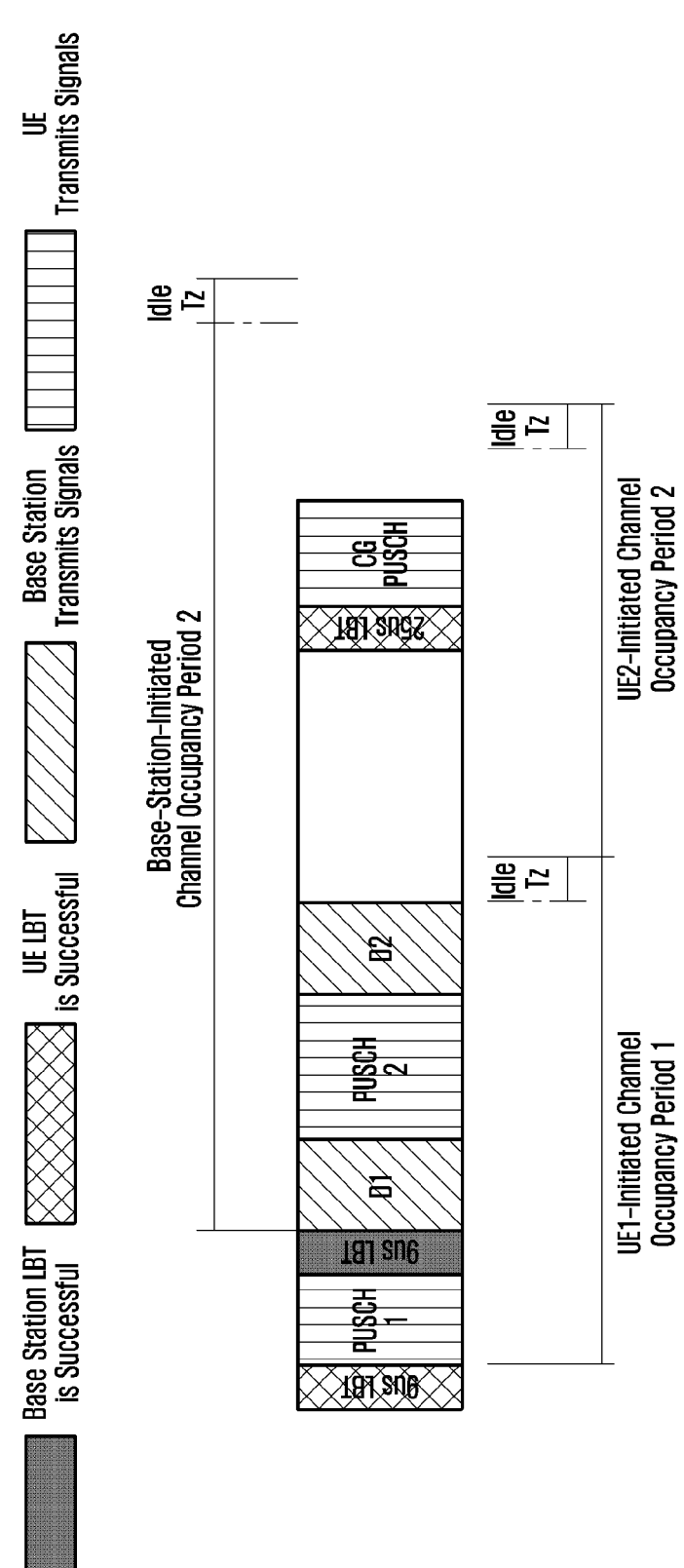
FIG. 12E illustrates another example in which base-station-initiated channel occupancy may be shared with a UE according to the disclosure.

As shown in FIG. 12E, if UE2 does not detect a downlink signal at the starting point of base-station-initiated channel occupancy period 2, for example, misses D1, but detects a downlink signal at the middle position (D2 shown in the figure), then UE2 assumes that the base station successfully initiates the channel occupancy, and UE2 may transmit CG PUSCH within this channel occupancy period. Accordingly, the base station performs a 9 μs LBT before initiating channel occupancy period 2.

Preferably, according to whether the base station configures the UE-initiated channel occupancy, the ways for the UE to determine whether the base station initiates channel occupancy and share it with the UE may be different. For example, the base station only configures the base-station-initiated channel occupancy, but does not configure the UE-initiated channel occupancy, so the UE determines whether the base station successfully initiates channel occupancy according to whether a downlink signal is detected within the channel occupancy time of the base station. If the base station configures the base-station-initiated channel occupancy and the UE-initiated channel occupancy, the UE determines whether the base station initiates channel occupancy according to at least one of the methods described above.

Preferably, the base station configures the UE to determine whether the base station initiates channel occupancy according to at least one of the above methods. This configuration information is UE-specific configuration or UE-group-common configuration information. For example, the base station configures the UE to determine whether the base station initiates channel occupancy according to Mode 1. For another example, according to the configuration of the base station, if any downlink signal is detected within one base-station-initiated channel occupancy period, the UE assumes that the base station initiates channel occupancy. Such configuration is beneficial to backward compatibility of one network when there are both a lower version of UE and a new version of UE in the network, and respective UEs may operate normally.

Preferably, if the UE determines that the base station initiates channel occupancy and shares it with the UE, the UE may receive CSI-RS within the channel occupancy. The CSI-RS is a CSI-RS configured by the higher layer signaling. The CSI-RS is located in a downlink symbol, or the CSI-RS is located in a semi-statically configured flexible symbol and the UE is not configured to receive SFI.

If the UE determines that the base station does not initiate one base-station-initiated channel occupancy, it determines whether to receive CSI-RS according to one of the following methods:

(1) If the UE determines that the base station does not initiate one base-station-initiated channel occupancy, the UE does not receive the CSI-RS resources within the channel occupancy.

(2) If the UE determines that the base station does not initiate a channel occupancy, and the UE initiates a channel occupancy, the UE does not receive the CSI-RS resources outside the UE-initiated channel occupancy and within the base-station-initiated channel occupancy. The UE receives the CSI-RS resources within the UE-initiated channel occupancy. The CSI-RS is a CSI-RS configured by the higher layer signaling. The CSI-RS is located in a downlink symbol, or the CSI-RS is located in a semi-statically configured flexible symbol and the UE is not configured to receive SFI.

(3) If the UE determines that the base station does not initiates a channel occupancy, and the UE receives information indicating the COT remaining time, for example, CO-Duration-r16 indicates 2 slots, the UE receives the CSI-RS resources within the 2 slots. The CSI-RS is a CSI-RS configured by the higher layer signaling. The CSI-RS is located in a downlink symbol, or the CSI-RS is located in a semi-statically configured flexible symbol and the UE is not configured to receive SFI.

Figure 9:
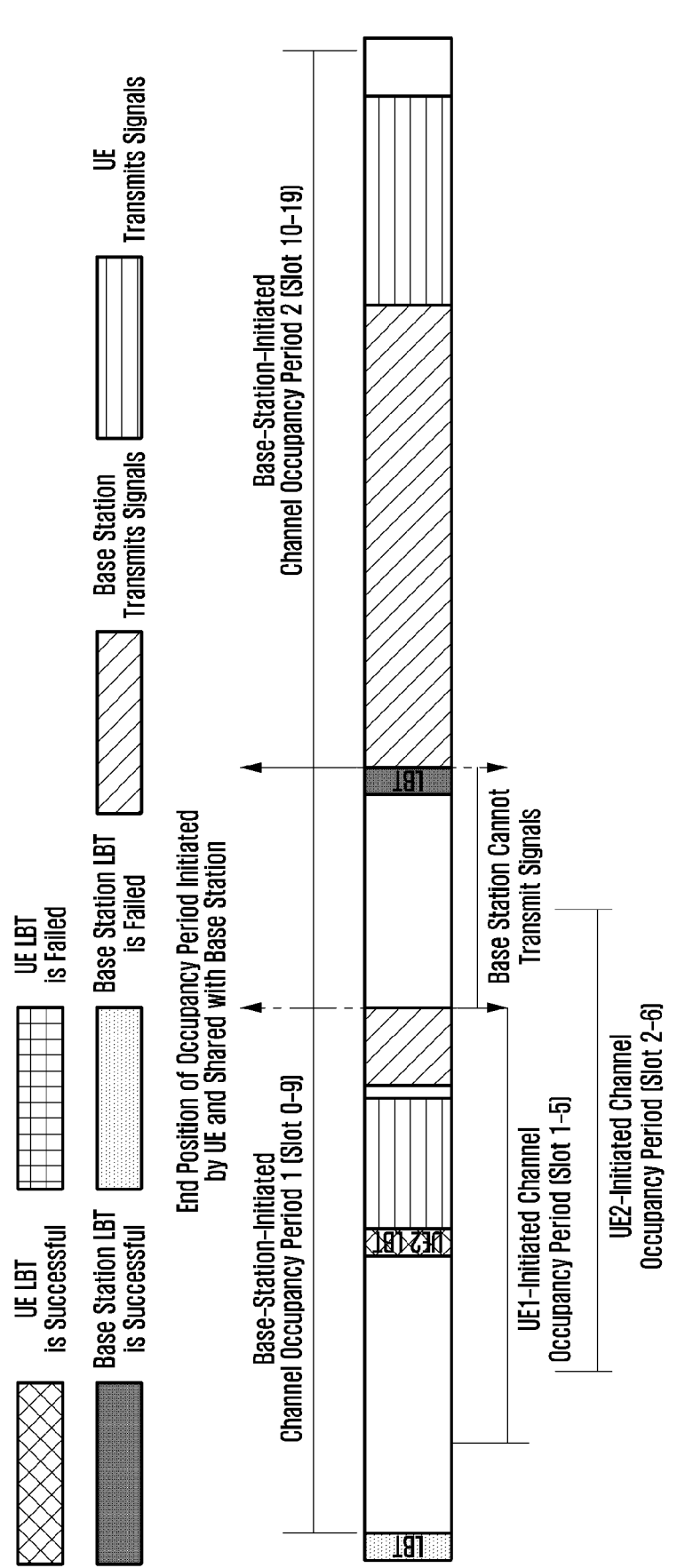
FIG. 9 illustrates an example of determining channel occupancy time shared by a UE with a base station according to the disclosure.

Preferably, if the base station transmits a signal within the channel occupancy time initiated by the UE and shared with the base station, the base station determines the end position of the channel occupancy time shared by the UE with the base station according to the earliest end position of the UE channel occupancy time. As shown in FIG. 9, the base station fails in the LBT before slot 0, and the base station cannot initiate channel occupancy (slot 0-slot 9). The channel occupancy which may be initiated by UE1 is slot 1-5, and the channel occupancy which may be initiated by UE2 is slot 2-6. UE1 does not initiate channel occupancy, and UE2 initiates channel occupancy after successfully performing LBT before slot 2. The base station receives a uplink signal PRACH in slot 2, and the base station cannot distinguish whether the received PRACH comes from UE1 or UE2, so the base station cannot judge whether UE1 or UE2 share the channel with the base station. Thus the base station determines the end position of the channel occupancy time shared with the base station according to the earliest end position of the channel occupancy time of UE1 and UE2, that is, the end position of slot 5. Then, although the end position of the channel occupancy of UE2 is at slot 6, the base station can only transmit downlink signals before the end of slot 5, and cannot transmit downlink signals from slot 6 to slot 9. According to another example, for the same UE, the parameters for UE-initiated channel occupancy configured by system information are different from those configured by UE-specific signaling. For example, the UE-initiated channel occupancy configured by system information is slot 1-5, and the channel occupancy configured by UE-special signaling is slot 2-6. When the base station receives a contention-based PRACH in slot 2, the base station cannot judge whether the end position of the occupancy time shared by the UE with the base station is slot 5 or slot 6. At this time, the base station determines the end position of the channel occupancy time shared with the base station according to the earliest possible end position of the channel occupancy time, that is, the end position of slot 5.

Preferably, the base station may determine the time resources for downlink signal transmission based on the resources for the base-station-initiated and/or UE-initiated channel occupancy. Preferably, the resources may be determined according to information related to spectrum occupancy. Preferably, the resources may be determined according to the configuration information.

In a first type of communication procedure, the base station determines the time resources available for downlink signal transmission according to the resources for the base-station-initiated and/or UE-initiated channel occupancy. In a second type of communication procedure, the base station determines the time resources available for downlink signal transmission according to the resources for the base-station-initiated channel occupancy. Preferably, the second type of communication procedure is a random access procedure. Preferably, the second type of communication procedure is a contention-based random access procedure.

Figure 10B:
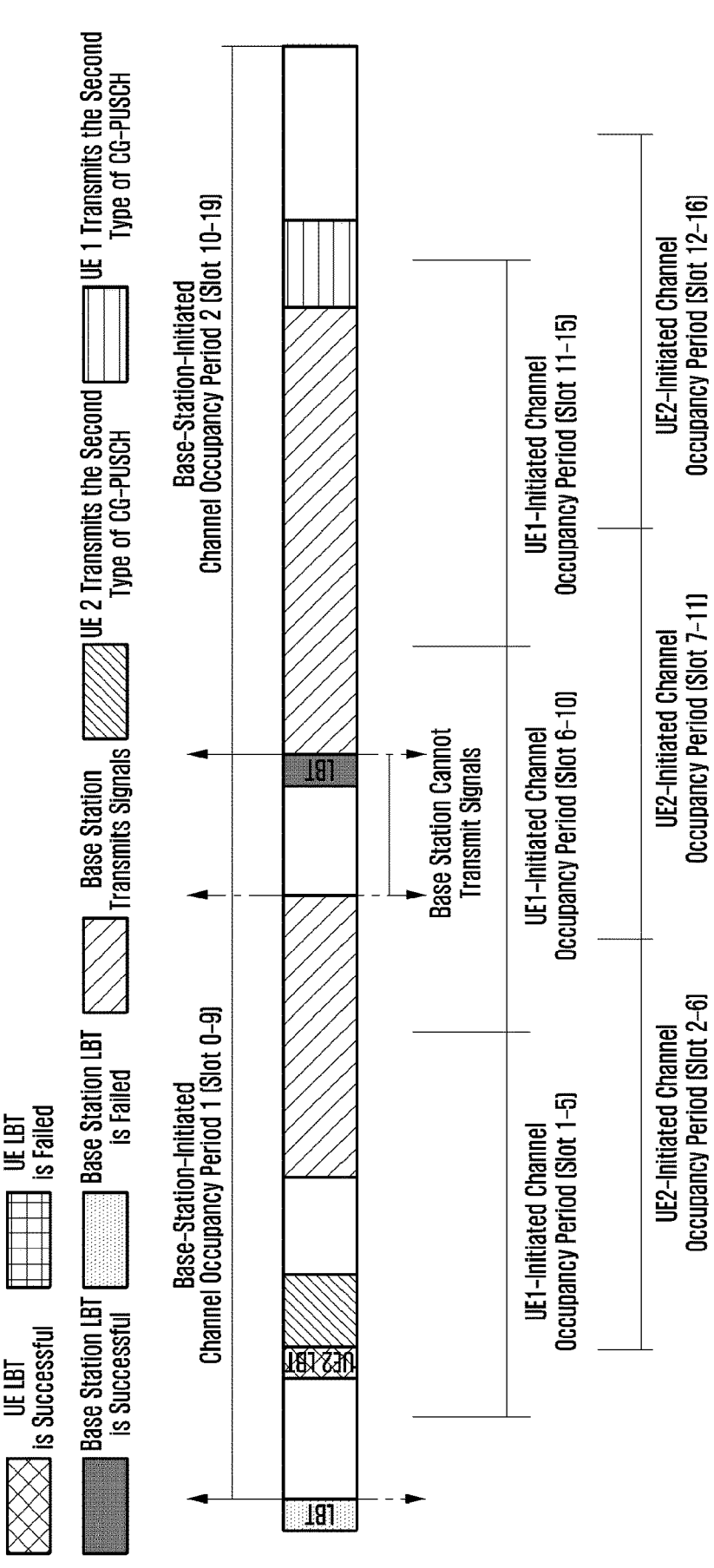
FIG. 10B illustrates another example in which a base station determines time resources available for downlink signal transmission according to the disclosure.

In this way, if the base station cannot determine which UE-initiated channel occupancy resources may be used to transmit downlink signals in the second type of communication procedure, the base station may still accurately judge the time resources available for downlink signal transmission. For example, in a contention-based random access procedure, the base station cannot judge, through the received PRACH, which UE adopts which kind of channel occupancy parameters to determine the UE-initiated channel occupancy, and the base station cannot judge which time resources belong to this channel occupancy and may be used to transmit downlink signals, such as transmitting RAR responses. However, in other procedures, such as a contention-free random access procedure or a receiving procedure for CG-PUSCH/semi-statically configured SRS, the base station may uniquely determine, through the received uplink signals, the UE and determine the time resources for the UE-initiated channel occupancy, so the base station may determine to transmit downlink signals within the time resources for this channel occupancy. As shown in FIG. 10A, the base station fails in the LBT before slot 0, and the base station cannot initiate channel occupancy (slot 0-slot 9). The channel occupancy which may be initiated by UE1 is slot 1-5, and the channel occupancy which may be initiated by UE2 is slot 2-6. UE1 does not initiate channel occupancy, and UE2 initiates channel occupancy after successfully performing LBT before slot 2. The base station receives a contention-based PRACH signal in slot 2, the base station does not transmit downlink signals in base-station-initiated channel occupancy period 1, and the base station performs LBT before the beginning of base-station-initiated channel occupancy period 2. If the LBT is successful, the base station may transmit downlink signals. As shown in FIG. 10B, the base station fails in the LBT before slot 0, and the base station cannot initiate channel occupancy (slot 0-slot 9). UE2 initiates channel occupancy after successfully performing LBT before slot 2, and transmits a CG-PUSCH in slot 2. Because CG-PUSCH resources are independently configured for UE2 by the base station, the base station may judge, by receiving the CG-PUSCH, that it is UE2 that transmits the signal, so it may be judged that slots 2-6 are the channel occupancy initiated by UE2. The base station may transmit signals until the end of slot 6.

Preferably, if the uplink signal at the starting point of the UE-initiated channel occupancy is an uplink signal configured by the higher layer, the base station may dynamically control whether the UE initiates channel occupancy. If the base station cancels the transmission of this uplink signal, for example, the base station transmits slot format indication (SFI) information indicating that at least part of symbols of this uplink signal are flexible symbols or downlink symbols, then the UE does not transmit the uplink signal, and the UE-initiated channel occupancy where this uplink signal is located is cancelled.

Preferably, if the uplink signal at the starting point of the UE-initiated channel occupancy is the uplink signal scheduled by the base station, the base station may dynamically control, by scheduling the control information of this uplink signal, whether the UE initiates channel occupancy or not. For example, the base station may dynamically control, by scheduling the UL LBT information in the DCI of uplink transmission, whether the UE initiates channel occupancy. The UL LBT information includes at least one of: instructing the UE to perform a 9 μs LBT immediately before the starting point of the transmission signal, instructing the UE not to perform LBT, instructing the UE to perform a 9 μs LBT at least once within one X μs immediately before the starting point of the transmission signal, e.g., X=25 μs, or instructing the UE to perform a 9 μs LBT without limiting whether the UE performs a 9 μs LBT immediately before the starting point of the transmission signal or performs the 9 μs LBT at least once within X μs. If the base station schedules the UE to transmit an uplink signal, and this uplink signal is located at the starting point of the UE-initiated channel occupancy, and the base station indicates that the LBT type of this uplink signal is the LBT type of UE-initiated channel occupancy, then the UE transmits this uplink signal and initiates the channel occupancy where this uplink signal is located; if the base station indicates that the LBT type of this uplink signal is not performing LBT, the UE transmits this uplink signal, but the UE-initiated channel occupancy where this uplink signal is located is cancelled. Preferably, if the base station schedules the UE to transmit an uplink signal, and this uplink signal is located at the starting point of the UE-initiated channel occupancy, and the base station indicates that the LBT type of this uplink signal is more conservative than the LBT type of UE-initiated channel occupancy, for example, Type 2/2A 25 μs LBT (the UE needs to perform the at least 9 μs LBT once in the 16 μs and in the 9 μs respectively), then the UE transmits this uplink signal and the UE initiates the channel occupancy where this uplink signal is located. Preferably, if the base station schedules UE to transmit an uplink signal and this uplink signal is located at the starting point of the UE-initiated channel occupancy, and the base station indicates that the LBT type of this uplink signal is not the LBT type of UE-initiated channel occupancy, for example, not performing LBT, then the UE transmits this uplink signal, but the UE-initiated channel occupancy where this uplink signal is located is cancelled. Preferably, if the base station schedules the UE to transmit an uplink signal, and this uplink signal is located at the starting point of the UE-initiated channel occupancy, and the base station indicates that the LBT type of this uplink signal is UE performing a 9 μs LBT at least once within one X μs, for example, X=25 μs, then the UE transmits this uplink signal, but the UE-initiated channel occupancy where this uplink signal is located is cancelled. Preferably, if the base station schedules the UE to transmit an uplink signal, and this uplink signal is located at the starting point of the UE-initiated channel occupancy, and the base station indicates that the LBT type of the uplink signal is the 9 μs LBT type, and it is not differentiated whether the UE performs a 9 μs LBT immediately before the starting point of the transmission signal, or performs a 9 μs LBT at least once within one X μs, then the UE needs to perform a 9 μs LBT immediately before the starting point of the transmission signal, and transmit this uplink signals. And the UE initiates the channel occupancy where this uplink signal is located. If this uplink signal is not located at the starting point of the UE-initiated channel occupancy, the UE itself may choose whether to perform a 9 μs LBT immediately before the starting point of the transmission signal, or perform the 9 μs LBT at least once within one X μs.

In some scenarios, the standard predefines a UL LBT information indication set which may be used for both semi-static channel occupancy and dynamic channel occupancy. This UL LBT information indication set includes not performing LBT, Type 2/2A 25 μs LBT, Type 2B 16 μs LBT and Type 1 LBT (also known as Cat-4 LBT). Preferably, when the UE is configured to operate in semi-static channel occupancy, if the base station indicates in the DCI for scheduling uplink transmission that the UL LBT information is Type 2/2A LBT or Type 1 LBT, the UE may perform the 9 μs LBT at least once within one X μs. Preferably, when the UE is configured to operate in semi-static channel occupancy, if the base station indicates in the DCI for scheduling uplink transmission that the UL LBT information is Type 2/2A LBT or Type 1 LBT, and the uplink transmission scheduled by this DCI is located at the starting point of the UE-initiated channel occupancy, the UE needs to perform a 9 μs LBT immediately before the starting point of the transmission signal; if the uplink transmission scheduled by this DCI is not located at the starting point of the UE-initiated channel occupancy, the UE performs the 9 μs LBT at least once within X μs immediately before the starting point of the transmission signal, for example, X=25 μs. Preferably, when the UE is configured to operate in semi-static channel occupancy, if the base station indicates in the DCI for scheduling uplink transmission that the UL LBT information is Type 1 LBT, the UE performs a 9 μs LBT immediately before the starting point of the transmission signal; if the base station indicates in the DCI for scheduling uplink transmission that the UL LBT information is Type 2A LBT, the UE performs the 9 μs LBT at least once within X μs immediately before the starting point of the transmission signal, for example, X=25 μs. Accordingly, if the UE receives the DCI indicating Type 1 LBT and the uplink transmission scheduled by this DCI is located at the starting point of the UE-initiated channel occupancy, the UE initiates the channel occupancy where this uplink signal is located; if the UE receives the DCI indicating Type 2A LBT, the UE does not initiate the channel occupancy where this uplink signal is located. Preferably, when the UE is configured to be able to initiate UE channel occupancy, or is configured to be able to only use base-station-initiated channel occupancy, the LBT type is determined according to LBT indication information in different ways. For example, if the UE is configured to be able to use only the base-station-initiated channel occupancy, and if the LBT type indicated by the DCI is Type2/2A/1, the UE performs the 9 μs LBT at least once within X μs immediately before the starting point of the transmission signal, for example, X=25 μs; if the UE is configured to be able to initiate UE channel occupancy, and if the LBT type indicated by the DCI is Type2/2A, the UE performs the 9 μs LBT at least once within X μs immediately before the starting point of the transmission signal, for example, X=25 μs; if the LBT type indicated by the DCI is Type 1, the UE performs a 9 μs LBT immediately before the starting point of the transmission signal. According to one aspect of the present invention, if one UE is configured to operate in semi-static channel occupancy mode, and if the UE is configured with an indication for monitoring the time length of channel occupancy, and the UE monitors that the base station successfully initiates channel occupancy but fails to monitor the time length indication, then the UE assumes that the base station successfully initiates channel occupancy, and the time length of channel occupancy is equal to the period of semi-static channel occupancy. If one UE is configured to operate in semi-static channel occupancy mode, and if the UE is not configured with an indication for monitoring the time length of channel occupancy, and the UE monitors that the base station successfully initiates channel occupancy within one semi-static channel occupancy time, then the UE assumes that the time length of the base-station-initiated channel occupancy is equal to the period of semi-static channel occupancy. The UE may transmit signals on the time resources other than Tz time before the beginning of the next period within the channel occupancy time shared by the base station with the UE. The UE may receive reference signals for channel state information (CSI) measurement on the time resources other than Tz time before the beginning of the next period within the time length of the base-station-initiated channel occupancy.

Figure 27:
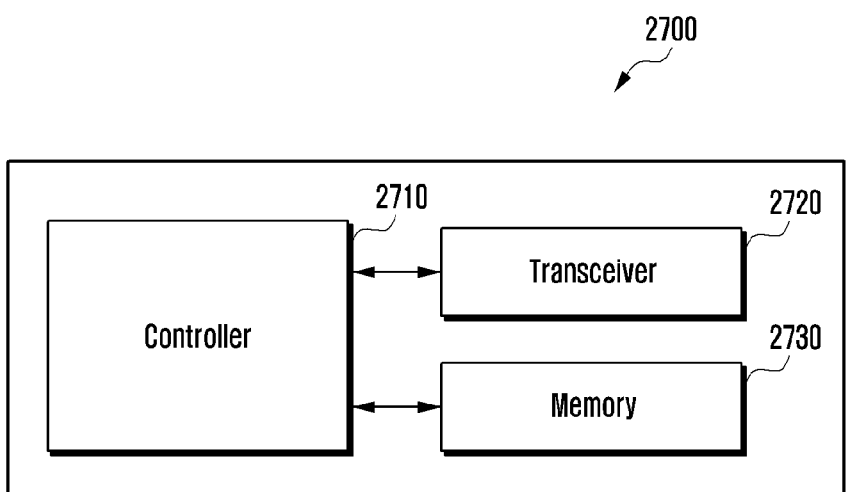
FIG. 27 illustrates a user equipment (UE) according to embodiments of the disclosure.

Preferably, the user equipment implementing the above methods or functions may include a transceiver, a memory, and a controller as described in FIG. 27. Preferably, the controller may implement the above functions or include separate components or modules corresponding to the above functions. Also, the base station implementing the above methods or functions may include a transceiver, a memory, and a controller as described in FIG. 28. Preferably, the controller may implement the above functions or include separate components or modules corresponding to the above functions.

For a more efficient communication system, there is a need for a method of reducing relay and improving reliability. This will be described below taken in conjunction with the accompanying drawings.

Figure 15:
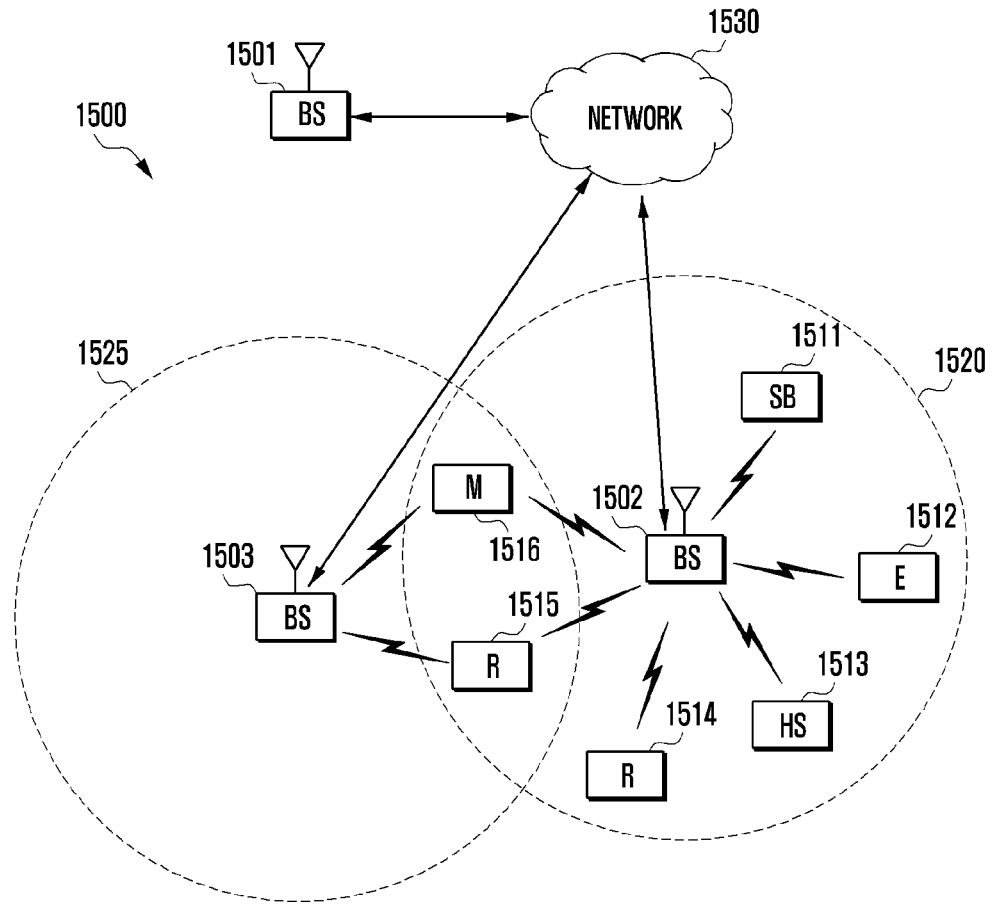
FIG. 15 illustrates an example wireless network according to various embodiments of the disclosure.

FIG. 15 illustrates an example wireless network 1500 according to various embodiments of the disclosure. The embodiment of the wireless network 1500 shown in FIG. 15 is for illustration only. Other embodiments of the wireless network 1500 can be used without departing from the scope of the disclosure.

The wireless network 100 includes a gNodeB (gNB) 1501, a gNB 1502, and a gNB 1503. gNB 1501 communicates with gNB 1502 and gNB 1503. gNB 1501 also communicates with at least one Internet Protocol (IP) network 1530, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 1530 for a first plurality of User Equipments (UEs) within a coverage area 1520 of gNB 1502. The first plurality of UEs include a UE 111, which may be located in a Small Business (SB); a UE 1512, which may be located in an enterprise (E); a UE 1513, which may be located in a WiFi Hotspot (HS); a UE 1514, which may be located in a first residence (R); a UE 115, which may be located in a second residence (R); a UE 1516, which may be a mobile device (M), such as a cellular phone, a wireless laptop computer, a wireless PDA, etc. GNB 1503 provides wireless broadband access to network 1530 for a second plurality of UEs within a coverage area 1525 of gNB 1503. The second plurality of UEs include a UE 1515 and a UE 1516. In some embodiments, one or more of gNBs 1501-1503 can communicate with each other and with UEs 1511-1516 using 5G, Long Term Evolution (LTE), LTE-A, WiMAX or other advanced wireless communication technologies.

The dashed lines show approximate ranges of the coverage areas 1520 and 1525, and the ranges are shown as approximate circles merely for illustration and explanation purposes. It should be clearly understood that the coverage areas associated with the gNBs, such as the coverage areas 1520 and 1525, may have other shapes, including irregular shapes, depending on configurations of the gNBs and changes in the radio environment associated with natural obstacles and man-made obstacles.

As will be described in more detail below, one or more of gNB 1501, gNB 1502, and gNB 1503 include a 2D antenna array as described in embodiments of the disclosure. In some embodiments, one or more of gNB 1501, gNB 1502, and gNB 1503 support codebook designs and structures for systems with 2D antenna arrays.

Although FIG. 15 illustrates an example of the wireless network 1500, various changes can be made to FIG. 1. The wireless network 1500 can include any number of gNBs and any number of UEs in any suitable arrangement, for example. Furthermore, gNB 1501 can directly communicate with any number of UEs and provide wireless broadband access to the network 1530 for those UEs. Similarly, each gNB 1502-1503 can directly communicate with the network 1530 and provide direct wireless broadband access to the network 1530 for the UEs. In addition, gNB 1501, 1502 and/or 1503 can provide access to other or additional external networks, such as external telephone networks or other types of data networks.

Figure 16A:
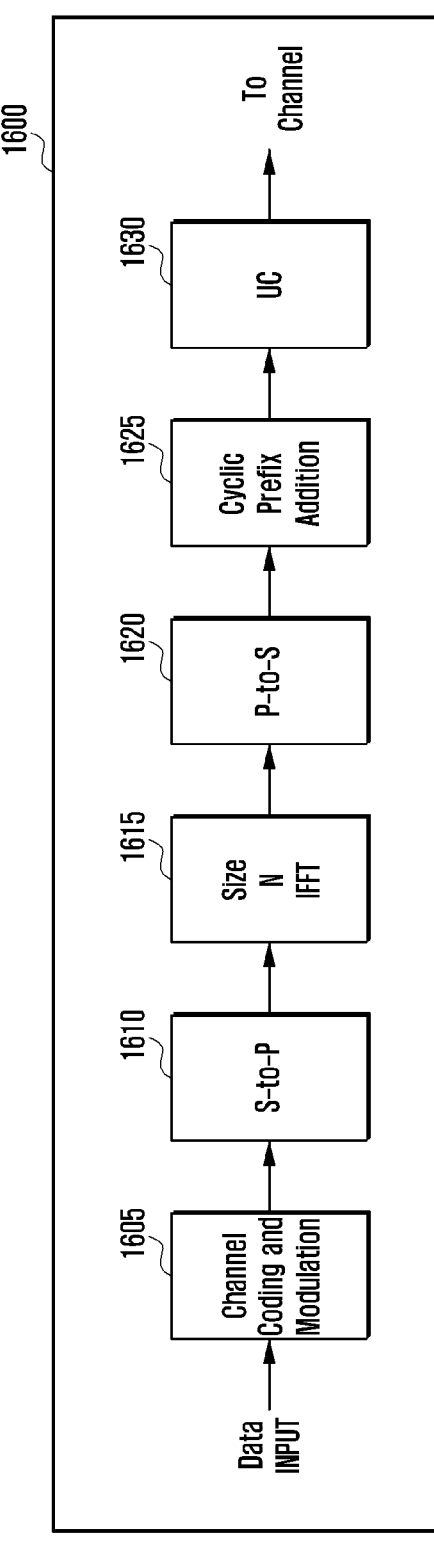
FIG. 16A illustrates an example wireless transmission path according to the disclosure.
Figure 16B:
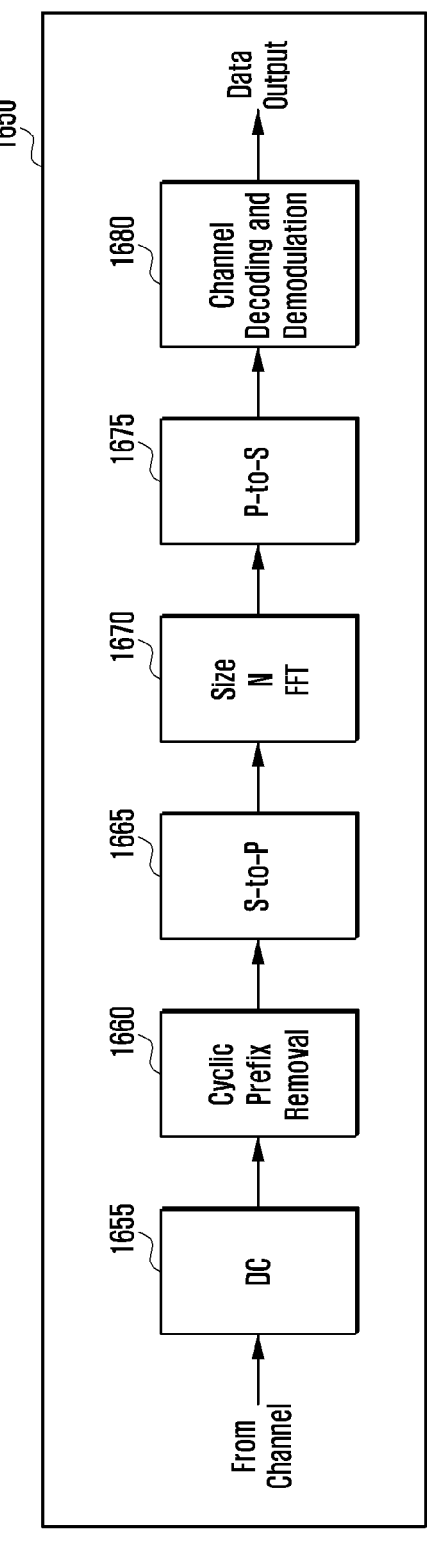
FIG. 16B illustrates an example wireless reception path according to the disclosure.

FIGS. 16A and 16B illustrate example wireless transmission and reception paths according to the disclosure. In the following description, the transmission path 1600 can be described as being implemented in a gNB, such as gNB 1502, and the reception path 1650 can be described as being implemented in a UE, such as UE 1516. However, it should be understood that the reception path 1650 can be implemented in a gNB and the transmission path 1600 can be implemented in a UE. In some embodiments, the reception path 1650 is configured to support codebook designs and structures for systems with 2D antenna arrays as described in embodiments of the disclosure.

The transmission path 1600 includes a channel coding and modulation block 1605, a Serial-to-Parallel (S-to-P) block 1610, a size N Inverse Fast Fourier Transform (IFFT) block 1615, a Parallel-to-Serial (P-to-S) block 1620, a cyclic prefix addition block 1625, and an up-converter (UC) 1630. The reception path 1650 includes a down-converter (DC) 1655, a cyclic prefix removal block 1660, a Serial-to-Parallel (S-to-P) block 1665, a size N Fast Fourier Transform (FFT) block 1670, a Parallel-to-Serial (P-to-S) block 1675, and a channel decoding and demodulation block 1680.

In the transmission path 1600, the channel coding and modulation block 1605 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 1610 converts (such as demultiplexes) serial modulated symbols into parallel data to generate N parallel symbol streams, where N is a size of the IFFT/FFT used in gNB 1502 and UE 1516. The size N IFFT block 1615 performs IFFT operations on the N parallel symbol streams to generate a time-domain output signal. The Parallel-to-Serial block 1620 converts (such as multiplexes) parallel time-domain output symbols from the Size N IFFT block 1615 to generate a serial time-domain signal. The cyclic prefix addition block 1625 inserts a cyclic prefix into the time-domain signal. The up-converter 1630 modulates (such as up-converts) the output of the cyclic prefix addition block 1625 to an RF frequency for transmission via a wireless channel. The signal can also be filtered at a baseband before switching to the RF frequency.

The RF signal transmitted from gNB 1502 arrives at UE 1516 after passing through the wireless channel, and operations in reverse to those at gNB 1502 are performed at UE 1516. The down-converter 1655 down-converts the received signal to a baseband frequency, and the cyclic prefix removal block 1660 removes the cyclic prefix to generate a serial time-domain baseband signal. The Serial-to-Parallel block 1665 converts the time-domain baseband signal into a parallel time-domain signal. The Size N FFT block 1670 performs an FFT algorithm to generate N parallel frequency-domain signals. The Parallel-to-Serial block 1675 converts the parallel frequency-domain signal into a sequence of modulated data symbols. The channel decoding and demodulation block 1680 demodulates and decodes the modulated symbols to recover the original input data stream.

Each of gNBs 1501-1503 may implement a transmission path 1600 similar to that for transmitting to UEs 1511-1516 in the downlink, and may implement a reception path 1650 similar to that for receiving from UEs 1511-1516 in the uplink. Similarly, each of UEs 1511-1516 may implement a transmission path 1600 for transmitting to gNBs 1501-1503 in the uplink, and may implement a reception path 1650 for receiving from gNBs 1501-1503 in the downlink.

Each of the components in FIGS. 16A and 16B can be implemented using only hardware, or using a combination of hardware and software/firmware. As a specific example, at least some of the components in FIGS. 16A and 16B may be implemented in software, while other components may be implemented in configurable hardware or a combination of software and configurable hardware. For example, the FFT block 1670 and IFFT block 1615 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 16A and 16B illustrate examples of wireless transmission and reception paths, various changes may be made to FIGS. 16A and 16B. For example, various components in FIGS. 16A and 16B can be combined, further subdivided or omitted, and additional components can be added according to specific requirements. Furthermore, FIGS. 16A and 16B are intended to illustrate examples of types of transmission and reception paths that can be used in a wireless network. Any other suitable architecture can be used to support wireless communication in a wireless network.

Figure 17A:
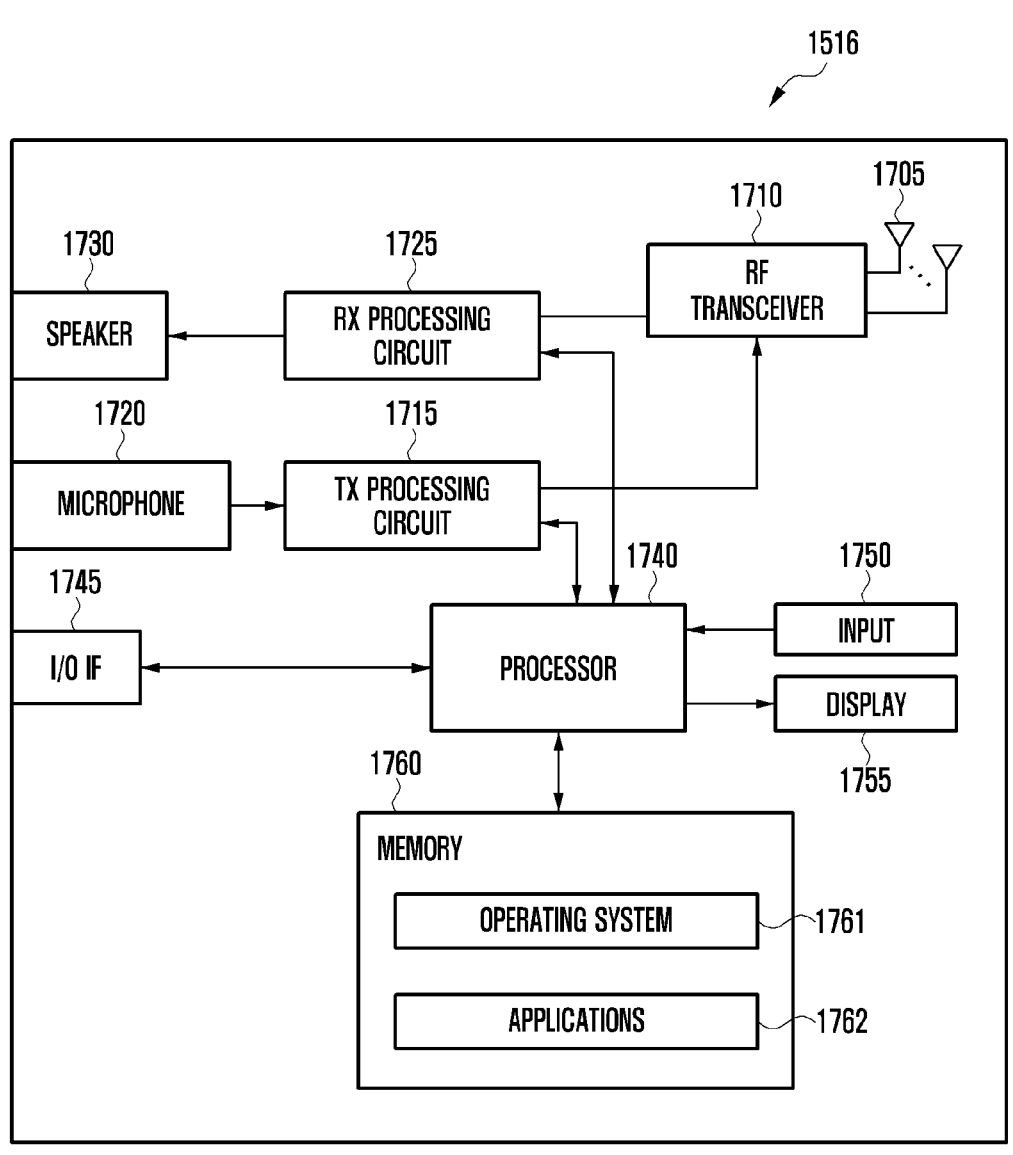
FIG. 17A illustrates an example user equipment (UE) according to the disclosure.

FIG. 17A illustrates an example UE 1516 according to the disclosure. The embodiment of UE 1516 shown in FIG. 17A is for illustration only, and UEs 1516-1515 of FIG. 15 can have the same or similar configuration. However, a UE has various configurations, and FIG. 17A does not limit the scope of the disclosure to any specific implementation of the UE.

UE 1516 includes an antenna 1705, a radio frequency (RF) transceiver 1710, a transmission (TX) processing circuit 1715, a microphone 1720, and a reception (RX) processing circuit 1725. UE 1516 also includes a speaker 1730, a processor/controller 1740, an input/output (I/O) interface 1745, an input device(s) 1750, a display 1755, and a memory 1760. The memory 1760 includes an operating system (OS) 1761 and one or more applications 1762.

The RF transceiver 1710 receives an incoming RF signal transmitted by a gNB of the wireless network 1500 from the antenna 1705. The RF transceiver 1710 down-converts the incoming RF signal to generate an intermediate frequency (IF) or baseband signal. The IF or baseband signal is transmitted to the RX processing circuit 1725, where the RX processing circuit 1725 generates a processed baseband signal by filtering, decoding and/or digitizing the baseband or IF signal. The RX processing circuit 1725 transmits the processed baseband signal to speaker 1730 (such as for voice data) or to processor/controller 1740 for further processing (such as for web browsing data).

The TX processing circuit 1740 receives analog or digital voice data from microphone 1720 or other outgoing baseband data (such as network data, email or interactive video game data) from processor/controller 1740. The TX processing circuit 1715 encodes, multiplexes, and/or digitizes the outgoing baseband data to generate a processed baseband or IF signal. The RF transceiver 1710 receives the outgoing processed baseband or IF signal from the TX processing circuit 1715 and up-converts the baseband or IF signal into an RF signal transmitted via the antenna 1705.

The processor/controller 1740 can include one or more processors or other processing devices and execute an OS

1761 stored in the memory 1760 in order to control the overall operation of UE 1516. For example, the processor/controller 1740 can control the reception of forward channel signals and the transmission of backward channel signals through the RF transceiver 1710, the RX processing circuit 1725 and the TX processing circuit 1715 according to well-known principles. In some embodiments, the processor/controller 1740 includes at least one microprocessor or microcontroller.

The processor/controller 1740 is also capable of executing other processes and programs residing in the memory 1760, such as operations for channel quality measurement and reporting for systems with 2D antenna arrays as described in embodiments of the disclosure. The processor/controller 1740 can move data into or out of the memory 1760 as required by an execution process. In some embodiments, the processor/controller 1740 is configured to execute the application 1762 based on the OS 1761 or in response to signals received from the gNB or the operator. The processor/controller 1740 is also coupled to an I/O interface 1745, where the I/O interface 1745 provides UE 1516 with the ability to connect to other devices such as laptop computers and handheld computers. I/O interface 1745 is a communication path between these accessories and the processor/controller 1740.

The processor/controller 1740 is also coupled to the input device(s) 1750 and the display 1755. An operator of UE 1516 can input data into UE 1516 using the input device(s) 1750. The display 1755 may be a liquid crystal display or other display capable of presenting text and/or at least limited graphics (such as from a website). The memory 1760 is coupled to the processor/controller 1740. A part of the memory 1760 can include a random access memory (RAM), while another part of the memory 1760 can include a flash memory or other read-only memory (ROM).

Although FIG. 17A illustrates an example of UE 1516, various changes can be made to FIG. 17A. For example, various components in FIG. 17A can be combined, further subdivided or omitted, and additional components can be added according to specific requirements. As a specific example, the processor/controller 1740 can be divided into a plurality of processors, such as one or more central processing units (CPUs) and one or more graphics processing units (GPUs). Furthermore, although FIG. 17A illustrates that the UE 1516 is configured as a mobile phone or a smart phone, UEs can be configured to operate as other types of mobile or fixed devices.

Figure 17B:
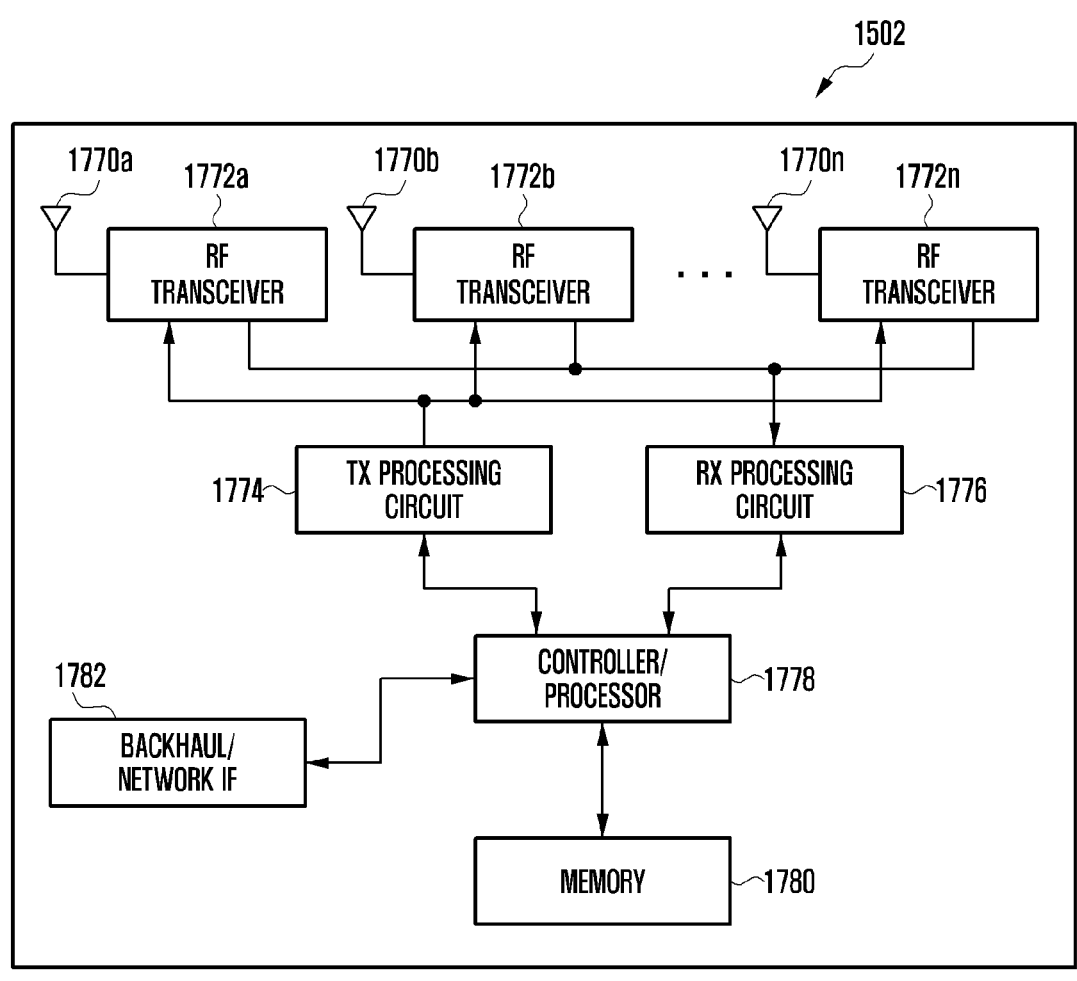
FIG. 17B illustrates an example base station according to the disclosure.

FIG. 17B illustrates an example gNB 1502 according to the disclosure. The embodiment of gNB 1502 shown in FIG. 17B is for illustration only, and other gNBs of FIG. 15 can have the same or similar configuration. However, a gNB has various configurations, and FIG. 17B does not limit the scope of the disclosure to any specific implementation of a gNB. It should be noted that gNB 1501 and gNB 1503 can include the same or similar structures as gNB 1502.

As shown in FIG. 17B, gNB 1502 includes a plurality of antennas 1770*a*-1770*n*, a plurality of RF transceivers 1772*a*-1772*n*, a transmission (TX) processing circuit 1774, and a reception (RX) processing circuit 1776. In certain embodiments, one or more of the plurality of antennas 1770*a*-1770*n* include a 2D antenna array. gNB 1502 also includes a controller/processor 1778, a memory 1780, and a backhaul or network interface 1782.

RF transceivers 1772*a*-1772*n* receive an incoming RF signal from antennas 1770*a*-1770*n*, such as a signal transmitted by UEs or other gNBs. RF transceivers 1772*a*-1772*n* down-convert the incoming RF signal to generate an IF or baseband signal. The IF or baseband signal is transmitted to the RX processing circuit 1776, where the RX processing circuit 1776 generates a processed baseband signal by filtering, decoding and/or digitizing the baseband or IF signal. RX processing circuit 1776 transmits the processed baseband signal to controller/processor 1778 for further processing.

The TX processing circuit 1774 receives analog or digital data (such as voice data, network data, email or interactive video game data) from the controller/processor 1778. TX processing circuit 1774 encodes, multiplexes and/or digitizes outgoing baseband data to generate a processed baseband or IF signal. RF transceivers 1772a-1772n receive the outgoing processed baseband or IF signal from TX processing circuit 1774 and up-convert the baseband or IF signal into an RF signal transmitted via antennas 1770a-1770n.

The controller/processor 1778 can include one or more processors or other processing devices that control the overall operation of gNB 102. For example, the controller/processor 1778 can control the reception of forward channel signals and the transmission of backward channel signals through the RF transceivers 1772a-1772n, the RX processing circuit 1776 and the TX processing circuit 1774 according to well-known principles. The controller/processor 1778 can also support additional functions, such as higher-level wireless communication functions. For example, the controller/processor 1778 can perform a Blind Interference Sensing (BIS) process such as that performed through a BIS algorithm, and decode a received signal from which an interference signal is subtracted. A controller/processor 1778 may support any of a variety of other functions in gNB 1502. In some embodiments, the controller/processor 1778 includes at least one microprocessor or microcontroller.

The controller/processor 1778 is also capable of executing programs and other processes residing in the memory 1780, such as a basic OS. The controller/processor 1778 can also support channel quality measurement and reporting for systems with 2D antenna arrays as described in embodiments of the disclosure. In some embodiments, the controller/processor 1778 supports communication between entities such as web RTCs. The controller/processor 1778 can move data into or out of the memory 1780 as required by an execution process.

The controller/processor 1778 is also coupled to the backhaul or network interface 1782. The backhaul or network interface 1782 allows gNB 1502 to communicate with other devices or systems through a backhaul connection or through a network. The backhaul or network interface 1782 can support communication over any suitable wired or wireless connection(s). For example, when gNB 1502 is implemented as a part of a cellular communication system, such as a cellular communication system supporting 5G or new radio access technology or NR, LTE or LTE-A, the backhaul or network interface 1782 can allow gNB 1502 to communicate with other gNBs through wired or wireless backhaul connections. When gNB 102 is implemented as an access point, the backhaul or network interface 1782 can allow gNB 1502 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 1780 is coupled to the controller/processor 1778. A part of the memory 1780 can include an RAM, while another part of the memory 1780 can include a flash memory or other ROMs. In certain embodiments, a plurality of instructions, such as the BIS algorithm, are stored in the memory. The plurality of instructions are configured to cause the controller/processor 1778 to execute the BIS process and decode the received signal after subtracting at least one interference signal determined by the BIS algorithm.

As will be described in more detail below, the transmission and reception paths of gNB 1502 (implemented using RF transceivers 1772a-1772n, TX processing circuit 1774 and/or RX processing circuit 1776) support aggregated communication with FDD cells and TDD cells.

Although FIG. 17B illustrates an example of gNB 1502, various changes may be made to FIG. 17B. For example, gNB 1502 can include any number of each component shown in FIG. 17A. As a specific example, the access point can include many backhaul or network interfaces 1782, and the controller/processor 1778 can support routing functions to route data between different network addresses. As another specific example, although shown as including a single instance of the TX processing circuit 1774 and a single instance of the RX processing circuit 1776, gNB 1502 can include multiple instances of each (such as one for each RF transceiver).

The exemplary embodiments of the disclosure are further described below in conjunction with the accompanying drawings.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

In a wireless communication system, a base station controls downlink reception and uplink transmission of a UE terminal by transmitting downlink control information, and the UE terminal reports information for assisting downlink scheduling and uplink reception of the base station to the base station through uplink control information. The downlink/uplink control information includes control information of physical layer, and control information of MAC layer and RRC layer, etc. The downlink control information of physical layer is carried by physical downlink control channel (PDCCH), and the uplink control information of physical layer is carried by physical uplink control channel (PUCCH) or physical uplink shared channel (PUSCH).

The invention relates to uplink transmission, including a method for transmitting PUSCH and PUCCH.

The PUCCH is used to carry uplink control information, for example, HARQ-ACK of PDSCH, CSI or SR information.

For PUCCH, the frequency-domain diversity gain may be obtained by PUCCH frequency hopping. Before RRC connection is established, the base station configures an uplink initial BWP for the UE, and the configuration is cell-specific, that is, the configuration is applicable to all the UE in the cell. Before the base station configures dedicated PUCCH resource for the UE, the UE determines PUCCH resource according to cell-common PUCCH resource configuration (for example, Table 1 below), in which frequency-domain resource locations are determined according to the uplink initial BWP. For example, the UE determines a PUCCH format, a location of the first symbol (symbol index of the symbol at starting point), a number of symbols, a PRB offset of frequency-domain starting point, and an index set of initial cyclic shift (CS), based on the PUCCH resource index rPUCCH associated with one row in Table 1 below, the rPUCCH being indicated by the base station in the system information. The UE determines frequency-domain resource of PUCCHs of the first hop and the second hop according to the PRB offset determined based on the PUCCH resource index rPUCCH indicated by the base station, the number $N_{cs}$ of code domain resources CS, and the bandwidth $N_{BWP}{}^{size}$ of the uplink initial BWP configured by the base station. For example, the PRB starting point of the first hop is $RB_{BWP}{}^{offset}+\lfloor r_{PUCCH}/N_{CS}\rfloor$, and the PRB starting point of the second hop is $N_{BWP}{}^{size}-1-RB_{BWP}{}^{offset}-\lfloor r_{PUCCH}/N_{CS}\rfloor$. Table 1 shows PUCCH resource set before confi-guring dedicated PUCCH resource.

TABLE 1

| Index | PUCCH Format | location of the first symbol | Number of symbols | PRB offset $RB_{BWP}{}^{offset}$ | index set of the initial CS |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $N_{BWP}{}^{size}/4$ | {0, 3, 6, 9} |

In some practical scenarios, for example, there are not only normal UEs but also bandwidth-limited UEs in a cell, and the operation bandwidth supported by the bandwidth-limited UEs is smaller than the bandwidth of the uplink initial BWP indicated by the base station. In other practical scenarios, the uplink frequency-domain resource actually available for the base station is smaller than the bandwidth of the uplink initial BWP configured by the base station. For example, the uplink frequency-domain resource actually available for the base station is 7 MHz, and the bandwidth of the uplink initial BWP configured by the base station is 10 MHz. Some UEs can only support a specific set of channel bandwidths, while other UEs can support more channel bandwidths. The uplink frequency-domain resource actually available for the base station is 7 MHz, but the bandwidth of the uplink initial BWP configured by the base station is one of the specific set of channel bandwidths, such as bandwidth of 10 MHz. In these scenarios, if PUCCH resource is determined according to a same PUCCH resource allocation table, according to the bandwidth of a same uplink initial BWP, and according to a same manner, there may be problems. For example, the bandwidth $N_{BWP}{}^{size}$ of the uplink initial BWP configured by the base station is 10 MHz, and the frequency-domain resource calculated according to $N_{BWP}{}^{size}-1-RB_{BWP}{}^{offset}-\lfloor r_{PUCCH}/N_{CS}\rfloor$ exceeds the bandwidth range of 7 MHz. For another example, the bandwidth $N_{BWP}{}^{size}$ of the uplink initial BWP configured by the base station is 30 MHz, the operation bandwidth supported by the UE is 20 MHz, and the fre-quency-domain resource calculated according to $N_{BWP}{}^{size}-1-RB_{BWP}{}^{offset}-\lfloor r_{PUCCH}/N_{CS}\rfloor$ exceeds the operation bandwidth range supported by UE. For convenience of description, UEs are divided into Type-1 UEs and Type-2 UEs.

One way to solve this kind of problem is that the base station additionally configures parameters for calculating the PUCCH resource, for example, configures additional param-eters such that the UE of a specific type can transmit PUCCH within available frequency-domain resource or within available bandwidth. For example, the base station configures one PRB offset $RB_{BWP}{}^{offset2}$ instead of $RB_{BWP}{}^{offset}$ determined in the table of PUCCH resource configuration, and the UE determines the frequency-domain resource of PUCCH frequency hopping based on the $RB_{BWP}{}^{offset2}$. Or, the base station configures a frequency-domain offset parameter $RB_{BWP}{}^{offset0}$, and the UE deter-mines the frequency-domain resource of PUCCH frequency hopping based on the $RB_{BWP}{}^{offset0}$ and the $RB_{BWP}{}^{offset}$ in the table of PUCCH resource configuration. Or, a PRB location $N_{hop}{}^{size}$ of a reference boundary for the frequency hopping resource is configured for the UE to calculate the resource for the frequency hopping. The UE determines the resource for PUCCH frequency hopping based on the information configured by base station, such as the PUCCH resource index $r_{PUCCH}$, the bandwidth $N_{BWP}{}^{size}$ of the uplink initial BWP, and the parameters additionally configured. For example, UE calculates the resource for the frequency hopping according to $$N_{BWP}^{size} - 1 - RB_{BWP}^{offset} - \left\lfloor \frac{r_{PUCCH}}{N_{CS}} \right\rfloor - RB_{BWP}^{offset0},$$

or calculates the resource for the frequency hopping accord-ing to $N_{hop}{}^{size}-1-RB_{BWP}{}^{offset}-\lfloor r_{PUCCH}/N_{CS}\rfloor$, or calculates the PUCCH resource for one frequency hopping according to $RB_{BWP}{}^{offset}+\lfloor r_{PUCCH}/N_{CS}\rfloor$, and calculates the PUCCH resource for another one frequency hopping according to $N_{BWP}{}^{size}-1-RB_{BWP}{}^{offset2}-\lfloor r_{PUCCH}/N_{CS}\rfloor$. Or, the UE calcu-lates the PUCCH resource for one frequency hopping according to $RB_{BWP}{}^{offset}+\lfloor r_{PUCCH}/N_{CS}\rfloor$, and calculates the PUCCH resource for another one frequency hopping accord-ing to $RB_{BWP}{}^{offset}+\lfloor r_{PUCCH}/N_{CS}\rfloor+RB_{BWP}{}^{offset0}$.

Optionally, a Type-2 UE may determine the PUCCH resource according to the parameters additionally configured by the base station, and a Type-1 UE only determines the PUCCH resource according to the parameters in the table of the PUCCH resource configuration. For example, the Type-1 UE is a UE of lower version, and the Type-2 UE is a UE of higher version.

According to another implementation, the base station configures a plurality of sets of uplink initial BWPs, and different types of UEs determine their own uplink initial BWP parameters according to an applicable set of uplink initial BWPs. The UE determines PUCCH resource accord-ing to the uplink initial BWP parameters. For example, the base station configures two sets of uplink initial BWP parameters, with Type-1 UE determining PUCCH resource according to the first set of uplink initial BWP parameters and Type-2 UE determining PUCCH resource according to the second set of uplink initial BWP parameters.

If the UE needs to transmit PUCCH on the frequency-domain resource exceeding its own operation bandwidth range, for example, the frequency-domain gap between two frequency hopping for the PUCCH exceeds the operation bandwidth that the UE can support, the UE needs a time gap with length Lgap between the two frequency hopping for adjusting the operation frequency point (also referred to as "retune"). Then, the time resource information of the cell-common PUCCH resource configuration needs to be modified to support Lgap. Optionally, the PUCCH length configured by the base station does not include Lgap, but only includes the PUCCH length actually transmitted. For example, for a short PUCCH format, such as a PUCCH with a symbol length (i.e., the number of symbols) of 2 or 4 in Table 1, the Lgap is not included in the indicated symbol length. Optionally, the indicated PUCCH length includes the Lgap, and the PUCCH length actually transmitted is the indicated PUCCH length minus Lgap. For example, for a long PUCCH format, such as a PUCCH with a symbol length of 10 or 14 in the table, if Lgap=1, the actual PUCCH length is 9 or 13. Optionally, for the UE that needs the Lgap to retune, the actual starting symbol of PUCCH is number Lgap of symbols ahead of the indicated starting symbol of PUCCH. For example, for a short PUCCH in Table 1 (for example, a PUCCH with a symbol length of 2 or 4), assuming Lgap=1 symbol, the starting symbol of the first to three rows in the table is symbol 11, and the starting symbol of the fourth to seventh rows in the table is symbol 9. Optionally, for the UE that needs Lgap to retune, the actual end symbol of PUCCH is number Lgap of symbols later than the indicated end symbol of PUCCH. According to another implementation, tables of PUCCH resource configuration are respectively configured for different types of UEs.

In one cell, there may be different types of UEs, and PUCCH resource needs to be determined according to different ways. For example, the ways for different types of UEs to determine the PUCCH length actually transmitted and the starting point of PUCCH according to a same table of PUCCH resource configuration are different. In another example, whether PUCCH frequency-domain resource is determined according to the second initial uplink BWP, etc. Therefore, the UE needs to inform the base station of its own type as soon as possible such that the base station can select an appropriate way to allocate PUCCH resource for the UE. The UE can inform the base station of its own UE type (for example, whether it is a bandwidth-limited UE, whether it needs Lgap>0 symbols to retune, etc.) through different PRACH resources, different Msg A PUSCH resources, or by including UE type indication information in Msg A PUSCH or Msg3.

According to one or more embodiments of the disclosure, the UE can transmit the PUCCH within available frequency-domain resource or within available bandwidth based on the information configured by the base station, thereby improving the utilization efficiency of system resources.

Uplink transmission of UE is usually divided into two types: scheduled transmission by a base station and configured grant transmission. For example, if the transmission of PUSCH is scheduled based on UL grant, it is referred to as a scheduled physical uplink shared channel (PUSCH), and if the transmission of PUSCH is configured based on higher layer signaling or based on activation and deactivation signaling, it is referred to as a configured grant PUSCH (CG PUSCH).

Particularly, the transmission of CG PUSCH is determined based on at least one of the following configuration information: time resource information of the CG PUSCH, such as period P, time offset of slot granularity, symbols of the CG PUSCH, number Np of continuously allocated slots in one period, maximum number Mp of consecutive PUSCHs in one slot, and number LP of consecutive PUSCH transmission occasions in one period; frequency-domain resource of the CG PUSCH; code domain resource of the CG PUSCH; semi-static channel access parameters; and CG-UCI parameters.

The UE determines whether the UE transmits the CG-UCI in the CG PUSCH based on CG-UCI parameters configured by the base station. For example, the base station may configure the CG-UCI parameters through a dedicated signaling. Or, the base station indirectly indicates whether the UE transmits the CG-UCI through other configuration signaling. For example, if the base station configures cg-RetransmissionTimer, the UE determines to transmit the CG-UCI in the CG PUSCH. In another example, if the base station configures that the UE can select HARQ process by itself, the UE determines to transmit the CG-UCI in the CG PUSCH. Preferably, the content of control information in the CG-UCI is configurable. For example, at least one of HARQ ID, RV and NDI is configurable. According to one implementation, the base station can use the dedicated signaling to configure whether the control information is included in the CG-UCI. According to another implementation, the base station may indirectly indicate which pieces of control information is included in the CG-UCI through other configuration information. For example, the base station configures cg-RetransmissionTimer, which means that the CG-UCI includes HARQ ID, RV, and NDI. If the base station does not configures cg-RetransmissionTimer, it means that the CG-UCI includes HARQ ID and RV. In another example, the base station configures that the UE selects HARQ process by itself, which means that the CG-UCI includes HARQ ID, RV, and NDI. Optionally, the base station respectively configures whether the UE selects HARQ process by itself, whether the UE transmits CG-UCI, and whether the UE receives DFI. Optionally, the base station configures whether the UE selects HARQ process by itself, whether the UE transmits CG-UCI and whether the UE receives DFI through one piece of signaling, for example, through a same RRC parameter.

There are at least two types of CG PUSCH: Type-2 CG PUSCH and Type-1 CG PUSCH. If a CG PUSCH is activated and deactivated based on DCI, it is referred to as a Type-2 CG PUSCH, and the activating DCI may include part of time, frequency and code information of CG PUSCHs. For example, the activating DCI includes the time resource information of the first activated CG PUSCH (CG PUSCH1), and the slot n+k2 where the starting point of PUSCH1 is located and the occupied symbols (determined according to the starting point symbol index S and symbol length L) are determined according to the time domain resource assignment (TDRA) bit field in the activating DCI received in slot n. If all parameters of a CG PUSCH are configured by higher layer signaling, the CG PUSCH is referred to as a Type-1 CG PUSCH.

CG PUSCH can be based on repetition or without repetition. The base station can configure repetition transmission parameters, which at least include one of the following: repetition type Type-A or Type-B, and number of times of repetitions. According to one implementation, if CG PUSCH is repeated based on Type-A, the actual transmission length of PUSCH repeated each time is the same. According to one implementation, if CG PUSCH is repeated based on Type-A, K PUSCH repetitions are distributed in K slots. According to one implementation, if CG PUSCH is repeated based on Type-A, K PUSCH repetitions are distributed in consecutive K CG PUSCH transmission occasions.

According to one implementation, if a CG PUSCH is repeated based on Type-B, each repetition is referred to as a nominal repetition. A nominal repetition can be divided into one or more actual repetition. The base station determines the time resource of the first nominal repetition CG PUSCH, that is, the time resource of CG PUSCH1, through higher layer signaling or the TDRA bit field in the activating DCI. Optionally, each nominal transmission occasion can be divided into one or more actual transmission occasions according to a predefined rule. For example, if the resource corresponding to a nominal transmission occasion contains predefined symbols that cannot be used for uplink transmission, or contain a slot boundary, the nominal transmission occasion is divided into a plurality of actual transmission occasions, so that the resource of these actual transmission occasions does not contain these symbols.

For convenience of description, unless indicated otherwise, the transmission occasions in the present invention include not only the transmission occasions of Type-A repetition transmission mechanism, but also the nominal transmission occasions and actual transmission occasions of Type-B repetition transmission mechanism.

If the UE is configured to transmits the CG-UCI in the CG-PUSCH, for CG PUSCHs of Type-B repetition, the UE determines the CG PUSCHs in which the CG-UCI is transmitted according to at least one of the following ways (1) the CG-UCI being transmitted only once in one nominal repetition transmission If one nominal repetition transmission is divided into a plurality of actual repetition transmissions, according to a predefined rule, one actual transmission of CG PUSCH is selected to transmit CG-UCI. The predefined rule is one of the following:

a) the first actual transmission of CG PUSCH in the one nominal repetition transmission;

b) the first actual transmission of CG PUSCH in the one nominal repetition transmission that contains at least X symbols, optionally, X>2.

c) the first actual transmission of CG PUSCH in the one nominal repetition transmission that actually occupies the most resources;

d) the first actual transmission of CG PUSCH in the one nominal repetition transmission that is located in the uplink slots/symbols configured semi-statically;

(2) the CG-UCI being transmitted in every actual repetition transmission (3) the CG-UCI being transmitted in the actual transmissions in one nominal repetition transmission which meet a predefined condition. Optionally, the predefined condition is that the actual transmissions of CG PUSCH occupy resource exceeding a threshold value.

If the UE is configured to transmit the CG-UCI in the CG-PUSCH, for CG PUSCHs of Type-B repetition, the amount of resource occupied by the CG-UCI in the CG-PUSCH is determined according to the resource of one nominal repetition transmission of CG-PUSCH.

If the resource of one actual repetition transmission of CG PUSCH is less than the resource required by the CG-UCI, transmission of the actual repetition transmission of CG PUSCH is abandoned.

To increase the time flexibility of transmitting CG PUSCH, multiple CG PUSCH transmission occasions can be configured in one CG PUSCH period, for example, by configuring the number Np of slots continuously allocated in one period, and/or the maximum number Mp of consecutive PUSCHs in one slot, and/or the number Lp of consecutive PUSCH transmission occasions in one period to provide multiple CG PUSCH transmission occasions.

According to the slot where the starting point of CG PUSCH1 is located, the period P, and the number of slots continuously allocated in one CG PUSCH period, the slots where the CG PUSCH transmission occasions are located are determined, i.e., the slots n+k2~n+k2+Np−1, n+k2+P~n+k2+Np−1+P, n+k2+2*P~n+k2+Np−1+2*P . . . are determined.

According to the symbols occupied by CG PUSCH1 and the maximum number Mp of consecutive PUSCHs in one slot, the locations of CG PUSCH transmission occasions in one slot are determined. The location of the first CG PUSCH transmission occasion in one slot is determined according to CG PUSCH1, that is, the symbols S~S+L−1 are occupied, and the second CG PUSCH transmission occasion is adjacent to CG PUSCH1 with the same time length (L) . . . the i-th CG PUSCH transmission occasion is adjacent to the (i−1)-th CG PUSCH transmission occasion with the same time length (L). In the above, i is less than or equal to Mp, that is, the number of actual transmissions of CG PUSCH in one slot does not exceed Mp, and any CG PUSCH cannot cross the slot boundary. In Np consecutive slots, the time resources of CG PUSCH transmission occasions in each slot are the same.

Figure 18:
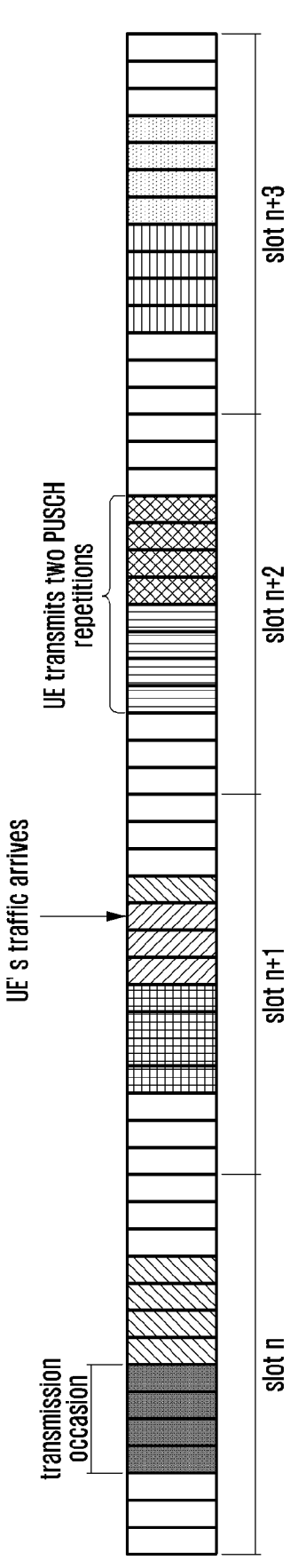
FIG. 18 illustrates an example of CG PUSCH transmission occasions according to an embodiment of the disclosure.

FIG. 18 illustrates an example of CG PUSCH transmission occasions according to an embodiment of the disclosure.

FIG. 18 illustrates only one CG PUSCH period. In FIG. 4, Np=4, Mp=7, the CG PUSCH period is of 10 slots, and the TDRA bit field in the activating DCI received by the UE indicates that the time resource of CG PUSCH1 is symbol 4~ symbol 7 of slot n. Then, in one CG PUSCH period, there are 8 CG PUSCH transmission occasions, which are symbols 4-7 of slot n, symbols 8-11 of slot n, symbols 4-7 of slot n+1, symbols 8-11 of slot n+1, symbols 4-7 of slot n+2, symbols 8-11 of slot n+2, symbols 4-7 of slot n+3 and symbols 8-11 of slot n+3. The arrival time of UE's traffic is symbol 10 of slot n+1, and assuming that the number of times of repetitions K=2, UE can transmit the CG PUSCH in the next two transmission occasions. If a LBT is required before transmission, transmission will be started after LBT is successful.

According to another implementation, according to the time resource of the first nominal repetition allocated for CG PUSCH and the number Np of slots continuously allocated in one CG PUSCH period, the locations of the CG PUSCH nominal transmission occasions in one CG PUSCH period are determined, and these nominal transmission occasions are adjacent in time and occupy no more than the number Np of slots.

FIG. 19 illustrates an example of CG PUSCH transmission occasions according to an embodiment of the disclosure.

FIG. 19 illustrates only one CG PUSCH period. In FIG. 19, Np=7, the CG PUSCH period is of 10 slots, the CG PUSCH is repeated based on Type-B repetition, the TDRA bit field in the activating DCI received by the UE indicates that the time resource of CG PUSCH1 is symbol 3~ symbol 10, and the number of times of repetitions is K=2. Then, in one period, there are 6 CG PUSCH nominal transmission occasions, which are symbols 3-10 of slot n, symbols 11-14 of slot n and symbols 1-4 of slot n+1, symbols 5-12 of slot n+1, symbols 13-14 of slot n+1 and symbols 1-6 of slot n+2, symbols 7-14 of slot n+2, and symbols 1-8 of slot n+3. In a case where the period is of 10 slots, there are 6 CG PUSCH nominal transmission occasions in each period. Optionally, the UE may select the earliest available K nominal transmission occasions among these nominal transmission occasions to transmit the CG PUSCH. The arrival time of UE's traffic is symbol 10 of slot n+1, and the UE can transmit two nominal repetitions of CG PUSCH in the next two nominal transmission occasions. If a LBT is required before transmission, transmission will be started after LBT is successful.

According to another implementation, according to the time resource of the first nominal repetition allocated for CG PUSCH and the number Lp of PUSCH transmission occasions continuously allocated in one CG PUSCH period, the locations of the CG nominal transmission occasions in one period are determined, and these nominal transmission occasions are adjacent in time. Assuming Lp=6, as shown in FIG. 19, there are 6 consecutive PUSCH nominal transmission occasions in one CG PUSCH period.

Preferably, the UE determines the HARQ ID for transmitting CG PUSCH by itself and informs the base station, for example, through CG-UCI. Preferably, the UE determines the HARQ ID according to a predefined rule, for example, the HARQ ID is determined according to the starting symbol of the selected CG PUSCH transmission occasion.

Preferably, the UE determines the RV for transmitting CG PUSCH by itself and informs the base station, for example, through CG-UCI. Preferably, the UE determines the RV according to a predefined rule, for example, the RV is determined according to the starting symbol of the selected CG PUSCH transmission occasion.

Preferably, the UE determines the selectable CG PUSCH transmission occasions according to a RV set. Starting from the first PUSCH transmission occasion in one period, each PUSCH transmission occasion corresponds to each RV of the RV set in turn.

Figure 20:
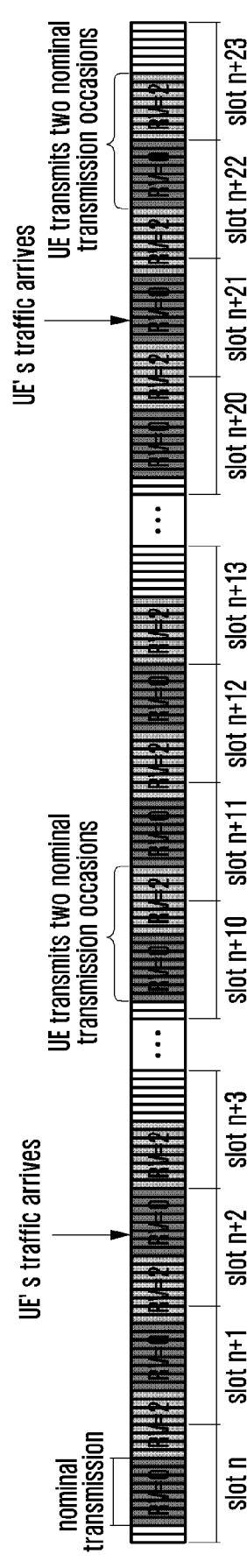
FIG. 20 illustrates an example of CG PUSCH transmission occasions according to an embodiment of the disclosure.

FIG. 20 illustrates an example of CG PUSCH transmission occasions according to an embodiment of the disclosure.

FIG. 20 illustrates a plurality of CG PUSCH periods, in which each CG PUSCH period includes 8 transmission occasions, and the RV set is {0, 3}, and then the first, third, fifth and seventh transmission occasions correspond to RV=0, and the second, fourth, sixth and eighth transmission occasions correspond to RV=3. UE can only start transmitting at the transmission occasions corresponding to RV=0. Preferably, the transmission occasions selected by the UE need to ensure that there are K transmission occasions in one period for transmission. As shown in FIG. 20, assuming K=2, the RV set is {0,3}, the arrival time of UE's traffic is symbol 10 in slot n+2, and there is only one PUSCH transmission occasion in this period, so two PUSCH transmissions can be started only at the first transmission occasion corresponding to RV=0 in the next period. The arrival time of UE's traffic is symbol 7 in slot n+21, and two PUSCH transmissions can be started at the nearest transmission occasion corresponding to RV=0 in the same period.

According to the above method, the transmission latency of CG PUSCH can be reduced and the transmission performance of CG-UCI can be guaranteed.

If the resource corresponding to a nominal transmission occasion contains predefined resource that cannot be used for uplink transmission, the nominal transmission occasion is divided into a plurality of actual transmission occasions, so that the resource of these actual transmission occasions does not contain these symbols. The predefined resource that cannot be used for uplink transmission can be determined by at least one of the following methods:

(1) The resource includes minimum idle time resource Tz (idle period) in a period of channel occupancy of semi-static channel occupancy.

The minimum idle time resource Tz in the channel occupancy of semi-static channel occupancy is determined according to a predefined rule. Preferably, the minimum idle time resource Tz is the minimum idle time resource Tz of the channel occupancy initiated by the base station. Preferably, the minimum idle time resource Tz is the minimum idle time resource Tz of the channel occupancy initiated by the UE. Preferably, the minimum idle time resource Tz is the time resource configured by the base station on which neither the UE nor the base station can transmit signals. The time resource enables the base station and the UE served by the base station to occupy the channel continuously for a time length not exceeding a predefined length.

Preferably, the UE may determine whether the resource includes the minimum idle time resource Tz of the channel occupancy initiated by the base station according to whether the base station successfully initiates the channel occupancy. For example, if the UE receives the indication of base station channel occupancy transmitted by the base station, the UE determines that the resource contains the minimum idle time resource Tz of the channel occupancy initiated by the base station, otherwise the UE determines that the resource does not include the minimum idle time resource Tz of the channel occupancy initiated by the base station. The indication of base station channel occupancy can be indicated by the DCI scheduling the UE or the DCI for a UE group, for example, indicated in SFI. In another example, for CG PUSCH, the UE always assumes that the resource includes the minimum idle time resource Tz of the channel occupancy initiated by the base station. Or, for CG PUSCH, if the UE detects the transmitted channel occupancy initiated by the base station, the UE determines that the resource includes the minimum idle time resource Tz of the channel occupancy initiated by the base station.

(2) The resource includes the time resource TLBT of a Listen-Before-Talk (LBT) for evaluating a channel availability before the starting point of a channel occupancy of the semi-static channel occupancy.

(3) The resource includes the time resource Taf in a time period after the starting point of the channel occupancy of the semi-static channel occupancy.

(4) The resource includes downlink symbols in uplink and downlink configuration configured by higher layer signaling, or symbols where SS/PBCH is located, or symbols where the CORESET of Type0-PDCCH CSS configured in MIB is located.

Preferably, the resource also includes Z symbols after the end of the symbols.

Preferably, the resource also includes Z symbols after the end of the symbols, and part of resource in one symbol after the Z symbols, where Z≥0. For example, the time length of the Z symbols and the part of resource in one symbol after the Z symbols is X microseconds, or is the time length of Y time-domain sampling points. For example, X=16 us+TA, or 25 us+TA, or 9 us+TA, or TA (where TA is uplink timing), or 9 us, or 16 us, or 25 us.

Preferably, the resource also includes Z0 symbols before the start of the symbols.

Preferably, the resource also includes part of resource in one symbol before the start of the symbols.

Preferably, Z and Z0 are predefined or configured by the base station.

The values of Z and Z0 are preferably determined according to the type of LBT, for example, whether to perform LBT, the LBT suitable for semi-static channel occupancy, or the LBT suitable for dynamic channel occupancy (for example, load based equipment, LBE).

Preferably, the values of Z and Z0 are determined according to the licensed frequency band or the unlicensed frequency band.

(5) The resource includes an unavailable symbol pattern configured by higher layer signaling.

The unavailable symbol pattern includes time and frequency-domain dimensions. Preferably, the time dimension of the unavailable symbol pattern takes OFDM symbols or SC-FDMA symbols as granularity. Preferably, the time dimension of the unavailable symbol pattern is part of resource within one symbol, for example, unavailable symbols are located at X microseconds or Y time-domain sampling points from the starting point of one symbol. For example, X=9 us, or X=Lsym−Lcpex, where Lsym is the time length of one OFDM symbol or SC-FDMA symbol, and Lcpex is the time length of CP extension. For another example, the unavailable symbols are located at X microseconds or Y time-domain sampling points before the end location of one symbol.

Preferably, the frequency-domain dimension of the unavailable symbol pattern includes an indication of LBT subbands, which is also called a resource block (RB) set. The base station may indicate which LBT subbands are unavailable in a carrier or which LBT subbands are unavailable in an active bandwidth (active BWP). For example, the active BWP of the UE includes 4 LBT subbands, and the unavailable symbol pattern indicates which symbols of which LBT subbands are unavailable symbols. If the time-frequency resource of PUSCH to be transmitted by the UE overlaps with the unavailable symbols, the PUSCH cannot be transmitted on the overlapped symbols. Preferably, the frequency-domain dimension of the unavailable symbol pattern includes an indication of a RB group. If at least part of the frequency-domain resource of one PUSCH overlaps with the RB group, the symbols are unavailable.

Preferably, the base station indicates one of unavailable symbol patterns configured by higher layer signaling through physical layer signaling. The physical layer signaling is a UE-specific signaling, for example, indicated in UL grant for scheduling PUSCH, or a common signaling for a UE group (for example, transmitted together with SFI in DCI 2_0), or a cell-common signaling.

Preferably, the locations of the unavailable symbol pattern configured by higher layer signaling are determined according to the parameters of the channel occupancy of the semi-static channel occupancy, for example, when the starting point of the channel occupancy of the semi-static channel occupancy is as a reference location, the Z1 unavailable symbols are Z1 symbols before the starting point of the channel occupancy of the semi-static channel occupancy until the end of the starting point of the channel occupancy of the semi-static channel occupancy. For another example, when the starting point or the end point of the idle time resource of the channel occupancy of the semi-static channel occupancy is as the reference location, the unavailable Z1 symbols are Z1 symbols before or after the starting point of the reference location. Preferably, the locations of the unavailable symbol pattern configured by higher layer signaling are determined according to the end location of the downlink symbols in the uplink and downlink configuration, or according to the end location of SSB symbols, or according to the end location of the symbols where CORESET of Type0-PDCCH CSS configured in MIB is located.

If a nominal repetition is divided into N≥2 actual repetitions, for two actual repetitions not consecutive in time, the starting point of the later PUSCH is the starting point of the symbol next to the end symbol of the unavailable resource (for example, if the end symbol of the unavailable resource is symbol 5, the later PUSCH will be transmitted from symbol 6), or the starting point of the later PUSCH is after X us after the end symbol of the unavailable resource, where the time length corresponding to the X us is the length of a fractional multiple of an OFDM symbol or SC-FDMA symbol. For example, X=9 us, or X=25 us, or X=16 us, or X=9+TA us, X=25+TA us, and X=16+TA us, where TA (timing advance) indicates uplink time advance. For example, the subcarrier spacing is 15 KHz, TA=10 us, X=16+TA=26 us, assuming that the end symbol of the unavailable resource is symbol 5, the later PUSCH is transmitted starting from the starting point of symbol 6, i.e., X=26 us.

According to an implementation, when the starting point of the later actual PUSCH is located within the OFDM symbol or SC-FDMA symbol Oi, the rate matching of the PUSCH starts from symbol Oi+1, and signals of symbol Oi+1 are extended into symbol Oi, such that the gap between the PUSCH and the end symbol of the unavailable resource is X us. According to another implementation, when the starting point of the later actual PUSCH is located within the OFDM symbol or SC-FDMA symbol Oi, the rate matching of the PUSCH starts from the symbol Oi, and transmission of part of the signals of the symbol Oi is abandoned, such that the gap between the PUSCH and the end symbol of the unavailable resource is X us.

According to an implementation, when the end location of the previous actual PUSCH is located within the OFDM symbol or SC-FDMA symbol Oi, the rate matching of the PUSCH ends at the symbol Oi, and transmission of part of the signals near the end location of the symbol Oi is abandoned such that the gap between the PUSCH and the starting point of the next uplink signal is X us. According to another implementation, when the end location of the previous actual PUSCH is located within the OFDM symbol or SC-FDMA symbol Oi, the rate matching of the PUSCH ends at the symbol Oi, and transmission of part of the signals of the symbol Oi-1 is extended into symbol Oi, such that the gap between the PUSCH and the starting point of the next uplink signal is X us.

Preferably, whether the actual transmission occasions of CG PUSCH need to be determined based on the predefined unavailable resource for uplink transmission is configured by the base station.

Preferably, the above method is also applicable to PUSCH based on scheduling.

Preferably, the above method is applicable to both semi-static channel occupancy and dynamic channel occupancy.

In spectrum sharing of unlicensed or licensed frequency bands, Listen-Before-Talk (LBT) is a way of spectrum resource coordination. Before using the spectrum resource, the transmitting node first evaluates whether the spectrum resource is idle, for example, by comparing the energy detection result of the spectrum resource with a predefined threshold, to determine whether the spectrum resource is idle. In some application scenarios, the transmitting node can periodically evaluate the spectrum resource and determine whether to occupy the spectrum resource in this period (which is referred to as a channel access procedure adapted for semi-static channel occupancy for short), or become a frame based equipment (FBE) LBT. For example, the period Tx of the channel occupancy initiated by the base station is 5 ms, and the base station performs LBT before the starting point of a period. If the LBT is successful, the base station can use the resource within the 5 ms. If the base station shares this channel occupancy with the UE, the UE can also transmit signals within the 5 ms. Within the time resource of a time period of Tz before the end location of the 5 ms, both the base station and the UE must stop using spectrum resource, for example, $T_z$=max($0.5T_x$,100 us). Similarly, the UE can also initiate channel occupancy and abide by similar rules.

According to the method of (1), if the time resource Tz is included in the time resource of one nominal repetition of CG PUSCH, the nominal repetition resource is divided into piece(s) of actual repetition resource, and the piece(s) of actual repetition resource do not include the time resource Tz. If signals are transmitted in units of symbols, the symbols overlapping with the time resource Tz are not included in the piece(s) of actual repetition resource. Preferably, the time resource Tz is determined according to the channel occupancy initiated by the base station and/or the channel occupancy initiated by the UE.

According to the method of (2), if the time resource of one nominal repetition of CG PUSCH include the resource for the LBT of the base station, the nominal repetition resource is divided into piece(s) of actual repetition resource, and the piece(s) of actual repetition resource do not include the resource for the LBT of the base station. If signals are transmitted in units of symbols, the symbols overlapping with the resource for the LBT are not included in the piece(s) of actual repetition resource.

Figure 21:
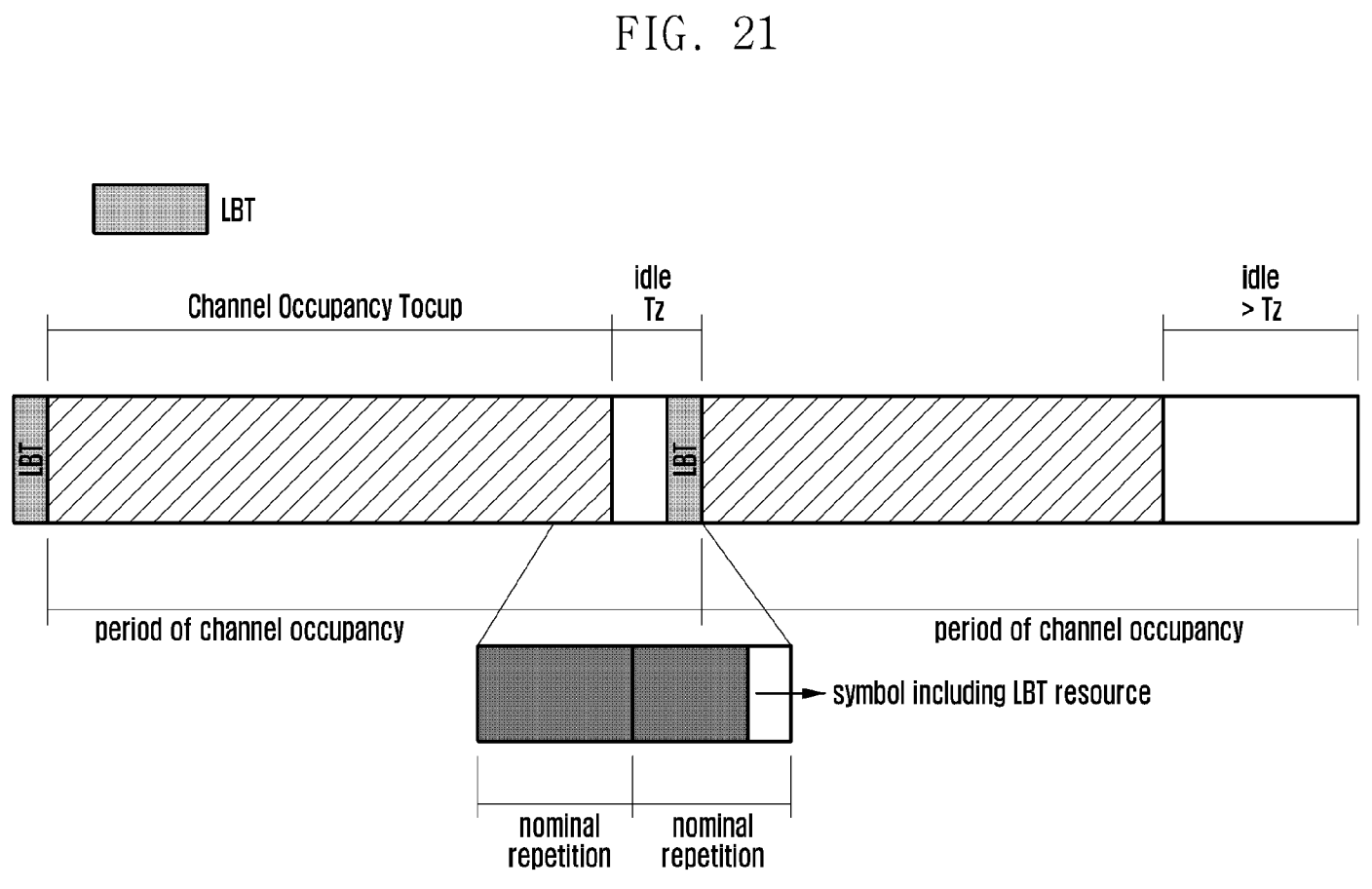

FIG. 21 illustrates an example of CG PUSCH transmission resource according to an embodiment of the disclosure. As shown in FIG. 21, it is assumed that the UE transmits CG PUSCH with number of times of repetitions 2, corresponding to symbols 5-9 and symbols 10-14 of slot n, respectively. Symbol 14 overlaps with the resource for the LBT of the base station in time dimension, so the UE divides the nominal repetition of CG PUSCH of symbols 10-14 into the actual repetition of CG PUSCH of symbols 10-13, and leaves symbol 14 empty. UE uses rate matching or puncturing to generate the actual repetition of CG PUSCH of symbols 10-13.

Figure 22:
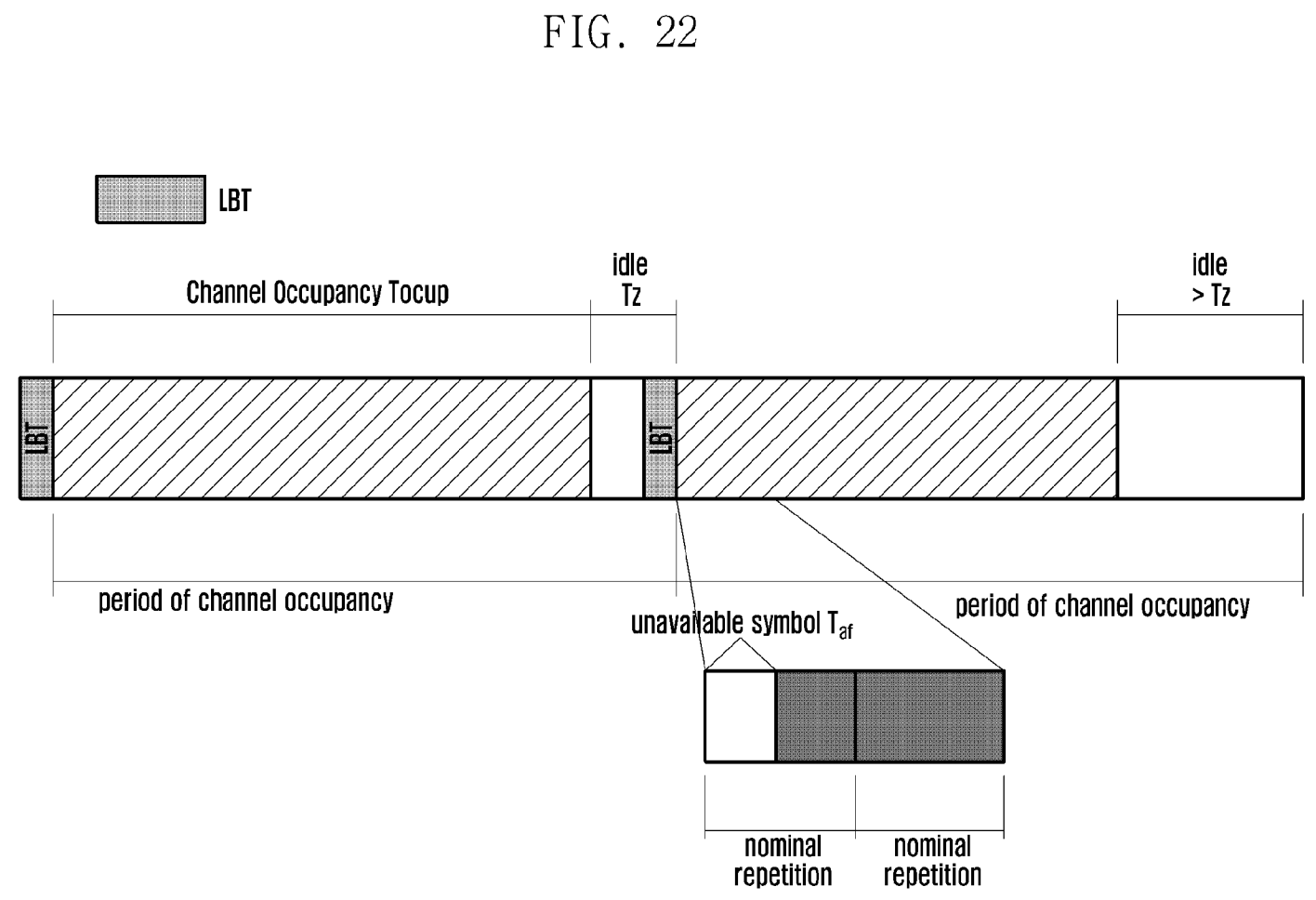

FIG. 22 illustrates an example of CG PUSCH transmission resource according to an embodiment of the disclosure. In some scenarios, after the base station succeeds in the LBT, the base station must start downlink transmission at the starting location of the channel occupancy. In order to avoid the collision between CG PUSCH and downlink transmission, according to the method of (3), if the time resource Taf is included in a nominal repetition of CG PUSCH, the nominal repetition resource is divided into piece (s) of actual repetition resource, and the piece(s) of actual repetition resource do not include this time resource. Based on an implementation, the base station configures the time resource Taf, or determines X symbols from the start of a channel occupancy period as the time resource Taf according to a predefined rule, as shown in FIG. 22.

Figure 23:
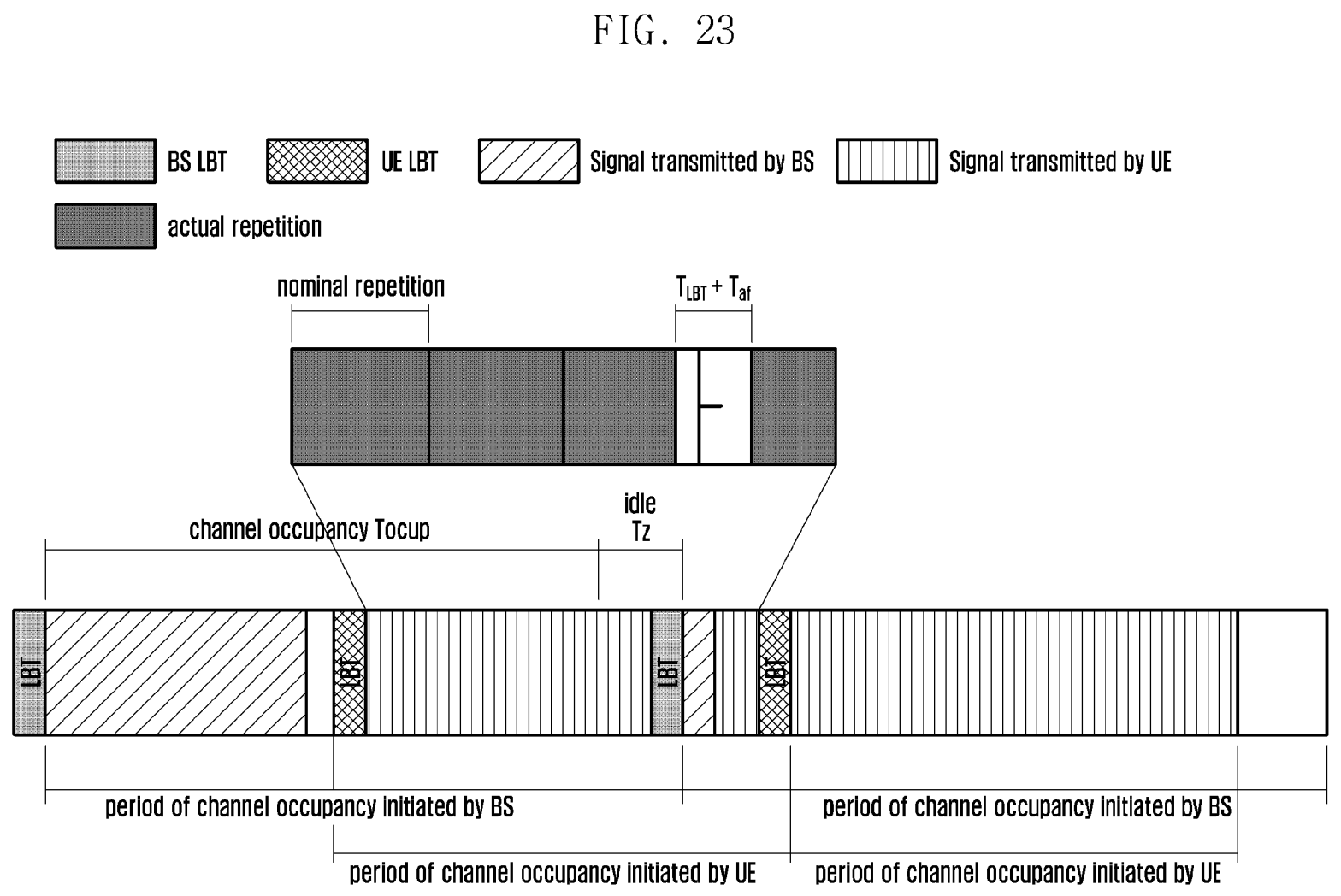

FIG. 23 illustrates an example of CG PUSCH transmission resource according to an embodiment of the disclosure. FIG. 23 illustrates an example of actual repetitions of CG PUSCH determined according to (2) and (3). It is assumed that the UE transmits CG PUSCH with number of times of repetitions 4, which respectively correspond to symbols 4-8 of slot n, symbols 5-9 of slot n, symbols 10-14 of slot n, and symbols 1-4 of slot n+1. Symbol 14 of slot n overlaps with the resource TLBT of the base station, so the UE divides the nominal repetition of CG PUSCH of symbols 10-14 into the actual repetition of CG PUSCH of symbols 10-13, and leaves symbol 14 empty. Symbol 1 of slot n+1 overlaps with the resource Taf, so UE divides the nominal repetition of CG PUSCH of symbols 1-4 into the actual repetition of CG PUSCH of symbols 2-4, and leaves symbol 1 empty. UE performs LBT before the start of symbol 2, and transmits the actual repetition of CG PUSCH at the start of symbol 2 after successful LBT.

Figure 24A:
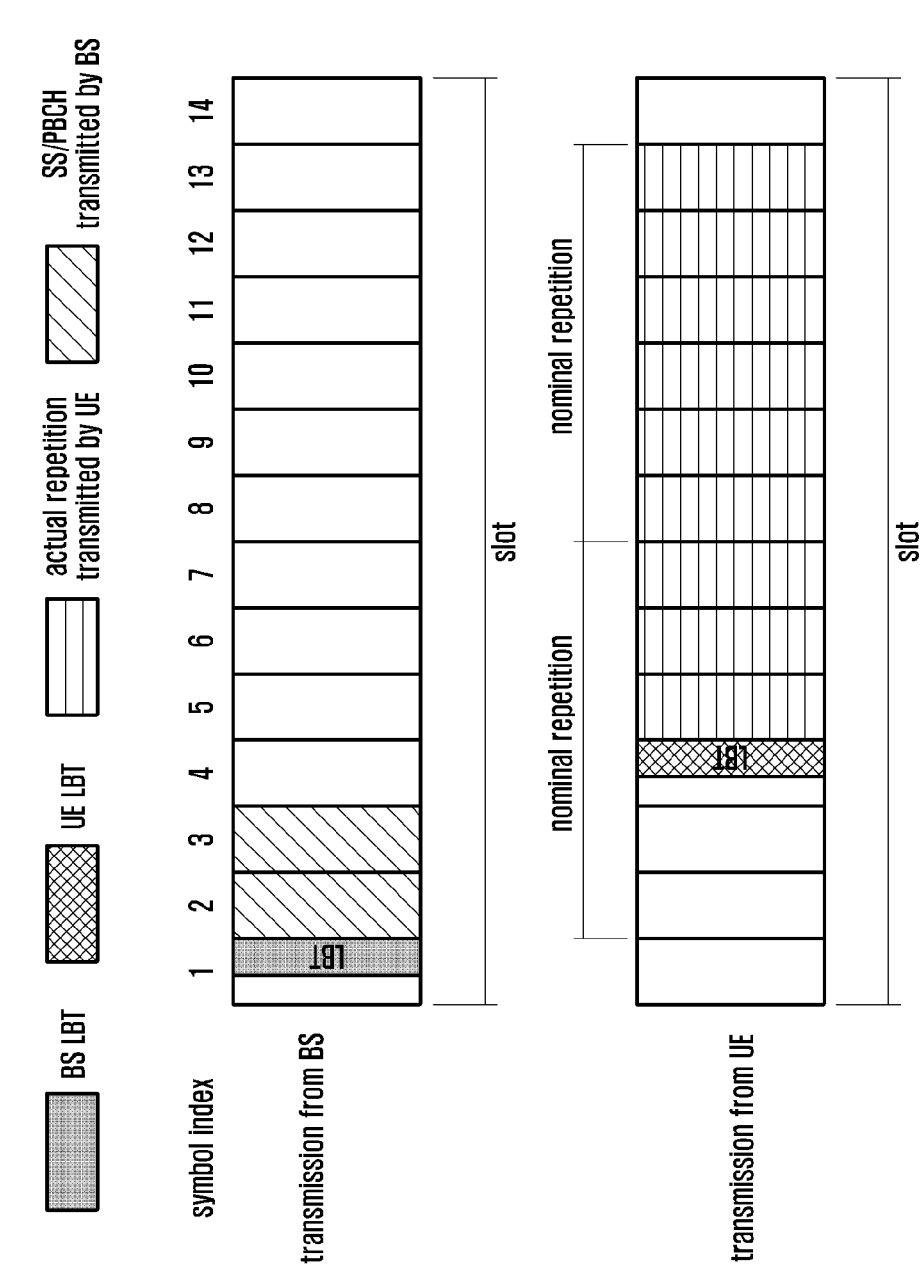
FIG. 24A illustrates an example of CG PUSCH transmission resource according to an embodiment of the disclosure.
Figure 24B:
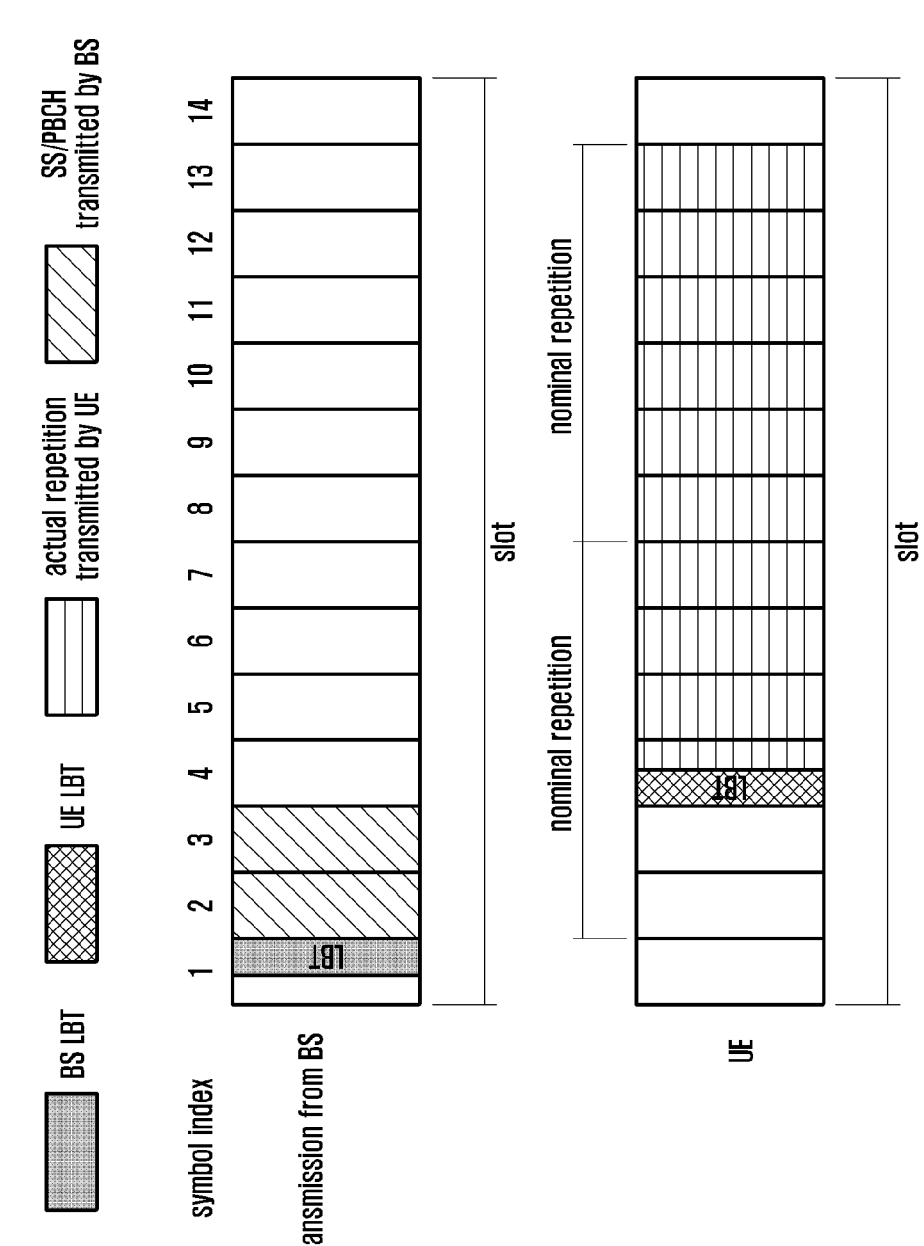
FIG. 24B illustrates an example of CG PUSCH transmission resource according to an embodiment of the disclosure.
Figure 24C:
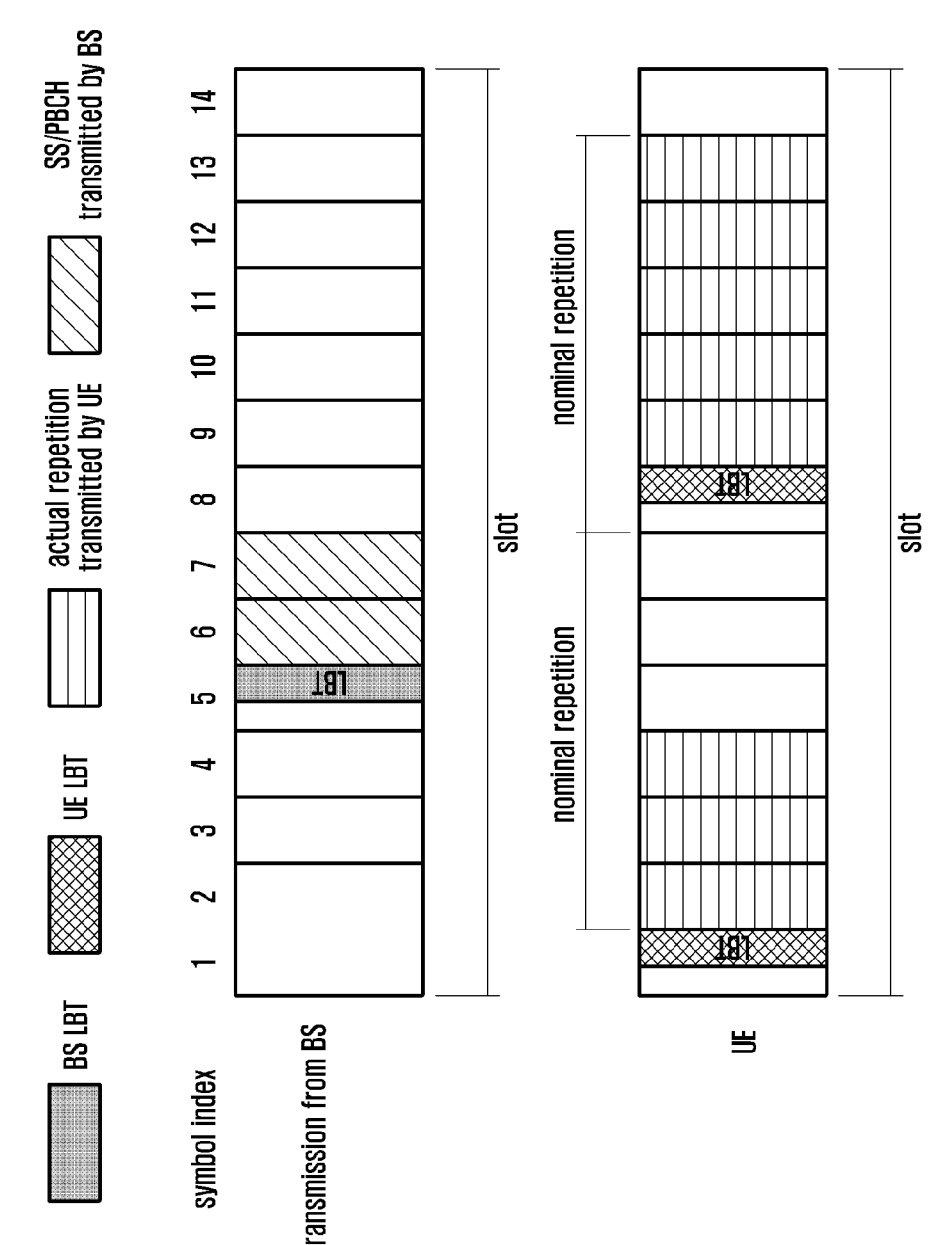
FIG. 24C illustrates an example of CG PUSCH transmission resource according to an embodiment of the disclosure.

In the unlicensed frequency band, before transmitting uplink signals, UE needs to perform LBT in some cases. If a time gap after the end of the downlink signals is not preserved for LBT, the base station may be transmitting downlink signals while the UE performs LBT, which may lead to LBT failure of the UE. Therefore, when the UE performs Type-B repetition transmission, the UE also needs to transmit after a gap which is after the end of the downlink signals, and the UE can perform LBT within this gap. According to the method of (4), if the time resource of a nominal repetition of CG PUSCH includes downlink symbols, or SS/PBCH symbols or symbols where CORESET of Type0-PDCCH CSS configured in MIB is located and Z symbols after these symbols, or SS/PBCH symbols or symbols where CORESET of Type0-PDCCH CSS configured in MIB is located and Z0 symbols before these symbols, the nominal repetition resource is divided into piece(s) of actual repetitive resource, and these symbols and the Z and/or Z0 symbols are not included in the piece(s) of actual repetition resource. As shown in FIG. 24A, assuming that the number of times of Type-B repetition transmissions is 2, and the PUSCH resource of two nominal transmissions is symbols 2-7 and symbols 8-13 of a slot, respectively, where symbols 2-3 are symbols where SS/PBCH is located. The $Z=1$ symbol after the end symbol of the SS/PBCH (i.e., symbol 4) also needs to be vacated. Then, the resource actually occupied by PUSCH for the first nominal transmission is symbols 5-7. For example, as shown in FIG. 24B, symbol 4 may include partial time resource of one symbol. Assuming that the number of times of Type-B repetition transmissions is 2, and the PUSCH resource of two nominal transmissions is symbols 2-7 and symbols 8-13 of a slot, respectively, where symbols 2-3 are symbols where SS/PBCH is located. The time length of the predefined type of LBT is 9 us. Then, the resource actually occupied by PUSCH for the first nominal transmission is symbols 5-7 and CP extension Lcpex in symbol 4, where Lcpex=C2-16 us-TA, C2 is a parameter configured by higher layer, for example, the base station configures C2 through cp-ExtensionC2-r16 parameters. Taking the subcarrier spacing of 15 KHz as an example, the configured C2=1 and TA=10 us, the start point from which the UE can transmit signals is 26 us (16 us+TA) after the starting point of symbol 4. The UE performs LBT of 9 us before starting to transmit signals. According to an implementation, rate matching is performed on the first nominal transmission of PUSCH according to symbols 5-7, and the signals of symbol 5 are extended to be after 26 us in symbol 4. According to another implementation, rate matching is performed on the first nominal transmission of PUSCH according to symbols 4-7, and the signals of symbol 4 are punctured so that the signals are transmitted after 26 us in symbol 4. For example, as shown in FIG. 24C, assuming that the number of times of Type-B repetition transmissions is 2, and the PUSCH resource of two nominal transmissions is symbols 2-7 and symbols 8-13 of a slot, respectively, where symbols 6-7 are symbols where SS/PBCH is located. The $Z0=1$ symbol before the starting symbol of SS/PBCH (i.e., symbol 5) also needs to be vacated, and the $Z=1$ symbol after the end symbol of SS/PBCH (i.e., symbol 8) also needs to be vacated. Then, the resource actually occupied by PUSCH for the first nominal transmission is symbols 2-5, and the resource actually occupied by PUSCH for the second nominal transmission is symbols 9-13.

According to the method of (5), if the time resource of a nominal repetition of CG PUSCH includes an unavailable symbol pattern configured by the base station, and the time dimension of the symbol pattern takes OFDM symbols or SC-FDMA symbols as granularity, the nominal repetition resource is divided into piece(s) of actual repetition resource, and the indicated unavailable symbols are not included in the piece(s) of actual repetition resource. If the time dimension of the symbol pattern includes partial resource in a symbol, such as X microseconds, the piece(s) of actual repetition resource also include the remaining resource in the symbol except the X microseconds, and the UE transmits the extended CP of the next symbol in the remaining time of the symbol.

Figure 25A:
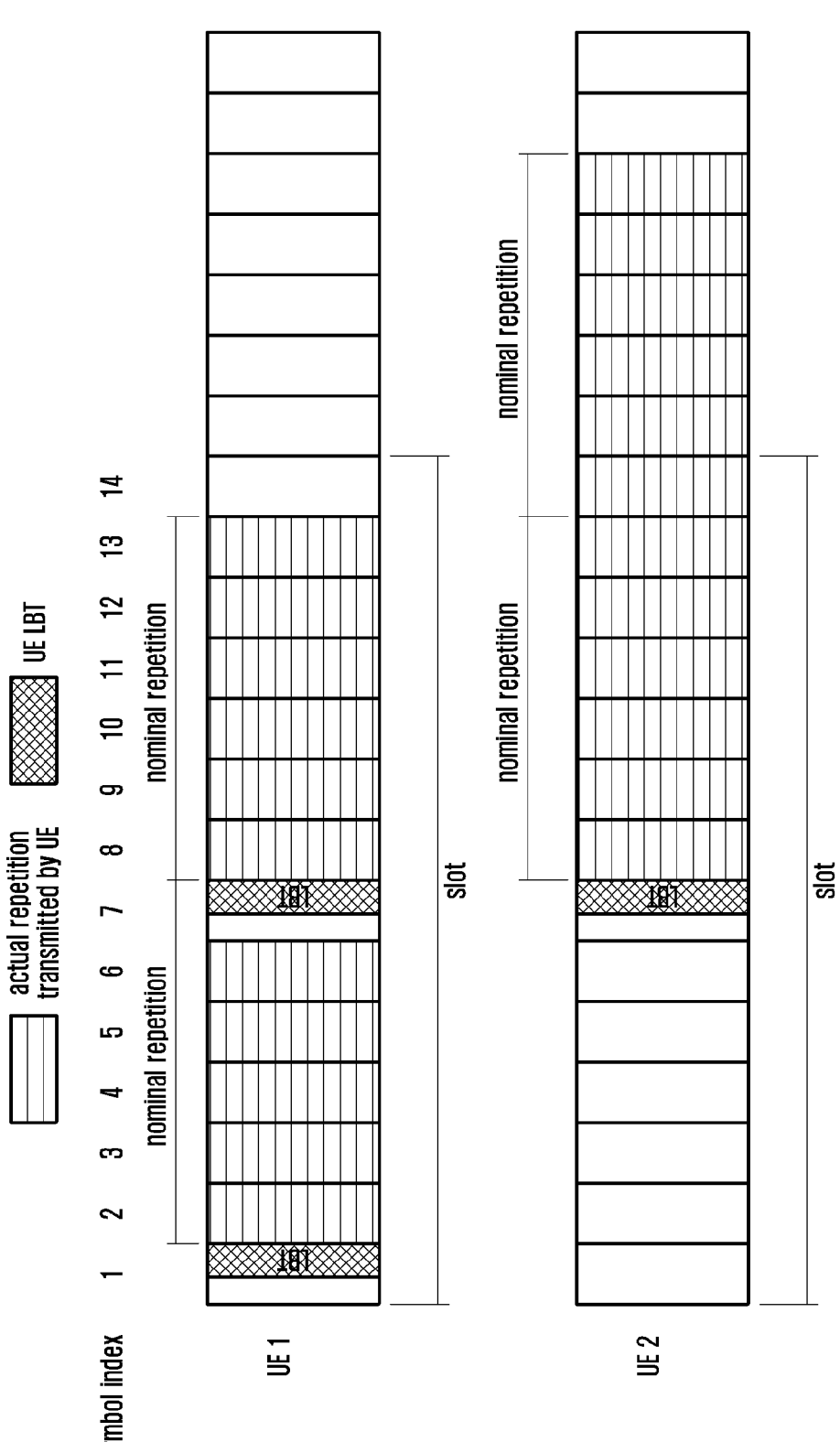
FIG. 25A illustrates an example of CG PUSCH transmission resource according to an embodiment of the disclosure.
Figure 25B:
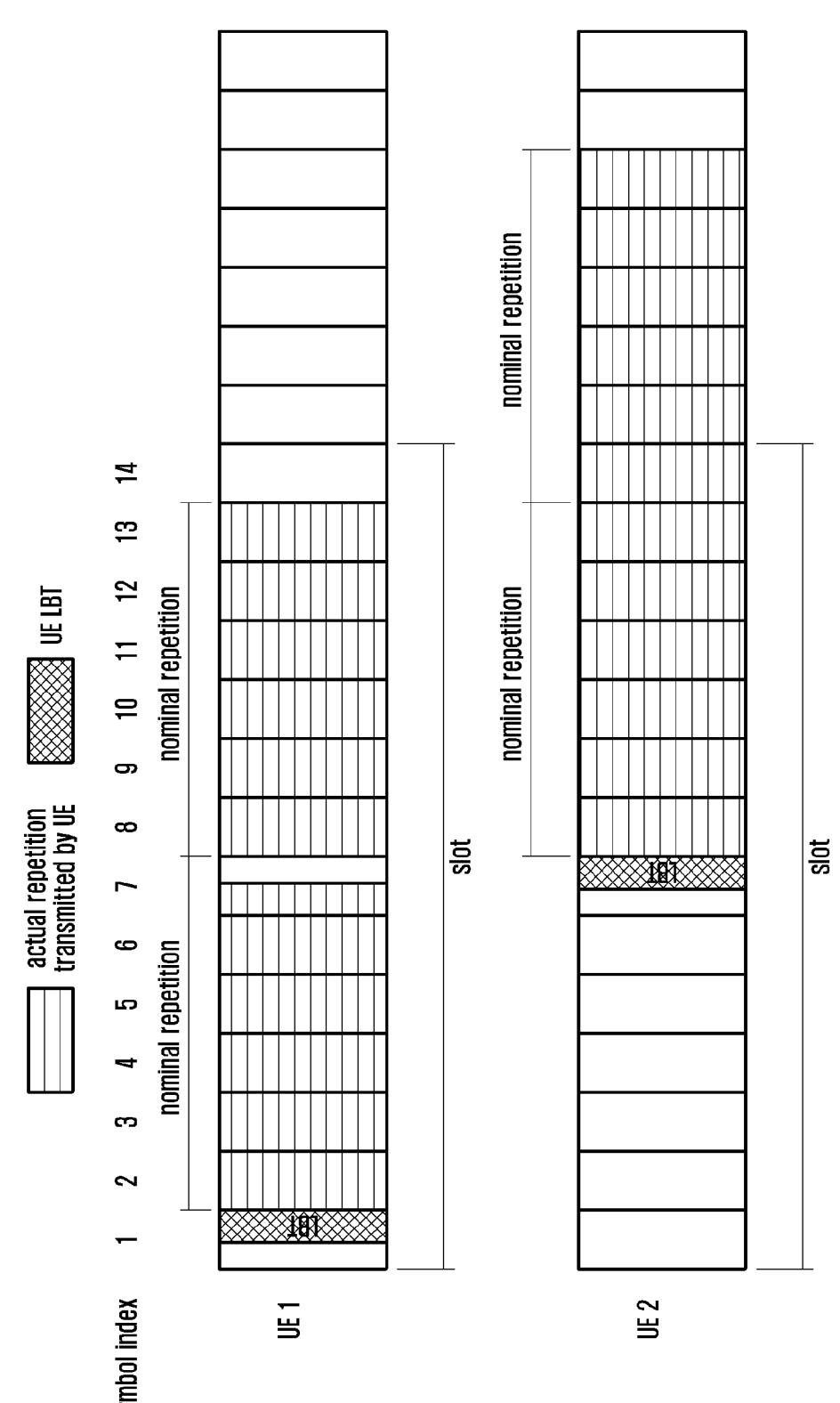
FIG. 25B illustrates an example of CG PUSCH transmission resource according to an embodiment of the disclosure.

In the unlicensed frequency band, before transmitting uplink signals, UE needs to perform LBT in some cases. If different UEs transmit uplink signals from different starting points, for example, UE2 is performing uplink transmission when UE1 performs LBT, which may cause LBT failure of UE1. To reduce the collision between UEs, the base station can instruct some UEs to stop transmitting on some of time-domain resource and frequency-domain resource, so that other UEs can perform LBT on the resource, thus supporting frequency division multiplexing of different UEs and reducing time latency. In the unlicensed frequency band, the uplink transmission may only be on one carrier or part of LBT subbands of an active BWP, by indicating the time dimension and frequency-domain dimension of unavailable resource, UE multiplexing in the same LBT subband and different LBT subbands can be supported. According to the method of (5), if the time resource of a nominal repetition of CG PUSCH includes the unavailable symbol pattern configured by the base station, and the frequency-domain resource of the nominal repetition of CG PUSCH includes LBT subbands indicated by the unavailable symbol pattern configured by the base station, then the nominal repetition resource is divided into piece(s) of actual repetition resource, and the piece(s) of actual repetition resource do not include the symbols indicated by the base station, or the piece(s) of actual repetition resource do not include the symbols and LBT subbands indicated by the base station. For example, the active bandwidth (active BWP) of UE includes 4 LBT subbands, and the unavailable symbol pattern indicates that LBT subbands 1 and 2 of symbol 1 of slot n are unavailable. If PUSCH1 is located in LBT subband 3 and symbols 1-14 of slot n, because the LBT subband where PUSCH1 is located is not indicated as unavailable, symbol 1 of slot n is not an unavailable symbol for PUSCH1, and PUSCH1 can be transmitted on symbol 1. If PUSCH2 is located in LBT subband 1 and symbols 1-14 of slot n, because the LBT subband where PUSCH2 is located is indicated as unavailable, symbol 1 of slot n is unavailable symbol for PUSCH2 and PUSCH2 cannot be transmitted on symbol 1. For another example, if PUSCH3 is located in LBT subbands 1-4 and symbols 1-14 of slot n, because part of LBT subbands where PUSCH3 is located are indicated as unavailable, symbol 1 of slot n is an unavailable symbol for PUSCH3, and PUSCH3 cannot be transmitted on symbol 1. According to another implementation, PUSCH3 cannot be transmitted on symbol 1 of LBT subbands 1 and 2 of LBT subbands, but can be transmitted on symbol 1 of LBT subbands 3 and 4. In the unlicensed frequency band, before transmitting uplink signals, the UE that meets certain conditions does not need to perform LBT, while the UE that does not meet the conditions needs to perform LBT. For example, in an uplink transmission burst, if the time gap between an uplink transmission and the next uplink transmission does not exceed a predefined length, for example, the gap is less than or equal to 16 us, the UE directly transmits the next uplink transmission without performing LBT; otherwise, the UE needs to perform LBT before transmitting the next uplink transmission. If the time length indicated by the unavailable symbol pattern configured by higher layer signaling in method of (5) does not exceed the predefined time length, or the time length indicated by the unavailable symbol pattern configured by higher layer signaling is a specific time length Len1, the UE does not need to perform LBT before the next transmission. Preferably, the time length is 9 us, or 16 us. If the time length indicated by the unavailable symbol pattern configured by higher layer signaling in method of (5) exceeds the predefined time length, or the time length indicated by the unavailable symbol pattern configured by higher layer signaling is a specific time length Len2, the UE needs to perform LBT before the next transmission. FIG. 25A illustrates an example. Assuming that the number of times of Type-B repetition transmissions of UE1 is 2, and the PUSCH resource of two nominal transmissions is symbols 2-7 and symbols 8-13 of a slot, respectively. The number of times of Type-B repetition transmissions of UE2 is 2, and the PUSCH resource of two nominal transmissions is symbols 8-13 of a slot, and symbols 14 of the slot and symbols 1-5 of the next slot. To avoid the influence of UE1 on LBT of UE2, symbol 7 of UE1 is vacated. UE1 performs LBT before transmitting PUSCH in symbol 8. UE2 performs LBT in symbol 7, and then transmits PUSCH of UE2. FIG. 25B illustrates an example. Assuming that the number of times of Type-B repetition transmissions of UE1 is 2, and the PUSCH resource of two nominal transmissions is symbols 2-7 and symbols 8-13 of a slot, respectively. The number of times of Type-B repetition transmissions of UE2 is 2, and the PUSCH resource of two nominal transmissions is symbols 8-13 of a slot, and symbol 14 of the slot and symbols 1-5 of the next slot. To avoid the influence of UE1 on the LBT of UE2, signals are transmitted in the first half part of symbol 7, and the second half part is vacated, for example, 16 us. UE1 does not need to perform LBT again. UE2 performs LBT of 9 us in this vacated period, and then transmits PUSCH of UE2.

According to the above method, the influence of uplink transmission of UE on DL transmission of the base station and the influence of DL transmission on LBT of uplink transmission of UE can be avoided, the blocking probability among different UEs can be reduced, and the transmission efficiency of CG PUSCH can be improved.

According to another aspect of the present invention, if a nominal transmission occasion or an actual transmission occasion includes at least one type of resource which is not available for uplink transmission as described above, the UE does not transmit the nominal transmission occasion or the actual transmission occasion.

The K transmission occasions of one PUSCH of Type-B or Type-A repetition transmission cannot be located in different periods of the semi-static channel occupancy. The UE does not expect the time length of K repetition transmissions configured by the base station to exceed the period of the semi-static channel occupancy. If the UE has not finished the transmission of K transmissions at the end of one period, the UE can only transmit K1 transmissions within the period, where $K1 \leq K$.

The base station can indicate HARQ-ACK of PUSCH through DCI. For example, HARQ-ACKs of all uplink HARQ processes are indicated by DCI. This DCI is also referred to as downlink feedback information (DFI).

The UE determines whether the HARQ-ACK of CG PUSCH included in the downlink feedback information (DFI) is valid based on the DFI configured by the base station and DFI delay parameter (cg-minDFIDelay-r16) configured by the base station.

According to an implementation, for Type-B CG-PUSCH, for any nominal repetition transmission, if the first symbol of DFI is after cg-minDFIDelay-r16 symbols after the end of the last symbol in this nominal repetition transmission of CG PUSCH, UE determines that HARQ-ACK of this CG PUSCH included in DFI is valid.

According to an implementation, for Type-B CG-PUSCH, for any nominal repetition transmission, if the first symbol of DFI is after cg-minDFIDelay-r16 symbols after the end of the last symbol in the first actual repetition transmission of CG PUSCH of this nominal repetition transmission, and the HARQ-ACK corresponding to this CG PUSCH is ACK, UE determines that the ACK of this CG PUSCH included in DFI is valid. If the first symbol of DFI is after cg-minDFIDelay-r16 symbols after the end of the last symbol in this nominal repetition transmission of CG PUSCH, and the HARQ-ACK corresponding to this CG PUSCH is NACK, UE determines that the NACK of this CG PUSCH included in DFI is valid.

According to an implementation, for scheduled PUSCH of Type-B, if the first symbol of DFI is after cg-minDFIDelay-r16 symbols after the end of the last symbol in the first actual repetition transmission of the scheduled PUSCH, and the HARQ-ACK corresponding to this PUSCH is ACK, UE determines that the ACK of this PUSCH included in DFI is valid.

According to an implementation, for scheduled PUSCH of Type-B, if the first symbol of DFI is after cg-minDFIDelay-r16 symbols after the end of the last symbol in the first nominal repetition transmission of the scheduled PUSCH, and the HARQ-ACK corresponding to this PUSCH is ACK, UE determines that the ACK of this PUSCH included in DFI is valid.

According to an implementation, for scheduled PUSCH of Type-B, if the first symbol of DFI is after cg-minDFIDelay-r16 symbols after the end of the last symbol in the last nominal repetition transmission of the scheduled PUSCH, and the HARQ-ACK corresponding to this PUSCH is NACK, UE determines that the NACK of this PUSCH included in DFI is valid.

According to an implementation, for scheduled PUSCH of Type-B, if the first symbol of DFI is after cg-minDFIDelay-r16 symbols after the end of the last symbol in the last actual repetition transmission of the scheduled PUSCH, and the HARQ-ACK corresponding to this PUSCH is NACK, UE determines that the NACK of this PUSCH included in DFI is valid.

In the above method, a nominal repetition transmission occasion can be divided into one or more actual repetition transmission occasions. Therefore, the end symbol of the first actual repetition transmission occasion in a nominal repetition transmission occasion may be earlier than the end symbol of the nominal repetition transmission occasion.

Preferably, the method for CG PUSCH described above is also applicable to dynamically scheduled PUSCH.

Preferably, the method for dynamically scheduled PUSCH described above is also applicable to CG PUSCH.

Figure 26:
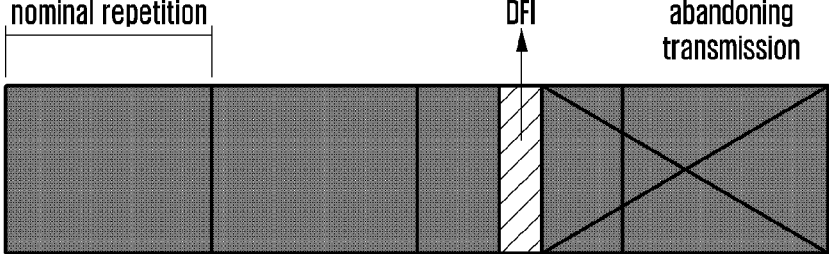
FIG. 26 illustrates an example of CG PUSCH transmission resource according to an embodiment of the disclosure.

If the UE is configured as Type-B repetition and the number of times of repetitions is K, if the UE receives the HARQ-ACK of PUSCH indicated by DFI, and the DFI indicates that the HARQ-ACK of HARQ process i is ACK, the UE will abandon transmission of K1 actual repetition transmissions of HARQ process i after the DFI. FIG. 24 illustrates an example of CG PUSCH transmission resource according to an embodiment of the disclosure. As shown in FIG. 26, K=4, 4 nominal repetitions are divided into 5 actual transmissions. After receiving ACK through the DFI, UE abandons transmission of the remaining K1=2 actual transmissions.

With regard to CG PUSCH, in order to reduce the time latency, after receiving the ACK of the CG PUSCH of HARQ process ID i, the UE may select a piece of resource from available CG PUSCH resource to transmit the newly transmitted CG PUSCH of HARQ process ID i. The UE indicates HARQ ID in CG-UCI.

For CG PUSCH, in order to reduce the latency, UE can automatically retransmit PUSCH before the predefined timer expires. Preferably, the number of times of automatic retransmissions does not exceed P. Preferably, after the UE receives the ACK of the CG PUSCH, or receives the UL grant scheduling the same HARQ ID as the CG PUSCH, or after the predefined timer expires, the UE will not perform the automatic retransmission of the CG PUSCH.

According to one or more embodiments of this disclosure, UE can support more flexible HARQ mechanism, reduce delay and improve reliability.

FIG. 27 illustrates a user equipment (UE) according to embodiments of the disclosure.

Referring to the FIG. 27, the UE 2700 may include a controller 2710, a transceiver 2720 and a memory 2730. However, all of the illustrated components are not essential. The UE 2700 may be implemented by more or less components than those illustrated in FIG. 27. In addition, the controller 2710 and the transceiver 2720 and the memory 2730 may be implemented as a single chip according to another embodiment.

The UE 2700 may correspond to UE described above. For example, the UE 2700 may correspond to the UE in FIGS. 3A and 17A.

The aforementioned components will now be described in detail.

The controller 2710 may include one or more processors or other processing devices that control the proposed function, process, and/or method. Operation of the UE 2700 may be implemented by the controller 2710.

The transceiver 2720 may include a RF transmitter for up-converting and amplifying a transmitted signal, and a RF receiver for down-converting a frequency of a received signal. However, according to another embodiment, the transceiver 2720 may be implemented by more or less components than those illustrated in components.

The transceiver 2720 may be connected to the controller 2710 and transmit and/or receive a signal. The signal may include control information and data. In addition, the transceiver 2720 may receive the signal through a wireless channel and output the signal to the controller 2710. The transceiver 2720 may transmit a signal output from the controller 2710 through the wireless channel.

The memory 2730 may store the control information or the data included in a signal obtained by the electronic device 2700. The memory 2730 may be connected to the controller 2710 and store at least one instruction or a protocol or a parameter for the proposed function, process, and/or method. The memory 2730 may include read-only memory (ROM) and/or random access memory (RAM) and/or hard disk and/or CD-ROM and/or DVD and/or other storage devices.

Figure 28:
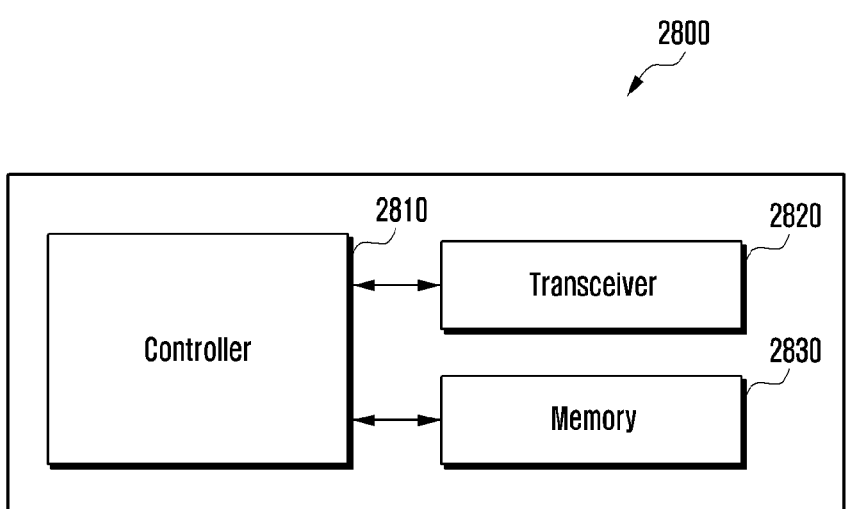
FIG. 28 illustrates a base station according to embodiments of the disclosure.

FIG. 28 illustrates a base station according to embodiments of the disclosure.

Referring to the FIG. 28, the base station 2800 may include a controller 2810, a transceiver 2820 and a memory 2830. However, all of the illustrated components are not essential. The base station 2800 may be implemented by more or less components than those illustrated in FIG. 28. In addition, the controller 2810 and the transceiver 2820 and the memory 2830 may be implemented as a single chip according to another embodiment.

The base station 2800 may correspond to the gNB described in the disclosure. For example, the base station 2800 may correspond to the gNB in FIGS. 3B and 17B.

The aforementioned components will now be described in detail.

The controller 2810 may include one or more processors or other processing devices that control the proposed function, process, and/or method. Operation of the base station 2800 may be implemented by the controller 2810.

The transceiver 2820 may include a RF transmitter for up-converting and amplifying a transmitted signal, and a RF receiver for down-converting a frequency of a received signal. However, according to another embodiment, the transceiver 2820 may be implemented by more or less components than those illustrated in components.

The transceiver 2820 may be connected to the controller 2810 and transmit and/or receive a signal. The signal may include control information and data. In addition, the transceiver 2820 may receive the signal through a wireless channel and output the signal to the controller 2810. The transceiver 2820 may transmit a signal output from the controller 2810 through the wireless channel.

The memory 2830 may store the control information or the data included in a signal obtained by the base station 2800. The memory 2830 may be connected to the processor 2810 and store at least one instruction or a protocol or a parameter for the proposed function, process, and/or method. The memory 2830 may include read-only memory (ROM) and/or random access memory (RAM) and/or hard disk and/or CD-ROM and/or DVD and/or other storage devices.

Although the various embodiments of this application are mainly described from the UE side, those skilled in the art will understand that the various embodiments of this application also include operations on the base station side, and the base station side will perform operations corresponding to the UE side.

Those skilled in the art will understand that the various illustrative logical blocks, modules, circuits, and steps described in this application can be implemented as hardware, software, or a combination of both. To clearly illustrate this interchangeability between hardware and software, various illustrative components, blocks, modules, circuits, and steps are generally described above in the form of their function sets. Whether such function sets are implemented as hardware or software depends on the specific application and design constraints imposed on the overall system. Technicians can implement the described function sets in different ways for each specific application, but such design decisions should not be interpreted as causing a departure from the scope of this application.

The various illustrative logical blocks, modules, and circuits described herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination of the both. The software module may reside in a RAM memory, flash memory, ROM memory, EPROM memory, EEPROM memory, register, hard disk, removable disk, or any other form of storage medium known in the art. Exemplary storage media are coupled to a processor to enable the processor to read and write information from/to the storage media. In an alternative, the storage media may be integrated into the processor. The processor and the storage media may reside in the ASIC. The ASIC may reside in the user terminal. In AN alternative, the processor and the storage medium may reside in the user terminal as discrete components.

In one or more exemplary designs, the functions may be implemented in hardware, software, firmware, or any combination thereof. If implemented in software, each function can be stored as one or more instructions or codes on a computer-readable medium or transmitted through it. A computer-readable medium includes both computer storage medium and communication medium, the latter including any medium that facilitates the transfer of computer programs from one place to another. A storage medium can be any available medium that can be accessed by a general-purpose or dedicated computer.

The examples of this application are only for easy description and help to fully understand this application, and are not intended to limit the scope of this application. Therefore, it should be understood that except for the embodiments disclosed herein, all modifications and changes or forms of the modifications and changes derived from the technical concept of this application fall within the scope of this application.

The above is only preferred embodiments of the present invention, and is not intended to limit the present invention. Any modifications, equivalent substitutions, improvements, etc. made within the spirit and principles of the present invention shall be included in the scope of protection of the present invention.

The invention claimed is:

1. A method performed by a user equipment (UE) in a communication system, the method comprising:

receiving, from a base station, downlink control information (DCI) for scheduling at least one physical uplink shared channel (PUSCH), wherein the DCI includes information on a channel access type of a channel access procedure;

identifying, from the information, the channel access type and an initiator of channel occupancy, wherein the channel access type corresponds to the initiator; and transmitting, to the base station, the at least one PUSCH within the channel occupancy of the identified initiator based on the channel access procedure according to the identified channel access type.

2. The method of claim 1, wherein a channel access type of without sensing corresponds to the initiator being the base station.

3. The method of claim 1, wherein a channel access type of sensing within a 25 μs interval corresponds to the initiator being the base station.

4. The method of claim 1, wherein in case that the initiator is the UE;

the UE initiates the channel occupancy based on the channel access procedure according to the identified channel access type for UE-initiated channel occupancy, the channel access type corresponds to sensing within a 25 μs interval, the channel access procedure is performed immediately before a starting point of the at least one PUSCH, and the at least one PUSCH is at a starting point of the UE-initiated channel occupancy.

5. A method performed by a base station in a communication system, the method comprising:

transmitting, to a user equipment (UE), downlink control information (DCI) for scheduling at least one physical uplink shared channel (PUSCH), wherein the DCI includes information on a channel access type of a channel access procedure, wherein the information is used for providing the channel access type and an initiator of a channel occupancy, and wherein the channel access type corresponds to the initiator; and receiving, from the UE, the PUSCH within the channel occupancy of the provided initiator after transmission of the DCI.

6. The method of claim 5, wherein a channel access type of without sensing corresponds to being the base station.

7. The method of claim 5, wherein a channel access type of sensing within a 25 μs interval corresponds to the initiator being the base station.

8. The method of claim 5, wherein in case that the information provides the initiator as the UE;

the channel access type is for UE-initiated channel occupancy, the channel access type corresponds to sensing within a 25 μs interval, the at least one PUSCH is at a starting point of the UE-initiated channel occupancy.

9. A user equipment (UE) in a communication system, the UE comprising:

a transceiver; and a processor coupled with the transceiver and configured to:

receive, from a base station, downlink control information (DCI) for scheduling at least one physical uplink shared channel (PUSCH), wherein the DCI includes information on a channel access type of a channel access procedure;

identify, from the information, the channel access type and an initiator of channel occupancy, wherein the channel access type corresponds to the initiator; and transmit, to the base station, the at least one PUSCH within the channel occupancy of the identified initiator based on the channel access procedure according to the identified channel access type.

10. The UE of claim 9, wherein a channel access type of without sensing corresponds to the initiator being the base station.

11. The UE of claim 9, wherein a channel access type of sensing within a 25 μs interval corresponds to the initiator being the base station.

12. The UE of claim 9, wherein in case that the initiator is the UE:

the UE initiates the channel occupancy based on the channel access procedure according to the identified channel access type for UE-initiated channel occupancy, the channel access type corresponds to sensing within a 25 μs interval, the channel access procedure is performed immediately before a starting point of the at least one PUSCH, and the at least one PUSCH is at a starting point of the UE-initiated channel occupancy.

13. A base station in a communication system, the base station comprising:

a transceiver; and a processor coupled with the transceiver and configured to:

transmit, to a user equipment (UE), downlink control information (DCI) for scheduling at least one physical uplink shared channel (PUSCH), wherein the DCI includes information on a channel access type of a channel access procedure, wherein the information is used for providing the channel access type and an initiator of a channel occupancy, and wherein the channel access type corresponds to the initiator; and receive, from the UE, the PUSCH within the channel occupancy of the provided initiator after transmission of the DCI.

14. The base station of claim 13, wherein a channel access type of without sensing corresponds to the initiator being the base station.

15. The base station of claim 13, wherein a channel access type of sensing within a 25 μs interval corresponds to the initiator being the base station.

16. The base station of claim 13, wherein in case that the information provides the initiator as the UE:

the channel access type is for UE-initiated channel occupancy, the channel access type corresponds to sensing within a 25 μs interval, the at least one PUSCH is at a starting point of the UE-initiated channel occupancy.

* * * * *